United States Patent
Thirumalai et al.

(10) Patent No.: US 9,609,347 B2
(45) Date of Patent: Mar. 28, 2017

(54) ADVANCED MERGE MODE FOR THREE-DIMENSIONAL (3D) VIDEO CODING

(71) Applicant: QUALCOMM Incorporated, San Diego, CA (US)

(72) Inventors: Vijayaraghavan Thirumalai, San Diego, CA (US); Li Zhang, San Diego, CA (US); Ying Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 492 days.

(21) Appl. No.: 14/243,610

(22) Filed: Apr. 2, 2014

(65) Prior Publication Data

US 2014/0301467 A1    Oct. 9, 2014

Related U.S. Application Data

(60) Provisional application No. 61/808,562, filed on Apr. 4, 2013, provisional application No. 61/839,287, filed on Jun. 25, 2013, provisional application No. 61/845,985, filed on Jul. 13, 2013.

(51) Int. Cl.
| | |
|---|---|
| *H04N 19/513* | (2014.01) |
| *H04N 19/597* | (2014.01) |
| *H04N 19/56* | (2014.01) |
| *H04N 19/70* | (2014.01) |

(52) U.S. Cl.
CPC ......... *H04N 19/513* (2014.11); *H04N 19/56* (2014.11); *H04N 19/597* (2014.11); *H04N 19/70* (2014.11)

(58) Field of Classification Search
CPC .................................................. H04N 19/513
USPC ........................................ 375/240.02–240.2
See application file for complete search history.

(56) References Cited

U.S. PATENT DOCUMENTS

| | | | |
|---|---|---|---|
| 2014/0161186 A1 | 6/2014 | Zhang et al. | |
| 2015/0085930 A1* | 3/2015 | Zhang ................. | H04N 19/136 375/240.15 |

OTHER PUBLICATIONS

Zhang L et al. "3D-CE5.h: Merge Candidates Derivation from Disparity Vector", 102. MPEG Meeting; Oct. 15, 2012-Oct. 19, 2012; Shanghair; (Motion Picture Expert Group OR ISO/IEC JTC1/SC29/WG11), No. m26737, Oct. 15, 2012.*
Wiegand et al., "WD1: Working Draft 1 of High-Efficiency Video Coding", JCTVC-C403, 3rd Meeting: Guangzhou, CN, Oct. 7-15, 2010, 137 pp.
Wiegand et al., "WD2: Working Draft 2 of High-Efficiency Video Coding," JCTVC-D503, 4th Meeting: Daegu, KR, Jan. 20-28, 2011, 153 pp.
Wiegand et al., "WD3: Working Draft 3 of High-Efficiency Video Coding," Document JCTVC-E603, 5th Meeting: Geneva, CH, Mar. 16-23, 2011, 193 pp.

(Continued)

*Primary Examiner* — Dave Czekaj
*Assistant Examiner* — Shanika Brumfield
(74) *Attorney, Agent, or Firm* — Shumaker & Sieffert, P.A.

(57) ABSTRACT

As part of a video encoding process or a video decoding process, a video coder may determine a first available disparity motion vector among spatial neighboring blocks of a current block of the video data. Furthermore, the video coder may shift a horizontal component of the first available disparity motion vector to derive a shifted disparity motion vector candidate (DSMV). The video coder may add the DSMV into a merge candidate list.

20 Claims, 20 Drawing Sheets

(56) References Cited

OTHER PUBLICATIONS

Bross et al., "WD4: Working Draft 4 of High-Efficiency Video Coding," 6th Meeting: JCTVC-F803_d2, Torino, IT, Oct. 4, 2011, 226 pp.
Bross et al., "WD5: Working Draft 5 of High-Efficiency Video Coding," 7th Meeting: Geneva, Switzerland, Dec. 30, 2011, JCTVC-G1103_d2, 214 pp.
Bross et al., "High efficiency video coding (HEVC) text specification draft 6," 8th Meeting: San Jose, CA, USA, Feb. 1-10, 2012, JCTVC-H1003, 259 pp.
Bross et al., "High efficiency video coding (HEVC) text specification draft 7," 9th Meeting: Geneva, CH, Apr. 27-May 7, 2012, JCTVC-I1003_d2, 290 pp.
Bross et al., "High efficiency video coding (HEVC) text specification draft 8," 10th Meeting: Stockholm, SE, Jul. 9, 2012, JCTVC-J1003_d7, 261 pp.
Bross et al., "High efficiency video coding (HEVC) text specification draft 9," 11th Meeting: Shanghai, CN, Nov. 2, 2012, JCTVC-K1003_v7, 290 pp.
Bross et al., "High efficiency video coding (HEVC) text specification draft 10 (for FDIS & Last Call)," 12th Meeting: Geneva, CH, Mar. 19, 2013, JCTVC-L1003_v34, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Guillemot, et al., "3D-CE5.h: Additional merge candidates derived from shifted disparity candidate predictors", JCT-3V Meeting, MPEG Meeting, Jan. 17-23, 2013; Geneva, (The Joint Collaborative Team on 3D Video Coding Extension Development of ISO/IEC JTC1/SC29/WG11 and ITU-T SG.16 ), URL: HTTP://PHENIX.INT-EVRY.FR/JCT2/, No. JCT3V-00148, XP030130564, 6 pp.
Guionnet, et al., "3D-CE5.h: Additional merge candidates derived from shifted disparity candidate predictors", MPEG Meeting; Jul. 16-20, 2012; Geneva; (Motion Picture Expert Group or ISO/IEC JTC1/SC29/WG11), No. m27899, Document: JCT2:A0134; XP030056452, 3 pp.
Guionnet, et al., "CE5.h related: Merge candidate list extension for disparity compensated prediction", JCT-3V Meeting; MPEG Meeting; Jul. 16-20, 2012; Stockholm; No. JCT2-A0134, XP03013013, 3 pp.
Tech, et al., "3D-HEVC Test Model 2," Joint Collaborative Team on 3D Video Coding Extension Development of ITU-T SG 16 WP 3 and ISO/IEC JTC 1/SC 29/WG 11, Document: JCT3V- B1005_d0, 2nd Meeting: Shanghai, CN, XP030130414, Oct. 13-19, 2012, 118 pp.

Thirumalai, et al., "CE5.h: Merge candidates derivation from vector shifting", JCT-3V Meeting; Apr. 20-26, 2013; Incheon; (The Joint Collaborative Team on 3D Video Coding Extension Development of ISO/IEC JTC1/SC29/WG11 and ITU-T SG:16); URL: http://phenix.int-evry.fr/jct2/, No. JCT3V-D0178, XP030130842, 5 pp.
Zhang, et al., "3D-CE5.h: Merge candidates derivation from disparity vector", MPEG Meeting; Oct. 13-19, 2012; Shanghai; (Motion Picture Expert Group or ISO/IEC JTC1/SC29/WG11) No. m26737, Document: JCT3V-B0048, XP030055069, 4 pp.
Zhao, et al., "CE3: Inter-view motion vector prediction for depth coding", JCT-3V Meeting; Oct. 25-Nov. 1, 2013; Geneva; (The Joint Collaborative Team on 3D Video Coding Extension Development of ISO/IEC JTC1/SC29/WG11 and ITU-T SG.16); URL: http://phenix.int-evry.fr/jct2/, No. JCT3V-F0125, XP030131550, 6 pp.
Tech, et al., "3D-HEVC Test Model 4," (The Joint Collaborative Team on 3D Video Coding Extension Development of ISO/IEC JTC1/SC29/WG11 and ITU-T SG.16); Document: JCT3V-D1005-spec_v1, Apr. 20-26, 2013, 106 pp.
Tech, et al., "3D-HEVC Draft Text 2," (The Joint Collaborative Team on 3D Video Coding Extension Development of ISO/IEC JTC1/SC29/WG11 and ITU-T SG.16); Document: JCT3V-F1001_v4, Oct. 25-Nov. 1, 2013, 94 pp.
Lin, et al., "3D-CE5.h related: Additional inter-view merging candidate," (The Joint Collaborative Team on 3D Video Coding Extension Development of ISO/IEC JTC1/SC29/WG11 and ITU-T SG.16); Document: JCT3V-D0109, Apr. 20-26, 2013, 3 pp.
Tian, et al,. "CE1.h: Backward View Synthesis Prediction using Neighboring Blocks," (The Joint Collaborative Team on 3D Video Coding Extension Development of ISO/IEC JTC1/SC29/WG11 and ITU-T SG.16); Document: JCT3V-C0152, Jan. 17-23, 2013, 5 pp.
Zhang, et al., "3D-CE5.h: Merge candidates derivation from disparity vector," (The Joint Collaborative Team on 3D Video Coding Extension Development of ISO/IEC JTC1/SC29/WG11 and ITU-T SG.16); Document: JCT3V-B0048, Oct. 13-19, 2012, 4 pp.
Zhao, et al., "CE3: Inter-view motion vector prediction for depth coding," (The Joint Collaborative Team on 3D Video Coding Extension Development of ISO/IEC JTC1/SC29/WG11 and ITU-T SG.16); Document: JCT3V-F0125, Oct. 25-Nov. 1, 2013, 6 pp.
International Search Report and Written Opinion from International Application No. PCT/US2014/032788, dated Mar. 10, 2015, 17 pp.
Response to Written Opinion dated Mar. 10, 2015, from International Application No. PCT/US2014/032788, filed on Jun. 10, 2015, 9 pp.
Second Written Opinion from International Application No. PCT/US2014/032788, dated Aug. 4, 2015, 15 pp.
Response to Second Written Opinion dated Aug. 4, 2015, from International Application No. PCT/US2014/032788, filed on Aug. 18, 2015, 28 pp.
International Preliminary Report on Patentability from International Application No. PCT/US2014/032788, dated Sep. 24, 2015, 13 pp.
Bross, et al., "High Efficiency Video Coding (HEVC) text specification draft 9," (The Joint Collaborative Team on 3D Video Coding Extension Development of ISO/IEC JTC1/SC29/WG11 and ITU-T SG.16); Oct. 10-19, 2012, Document: JCTVC-K1003_v10, 306 pp.
Tech, et al., "3D-HEVC Test Model," (The Joint Collaborative Team on 3D Video Coding Extension Development of ISO/IEC JTC1/SC29/WG11 and ITU-T SG.16); Apr. 20-26, 2013, Document: JCT3V-D1005-V1, 56 pp.
Tech, et al., "3D-HEVC Test Model," (The Joint Collaborative Team on 3D Video Coding Extension Development of ISO/IEC JTC1/SC29/WG11 and ITU-T SG.16); Jan. 17-23, 2013, Document: JCT3V-C1005_spec_d1, 91 pp.

* cited by examiner

| combIdx | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| l0CandIdx | 0 | 1 | 0 | 2 | 1 | 2 | 0 | 3 | 1 | 3 | 2 | 3 | 0 | 4 | 1 | 4 | 2 | 4 | 3 | 4 |
| l1CandIdx | 1 | 0 | 2 | 0 | 2 | 1 | 3 | 0 | 3 | 1 | 3 | 2 | 4 | 0 | 4 | 1 | 4 | 2 | 4 | 3 |

FIG. 9

ADVANCED MERGE MODE FOR THREE-DIMENSIONAL (3D) VIDEO CODING

This application claims the benefit of U.S. Provisional Application No. 61/808,562, filed on Apr. 4, 2013, U.S. Provisional Patent Application No. 61/839,287, filed Jun. 25, 2013, and U.S. Provisional Patent Application No. 61/845,985, filed Jul. 13, 2013, the entire content of each of which is incorporated herein by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes systems and methods to further improve the coding efficiency of motion vector prediction for the merge mode in 3D-HEVC or other video coding standards. As part of a video encoding process or a video decoding process, a video coder (e.g., a video encoder or a video decoder) may construct a merge candidate list. As part of constructing the merge candidate list, the video coder may determine a first available disparity motion vector among spatial neighboring blocks of a current block of the video data. The first available disparity motion vector may correspond to a first reference picture list (e.g., RefPicList0). Furthermore, the video coder may shift a horizontal component of the first available disparity motion vector to derive a disparity shifted motion vector (DSMV) candidate. The video coder may add the DSMV candidate into a merge candidate list. In some examples, the video coder uses motion information of a selected candidate in the merge candidate list to determine a predictive block for the current block.

Furthermore, in some examples of this disclosure, the video coder may determine an initial inter-view prediction motion vector candidate (IPMVC) based on a disparity vector of the current block. In addition, the video coder may determine a shifted disparity vector by shifting a disparity vector of the current block horizontally by a first value and vertically by a second value. The video coder may use the shifted disparity vector to locate a corresponding block in a reference view. The video coder may then generate an additional IPMVC that indicates motion information of the corresponding block. In some examples, the video coder inserts the additional IPMVC into the merge candidate list instead of the DSMV candidate if the additional IPMVC does not match the initial IPMVC. In other words, the video coder may include the additional IPMVC in the merge candidate list if the additional IPMVC does not match the initial IPMVC and may include the DSMV candidate in the merge candidate list if the additional IPMVC is not available.

In one example, this disclosure describes a method of coding video data, the method comprising: determining a first available disparity motion vector among spatial neighboring blocks of a current block of the video data, the first available disparity motion vector corresponding to a first reference picture list; shifting a horizontal component of the first available disparity motion vector to derive a DSMV candidate; and adding the DSMV candidate into a merge candidate list.

In another example, this disclosure describes an apparatus comprising: a memory storing video data, and one or more processors configured to: determine a first available disparity motion vector among spatial neighboring blocks of a current block of the video data, the first available disparity motion vector corresponding to a first reference picture list; shift a horizontal component of the first available disparity motion vector to derive a DSMV candidate; and add the DSMV candidate into a merge candidate list.

In another example, this disclosure describes an apparatus comprising: means for determining a first available disparity motion vector among spatial neighboring blocks of a current block of the video data, the first available disparity motion vector corresponding to a first reference picture list; means for shifting a horizontal component of the first available disparity motion vector to derive a DSMV candidate; and means for adding the DSMV candidate into a merge candidate list.

In another example, this disclosure describes a non-transitory computer-readable data storage medium having instructions stored thereon that, when executed, cause one or more processors to: determine a first available disparity motion vector among spatial neighboring blocks of a current block of the video data, the first available disparity motion vector corresponding to a first reference picture list; shift a horizontal component of the first available disparity motion vector to derive a DSMV candidate; and add the DSMV candidate into a merge candidate list.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 9 is an example table that indicates an example specification of l0CandIdx and l1CandIdx.

DETAILED DESCRIPTION

Figure 1:
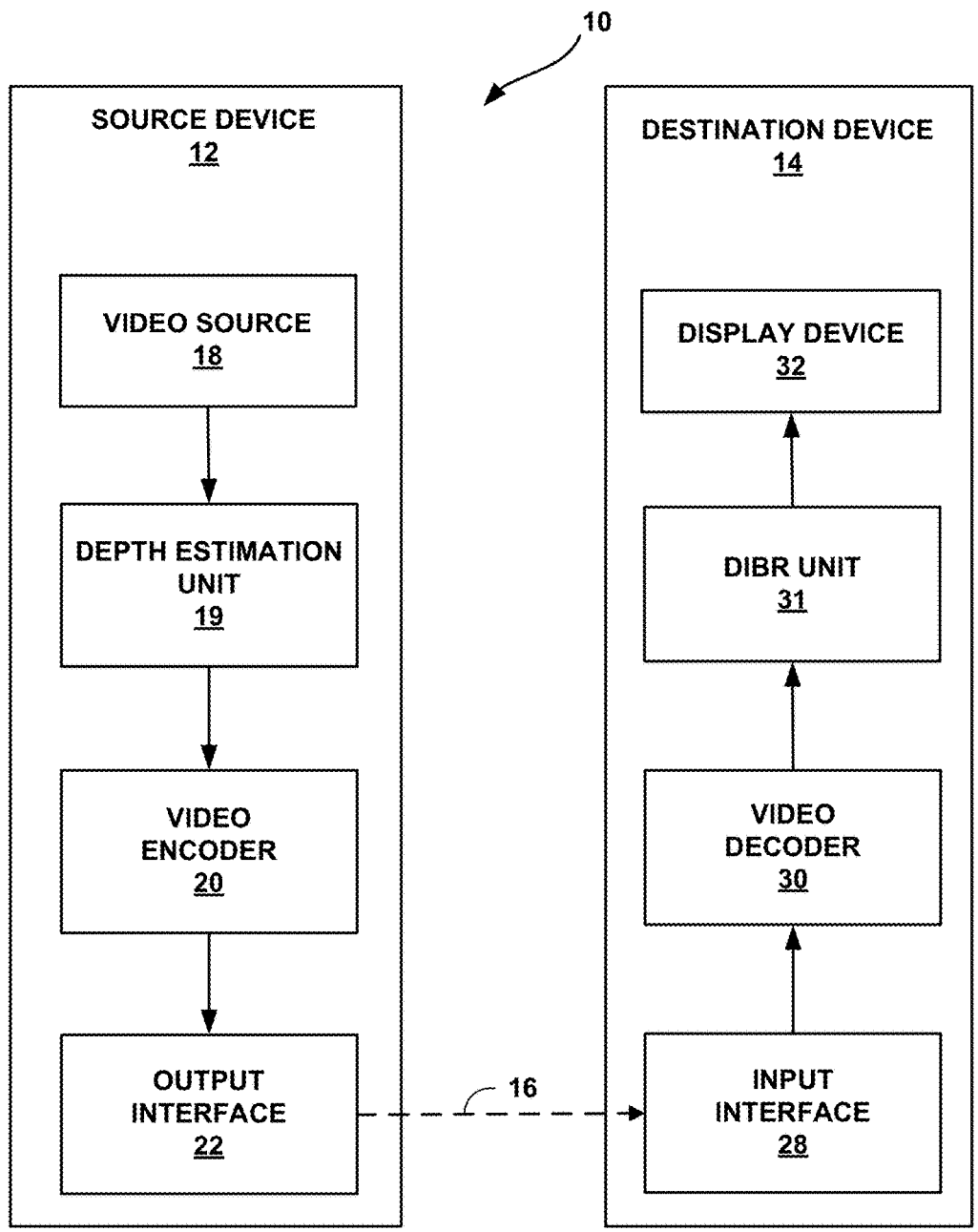
FIG. 1 is a block diagram illustrating an example video encoding and decoding system that may utilize the inter-prediction techniques of this disclosure.

This disclosure describes techniques for improving the efficiency and quality of inter-view prediction in multi-view and/or multi-view plus depth (e.g., 3D-HEVC) video coding. In particular, this disclosure proposes techniques for improving the coding efficiency of merge mode motion vector prediction. In general, merge mode is a technique for increasing the efficiency with which a video encoder is able to signal motion information. When a video encoder uses merge mode to encode a current block, the video encoder generates a merge candidate list that comprises one or more merge candidates. Each merge candidate in the merge candidate list may indicate different motion information. For instance, one or more of the merge candidates may specify motion information of blocks that represents spatial or temporal neighbors of the current block. Furthermore, in multi-view coding and 3-dimensional video coding, the merge candidate list may include an inter-view prediction motion vector candidate (IPMVC). To determine the IPMVC, the video encoder may use a disparity vector of the current block to identify a corresponding block in an inter-view reference picture. If the corresponding block is not intra predicted and not inter-view predicted, and has one or more motion vectors that indication positions in reference pictures in different output time instances than the current block, the IPMVC may specify the motion information of the corresponding block.

The video encoder may select a merge candidate from the merge candidate list and use the motion information of the selected merge candidate to determine a predictive block for the current block. The video encoder may use the predictive block to generate residual data. The video encoder may include, in a bitstream, data representing the residual data. In addition, the video encoder may include, in the bitstream, data representing an index of the selected merge candidate.

When decoding the current block, a video decoder may construct the same merge candidate list and may use the index to determine the selected merge candidate. The video decoder may then use the motion information of the selected merge candidate to determine the predictive block for the current block. The video decoder may use the predictive block, along with residual data, to reconstruct pixel values of the current block.

In some instances, the motion information specified by the merge candidates in the merge candidate list is not sufficiently accurate, especially when multi-view or 3-dimensional video coding is being used. As a result, bitstream size may increase. In some instances, the merge candidates in the merge candidate list are not sufficiently accurate because the disparity vector used to derive the IPMVC is not sufficiently accurate. In other words, an inaccurate disparity vector may lead to inaccurate inter-view predicted motion vector candidates and inter-view disparity motion vector candidates. Furthermore, the disparity vector of the current block may be determined based on one or more disparity motion vectors of blocks that spatially neighbor the current block. The fact that the disparity motion vectors of the spatially neighboring blocks may be highly correlated with the disparity motion vector of the current block is not well exploited while creating the merge candidate list.

The techniques of this disclosure may address one or more of these deficiencies. For example, a video coder (e.g., a video encoder or a video decoder) may determine a first available disparity motion vector among spatial neighboring blocks of a current block of the video data, the first available disparity motion vector corresponding to a first reference picture list. Furthermore, the video coder may shift a horizontal component of the first available disparity motion vector to derive a disparity shifted motion vector (DSMV) candidate. The video coder may then add the DSMV candidate into a merge candidate list. The DSMV candidate determined in this way may have increased accuracy and hence result in smaller bitstream size.

FIG. 1 is a block diagram illustrating an example video encoding and decoding system 10 that may utilize techniques of this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, televisions, cameras, display devices, digital media players, video gaming consoles, video streaming device, or the like. In some cases, source device 12 and destination device 14 may be equipped for wireless communication.

Destination device 14 may receive encoded video data to be decoded via computer-readable medium 16. Computer-readable medium 16 may comprise a type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, depth estimation unit 19, video encoder 20, and output interface 22. Destination device 14 includes input interface 28, video decoder 30, depth image based rendering (DIBR) unit 31, and display device 32. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. The techniques of this disclosure may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. However, as mentioned above, the techniques described in this disclosure may be applicable to video coding in general, and may be applied to wireless and/or wired applications. In each case, video encoder 20 may encode the captured, pre-captured, or computer-generated video. Output interface 22 may then output the encoded video information onto a computer-readable medium 16.

Video source 18 may provide multiple views of video data to video encoder 20. For example, video source 18 may correspond to an array of cameras, each having a unique horizontal position relative to a particular scene being filmed. Alternatively, video source 18 may generate video data from disparate horizontal camera perspectives, e.g., using computer graphics. Depth estimation unit 19 may be configured to determine values for depth pixels corresponding to pixels in a texture image. For example, depth estimation unit 19 may represent a Sound Navigation and Ranging (SONAR) unit, a Light Detection and Ranging (LIDAR) unit, or other unit capable of directly determining depth values substantially simultaneously while recording video data of a scene.

Additionally or alternatively, depth estimation unit 19 may be configured to calculate depth values indirectly by comparing two or more images that were captured at substantially the same time from different horizontal camera perspectives. By calculating horizontal disparity between substantially similar pixel values in the images, depth estimation unit 19 may approximate depth of various objects in the scene. In some examples, depth estimation unit 19 is functionally integrated with video source 18. For example, when video source 18 generates computer graphics images, depth estimation unit 19 may provide actual depth maps for graphical objects, e.g., using z-coordinates of pixels and objects used to render texture images.

Computer-readable medium 16 may include transient media, such as a wireless broadcast or wired network transmission, or storage media (that is, non-transitory storage media), such as a hard disk, a flash drive, a compact disc, a digital video disc, a Blu-ray disc, or another computer-readable media. In some examples, a network server (not shown) may receive encoded video data from source device 12 and may provide the encoded video data to destination device 14, e.g., via network transmission. Similarly, a computing device of a medium production facility, such as a disc stamping facility, may receive encoded video data generated by source device 12 and produce a disc containing the encoded video data. Therefore, computer-readable medium 16 may be understood to include one or more computer-readable media of various forms, in various examples.

Input interface 28 of destination device 14 may receive information from computer-readable medium 16. The information of computer-readable medium 16 may include syntax information defined by video encoder 20, which is also used by video decoder 30, that includes syntax elements that describe characteristics and/or processing of blocks and other coded units, e.g., groups of pictures (GOPs). Display device 32 displays the decoded video data to a user. Display device 32 may comprise any of a variety of display devices such as a cathode ray tube (CRT), a liquid crystal display (LCD), a plasma display, an organic light emitting diode (OLED) display, or another type of display device. In some examples, display device 32 comprises a device capable of displaying two or more views simultaneously or substantially simultaneously, e.g., to produce a 3-dimensional (3D) visual effect for a viewer.

DIBR unit 31 of destination device 14 may render synthesized views using texture and depth information of decoded views received from video decoder 30. For example, DIBR unit 31 may determine horizontal disparity for pixel data of texture images as a function of values of pixels in corresponding depth maps. DIBR unit 31 may then generate a synthesized image by offsetting pixels in a texture image left or right by the determined horizontal disparity. In this manner, display device 32 may display one or more views, which may correspond to decoded views and/or synthesized views, in any combination.

Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

In general, the techniques of this disclosure are related to multi-view and/or 3D video coding based on advanced codecs. The techniques of this disclosure may be applied to any of a variety of different video coding standards. For instance, video encoder 20 and video decoder 30 may operate according to a video compression standard. Example video coding standards include ITU-T H.261, ISO/IEC MPEG-1 Visual, ITU-T H.262 or ISO/IEC MPEG-2 Visual, ITU-T H.263, ISO/IEC MPEG-4 Visual, and other proprietary or industry standards or extensions of such standards. In some examples, video encoder 20 and video decoder 30 operate according to the ITU-T H.264 standard, alternatively referred to as MPEG-4, Part 10, Advanced Video Coding (AVC) (i.e., H.264/AVC), or extensions of H.264/AVC, such as the multi-view coding (MVC) extension of ITU-T H.264/AVC and the Scalable Video Coding (SVC) extension of ITU-T H.264/AVC.

The ITU-T Video Coding Experts Group (VCEG) together with the ISO/IEC Moving Picture Experts Group (MPEG) formulated the ITU-T H.264/MPEG-4 (AVC) standard as the product of a collective partnership known as the Joint Video Team (JVT). In some aspects, the techniques described in this disclosure may be applied to devices that generally conform to the H.264/AVC standard. The H.264/AVC standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/AVC.

Furthermore, there is a new video coding standard, namely High-Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). Currently, a Joint Collaboration Team on 3D Video Coding (JCT-3C) of VCEG and MPEG is developing a 3DV standard based on HEVC. Part of the standardization efforts for the 3DV standard based on HEVC includes the standardization of a multi-view video codec based on HEVC (MV-HEVC) and another part includes the standardization of 3D video coding based on HEVC (3D-HEVC). Only high-level syntax (HLS) changes are provided in MV-HEVC, such that no module in a coding unit (CU) or prediction unit (PU) level in HEVC needs to be re-designed and can be fully reused for MV-HEVC. For 3D-HEVC, new coding tools, including those in the coding unit/prediction unit level, for both texture and depth views may be included and supported. In some examples, video encoder 20 and video decoder 30 operate according to HEVC, MV-HEVC, or 3D-HEVC, and may conform to the HEVC Test Model (HM). Thus, the techniques of this disclosure may be applied to the multi-view video coding (MVC) extension of ITU-T H.264/AVC (advanced video coding), to a 3D video (3DV) extension of the HEVC standard (e.g., 3D-HEVC), or other coding standard.

The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three angular intra-prediction encoding modes plus DC and Planar modes.

Bross et al., "High Efficiency Video Coding (HEVC) text specification draft 8," Joint Collaborative Team on Video Coding (JCT-VC) of ITU-T SG16 WP3 and ISO/IEC JTC1/SC29/WG11, 10th Meeting: Stockholm, SE, 11-20 Jul. 2012, which, as of Mar. 26, 2014, is downloadable from http://phenix.it-sudparis.eu/jct/doc_end_user/documents/10_Stockholm/wg11/JCTVC-J1003-v8.zip (referred to herein as "HEVC WD8") is a draft of the HEVC standard. Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, CN, 10-19 Oct., 2012, which, as of Mar. 26, 2014, is downloadable from http://phenix.int-evey.fr/jct/doc_end_user/documents/11_Shanghai/wg11/JCTVC-K1003-v10.zip (referred to herein as "HEVC WD9") is another draft of the HEVC standard. Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, CH, 14-23 Jan., 2013, which, as of Jun. 25, 2013, is downloadable from http://phenix.int-evey.fr/jct/doc_end_user/documents/12 Geneva/wg11/JCTVC-L1003-v34.zip (referred to herein as "HEVC WD10"), which is incorporated by reference herein in its entirety, is another draft of the HEVC standard.

Tech et al, "3D-HEVC Test Model 4," JCT3V-D1005_spec_v1, Joint Collaborative Team on 3D Video Coding Extension Development of ITU-T SG 16 WP 3 and ISO/IEC JTC 1/SC 29/WG 11, 4th Meeting: Incheon, KR, 20-26 Apr. 2013, which as of Jun. 25, 2013, is available at http://phenix.it-sudparis.eu/jct2/doc_end_user/documents/4 Incheon/wg11/JCT3V-D1005-v1.zip (hereinafter, "3D-HEVC Test Model 4") is a reference software description as well as a working draft of 3D-HEVC. A software 3D-HTM for 3D-HEVC can be downloaded from the following link: [3D-HTM version 7.0]: https://hevc.hhi.fraunhofer.de/svn/svn_3DVCSoftware/tags/HTM-7.0/. Another version of 3D-HTM for 3D-HEVC can be downloaded from the following link. [3D-HTM version 5.0]: https://hevc.hhi.fraunhofer.de/svn/svn_3DVCSoftware/tags/HTM-5.0/.

For purposes of illustration, the techniques of this disclosure are described primarily with respect to either the MVC extension of ITU-T H.264/AVC or to 3D-HEVC. However, the techniques of this disclosure may be applied to other standards for coding video data used to produce a three-dimensional effect as well.

In general, the working model of the HM of HEVC describes that a video frame or picture may be divided into a sequence of coding tree units (CTUs) or largest coding units (LCU) that include both luma and chroma samples. Syntax data within a bitstream may define a size for the LCU, which is a largest coding unit in terms of the number of pixels. A video frame or picture may be partitioned into one or more slices. A slice includes a number of consecutive CTUs in coding order. A coded slice may comprise a slice header and slice data. The slice header of a slice may be a syntax structure that includes syntax elements that provide information about the slice. In other words, a slice header contains data elements that pertain to all video blocks contained within a slice. The slice data may include coded CTUs of the slice.

Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In some examples, four sub-CUs of a leaf-CU may be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure may use the term "block" to refer to any of a CU, PU, or TU, in the context of HEVC, or similar data structures in the context of other standards (e.g., macroblocks and sub-blocks thereof in H.264/AVC).

A CU may include a "coding node" and prediction units (PUs) and transform units (TUs) associated with the coding node. The "coding node" may comprise a set of syntax elements. A CU may be said to include a "coding node" because a CU may correspond to a node in a hierarchical quad tree. A size of the CU corresponds to a size of the coding block and, in some examples, must be square in shape. The size of the CU may range from 8×8 pixels up to the size of the treeblock with a maximum of 64×64 pixels or greater. Each CU may contain one or more PUs and one or more TUs. For example, syntax data associated with a CU may describe partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The TUs may be specified using an RQT (also referred to as a TU quadtree structure), as discussed above. For example, a split flag may indicate whether a leaf-CU is split into four TUs. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM for HEVC supports prediction in various PU sizes. Assuming that the size of a particular CU is 2N×2N, the HM for HEVC supports intra-prediction in PU sizes of 2N×2N or N×N, and inter-prediction in symmetric PU sizes of 2N×2N, 2N×N, N×2N, or N×N. The HM of HEVC also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block has 16 pixels in a vertical direction (y=16) and 16 pixels in a horizontal direction (x=16). Likewise, an N×N block generally has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector. That is, video encoder 20 may entropy encode syntax elements representing the transform coefficients. Video encoder 20 may entropy encode the syntax elements representing the transform coefficients using various entropy encoding techniques, such as context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. For example, the context may relate to whether neighboring values of the symbol are non-zero or not. To perform CAVLC, video encoder 20 may select a variable length code for a symbol to be transmitted. Codewords in variable length coding (VLC) may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may output a bitstream that includes a sequence of bits that forms a representation of coded pictures and associated data. The bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

Different types of NAL units may encapsulate different types of RBSPs. For example, different types of NAL unit may encapsulate different RBSPs for video parameter sets (VPSs), sequence parameter sets (SPSs), picture parameter sets (PPSs), coded slices, supplemental enhancement information (SEI), and so on. NAL units that encapsulate RBSPs for video coding data (as opposed to RBSPs for parameter sets and SEI messages) may be referred to as video coding layer (VCL) NAL units.

In HEVC, SPSs may contain information that applies to all slices of a coded video sequence (CVS). In HEVC, a CVS may start from an instantaneous decoding refresh (IDR) picture, or a broken link access (BLA) picture, or a clean random access (CRA) picture that is the first picture in the bitstream, including all subsequent pictures that are not an IDR or BLA picture. That is, in HEVC, a CVS may comprise a sequence of access units that may consist, in decoding order, of a CRA access unit that is the first access unit in the bitstream, an IDR access unit or a BLA access unit, followed by zero or more non-IDR and non-BLA access units including all subsequent access units up to but not including any subsequent IDR or BLA access unit.

A VPS is a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. For instance, video decoder 30 may use motion vectors of PUs to determine predictive blocks for the PUs of a current CU. In addition, video decoder 30 may inverse quantize coefficient blocks associated with TUs of the current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

As indicated above, video encoder 20 and video decoder 30 may perform inter prediction when encoding or decoding video data. Inter-prediction may also include reference picture list construction. A reference picture list includes the reference pictures or reference frames that are available for performing motion search and motion estimation. Typically, reference picture list construction for the first or second reference picture list of a B picture (bi-directionally predicted picture) includes two steps: reference picture list initialization and reference picture list reordering (modification). Reference picture list initialization is an explicit mechanism that puts the reference pictures in the reference picture memory (also known as a decoded picture buffer (DPB)) into a list based on the order of POC (Picture Order Count) values. A POC value of a picture is aligned with the display order of the picture. The reference picture list reordering mechanism can modify the position of a picture that was put in the list during the reference picture list initialization step to any new position, or put any reference picture in the reference picture memory in any position even if the picture was not put in the initialized list. Some pictures, after the reference picture list reordering (modification), may be put in a position in the list that is very far from the initial position. However, if a position of a picture exceeds the number of active reference pictures of the list, the picture is not considered as an entry of the final reference picture list. The number of active reference pictures may be signaled in the slice header for each list. After reference picture lists are constructed (namely RefPicList0 and RefPicList1, if available), a reference index to a reference picture list can be used to identify any reference picture included in the reference picture list.

Coding a PU using inter-prediction may involve calculating a motion vector between a current block (e.g., PU) and a block in a reference frame. Motion vectors may be calculated through a process called motion estimation (or motion search). For example, a motion vector may indicate the displacement of a PU in a current frame relative to a reference sample of a reference frame. A reference sample may be a block that is found to closely match the portion of the CU including the PU being coded in terms of pixel difference, which may be determined by sum of absolute difference (SAD), sum of squared difference (SSD), or other difference metrics. The reference sample may occur anywhere within a reference frame or reference slice. In some examples, the reference sample may occur at a fractional pixel position. Upon finding a portion of the reference frame that best matches the current portion, the encoder determines the current motion vector for the current block as the difference in the location from the current block to the matching portion in the reference frame (e.g., from the center of the current block to the center of the matching portion).

In some examples, video encoder 20 signals the motion vector for each block in the encoded video bitstream. Video decoder 30 may use the signaled motion vector to perform motion compensation in order to decode the video data. However, signaling the original motion vector directly may result in less efficient coding, as a large number of bits are typically needed to convey the information.

Thus, in some instances, rather than directly signaling the original motion vector, video encoder 20 may predict a motion vector for each partition (e.g., for each PU). In performing this motion vector prediction, video encoder 20 may select a set of candidate motion vectors determined from spatially neighboring blocks in the same frame as the current block or a temporal candidate motion vector determined from a co-located block in a reference frame (i.e., a frame other than the current frame). Video encoder 20 may perform motion vector prediction, and if needed, signal an index to a reference picture to predict the motion vector, rather than signal an original motion vector, to reduce bit rate in signaling. The candidate motion vector vectors from the spatially neighboring blocks may be referred to as spatial MVP candidates, whereas the candidate motion vectors from co-located blocks in another reference frame may be referred to as temporal MVP candidates.

Two different modes or types of motion vector prediction are proposed in the HEVC standard. One mode is referred to as a "merge" mode. The other mode is referred to as advanced motion vector prediction (AMVP). In merge mode, video encoder 20 instructs video decoder 30, through bitstream signaling of prediction syntax, to copy a motion vector, reference index (identifying a reference frame, in a given reference picture list, to which the motion vector points) and the motion prediction direction (which identifies the reference picture list (List 0 or List 1), i.e., in terms of whether the reference frame temporally precedes or follows the currently frame) from a selected candidate motion vector for a current block of the frame. Video encoder 20 may accomplish this by signaling, in the bitstream, an index into a candidate motion vector list. The index may identify the selected candidate motion vector (i.e., the particular spatial MVP candidate or temporal MVP candidate) in the candidate motion vector list. Thus, for merge mode, the prediction syntax may include a flag identifying the mode (in this case "merge" mode) and an index identifying the selected candidate motion vector. In some instances, the candidate motion vector is in a causal block in reference to the current block. In general, a causal block occurs before a current block in coding order. Thus, video decoder 30 has already decoded the candidate motion vector. As such, video decoder 30 has already received and/or determined the motion vector, reference index, and motion prediction direction for the causal block. Accordingly, video decoder 30 may simply retrieve the motion vector, reference index, and motion prediction direction associated with the causal block from memory and copy these values as the motion information for the current block. To reconstruct a block in merge mode, video decoder 30 may obtain the predictive block using the derived motion information for the current block, and may add the residual data to the predictive block to reconstruct the coded block.

In AMVP, video encoder 20 instructs video decoder 30, through bitstream signaling, to only copy the motion vector from the candidate block and use the copied vector as a predictor for a motion vector of the current block, and signals the motion vector difference (MVD). The reference frame and the prediction direction associated with the motion vector of the current block are signaled separately. An MVD is the difference between the current motion vector for the current block and a motion vector predictor derived from a candidate block. In this case, video encoder 20, using motion estimation, may determine an actual motion vector for the block to be coded. Video encoder 20 may then determine the difference between the actual motion vector and the motion vector predictor as the MVD value. In this way, video decoder 30 does not use an exact copy of the candidate motion vector as the current motion vector, as in the merge mode, but may rather use a candidate motion vector that may be "close" in value to the current motion vector determined from motion estimation and add the MVD to reproduce the current motion vector. To reconstruct a block in AMVP mode, the decoder may add the corresponding residual data to reconstruct the coded block.

In most circumstances, an MVD requires fewer bits to signal than an entire current motion vector. As such, AMVP may allow for more precise signaling of the current motion vector while maintaining coding efficiency over sending a whole motion vector. In contrast, merge mode does not allow for the specification of an MVD. As such, merge mode may sacrifice accuracy of motion vector signaling for increased signaling efficiency (i.e., fewer bits). The prediction syntax for AMVP may include a flag for the mode (in this case, an AMVP flag), the index for the candidate block, the MVD between the current motion vector and the predictive motion vector from the candidate block, the reference index, and the motion prediction direction.

Figure 2:
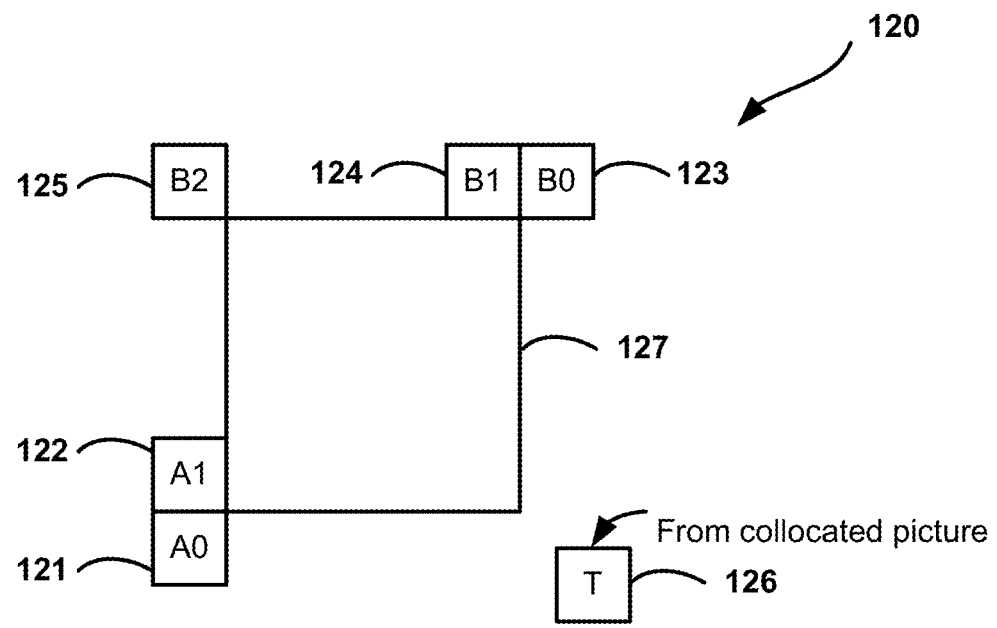
FIG. 2 shows an example set of candidate blocks that may be used in both merge mode and advanced motion vector prediction (AMVP) mode.

FIG. 2 is a conceptual diagram showing an example set of candidate blocks 120 that may be used in both merge mode and AMVP mode. In the example of FIG. 2, the candidate blocks are in the below left (A0) 121, left (A1) 122, left above (B2) 125, above (B1) 124, and right above (B0) 123 spatial positions, and in the temporal (T) 126 position(s). In the example of FIG. 2, the left candidate block 122 is adjacent the left edge of the current block 127. The lower edge of the left block 122 is aligned with the lower edge of the current block 127. The above block 124 is adjacent the upper edge of the current block 127. The right edge of the above block 124 is aligned with the right edge of the current block 127.

As indicated above, a video coder may use temporal neighboring blocks in merge mode and AMVP mode. That is, another technique relates to temporal motion vector predictors (TMVP) or temporal motion vector candidates. To determine a TMVP, initially, a co-located picture is to be identified. The co-located picture is from a different time than the current picture for which the reference picture list is being constructed. If the current picture is a B slice, the syntax element collocated_from_l0_flag may be signaled in a slice header to indicate whether the co-located picture is from RefPicList0 or RefPicList1. After a reference picture list is identified, the syntax element collocated_ref_idx signaled in slice header may be used to identify the picture in the picture in the list.

A co-located PU (e.g., a temporal motion vector candidate) is then identified by checking the co-located picture. Either the motion vector of the right-bottom PU of the CU containing this PU, or the motion of the right-bottom PU within the center PUs of the CU containing this PU is used.

When motion vectors identified by the above process are used to generate a motion candidate for AMVP or merge mode, the motion vectors are typically scaled based on the temporal location (reflected by the POC value). The target reference index of all possible reference picture lists for the temporal merging candidate derived from TMVP is set to 0, while for AMVP, the target reference index is set equal to the decoded reference index.

In HEVC, an SPS may include a flag sps_temporal_mvp_enable_flag and a slice header may include a flag pic_temporal_mvp_enable_flag when sps_temporal_mvp_enable_flag is equal to 1. When both pic_temporal_mvp_enable_flag and temporal_id are equal to 0 for a particular picture, no motion vector from pictures before that particular picture in decoding order would be used as a temporal motion vector predictor in decoding of the particular picture or a picture after the particular picture in decoding order.

As noted above, MVC is an extension of ITU-T H.264/AVC. In multi-view coding, there may be multiple views of the same scene from different viewpoints. The term "access unit" may be used to refer to the set of pictures that correspond to the same time instance. In other words, an access unit may include coded pictures of all of the views for one output time instance. A "view component" may be a coded representation of a view in a single access unit. In some examples, a view component may contain a texture view component and a depth view component. In this disclosure, a "view" may refer to a sequence of view components associated with the same view identifier. Thus, when a view includes both coded texture and depth representations, a view component may comprise (e.g., consist of) a texture view component and a depth view component. In some examples, a texture view component is a coded representation of the texture of a view in a single access unit. Furthermore, in some examples, a depth view component is a coded representation of the depth of a view in a single access unit.

Each texture view component includes actual image content to be displayed. For example, a texture view component may include luma (Y) and chroma (Cb and Cr) components. Each depth view component may indicate relative depths of the pixels in its corresponding texture view component. In some examples, depth view components are gray scale images that include only luma values. In other words, depth view components may not convey any image content, but rather may provide measures of the relative depths of the pixels in corresponding texture view components.

For example, a purely white pixel in a depth view component may indicate that the pixel's corresponding pixel or pixels in the corresponding texture view component are closer, from the perspective of the viewer. In this example, a purely black pixel in the depth view component indicates that the pixel's corresponding pixel or pixels in the corresponding texture view component are further away, from the perspective of the viewer. The various shades of gray in between black and white indicate different depth levels. For instance, a dark gray pixel in a depth view component indicates that the pixel's corresponding pixel in the texture view component is further away than a light gray pixel in the depth view component. In this example, because only gray scale is needed to identify the depth of pixels, depth view component do not need to include chroma components, as the chroma components for the depth view components may not serve any purpose. This disclosure provides the example of depth view components using only luma values (e.g., intensity values) to identify depth for illustration purposes and should not be considered limiting. In other examples, other techniques may be utilized to indicate relative depths of the pixels in texture view components.

In multi-view coding, a bitstream may have a plurality of layers. Each of the layers may correspond to a different view. In multi-view coding, a view may be referred to as a "base view" if a video decoder (e.g., video decoder 30) can decode pictures in the view without reference to pictures in any other view. A view may be referred to as a non-base view if decoding of the view is dependent on decoding of pictures in one or more other views. When coding a picture in one of the non-base views, a video coder (such as video encoder 20 or video decoder 30) may add a picture into a reference picture list if the picture is in a different view but within a same time instance (i.e., access unit) as the picture that the video coder is currently coding. Like other inter prediction reference pictures, the video coder may insert an inter-view prediction reference picture at any position of a reference picture list.

In SVC, layers other than the base layer may be referred to as "enhancement layers" and may provide information that enhances the visual quality of video data decoded from the bitstream. In scalable video coding (e.g., scalable HEVC), a "layer representation" may be a coded representation of a spatial layer in a single access unit. For ease of explanation, this disclosure may refer to view components and/or layer representations as "view components/layer representations."

To implement the layers, headers of NAL units may include nuh_reserved_zero_6bits syntax elements. NAL units that have nuh_reserved_zero_6bit syntax elements that specify different values belong to different layers of a bitstream. Thus, in multi-view coding, 3DV, or SVC, the nuh_reserved_zero_6bits syntax element of a NAL unit specifies a layer identifier (i.e., a layer ID) of the NAL unit.

In some examples, the nuh_reserved_zero_6bits syntax element of a NAL unit is equal to 0 if the NAL unit relates to a base layer in multi-view coding, 3DV coding, or SVC. Data in a base layer of a bitstream may be decoded without reference to data in any other layer of the bitstream. If the NAL unit does not relate to a base layer in multi-view coding, 3DV, or SVC, the nuh_reserved_zero_6bits syntax element of the syntax element may have a non-zero value. As indicated above, in multi-view coding and 3DV coding, different layers of a bitstream may correspond to different views.

Furthermore, some view components/layer representations within a layer may be decoded without reference to other view components/layer representations within the same layer. Thus, NAL units encapsulating data of certain view components/layer representations of a layer may be removed from the bitstream without affecting the decodability of other view components/layer representations in the layer. Removing NAL units encapsulating data of such view components/layer representations may reduce the frame rate of the bitstream. A subset of view components/layer representations within a layer that may be decoded without reference to other view components/layer representations within the layer may be referred to herein as a "sub-layer" or a "temporal sub-layer."

NAL units may include temporal_id syntax elements that specify temporal identifiers (i.e., TemporalIds) of the NAL units. The temporal identifier of a NAL unit identifies a sub-layer to which the NAL unit belongs. Thus, each sub-layer of a bitstream may have a different temporal identifier. In general, if the temporal identifier of a first NAL unit is less than the temporal identifier of a second NAL unit, the data encapsulated by the first NAL unit may be decoded without reference to the data encapsulated by the second NAL unit.

A bitstream may be associated with a plurality of operation points. Each operation point of a bitstream is associated with a set of layer identifiers (e.g., a set of nuh_reserved_zero_6bits values) and a temporal identifier. The set of layer identifiers may be denoted as OpLayerIdSet and the temporal identifier may be denoted as TemporalID. If a NAL unit's layer identifier is in an operation point's set of layer identifiers and the NAL unit's temporal identifier is less than or equal to the operation point's temporal identifier, the NAL unit is associated with the operation point. An operation point representation is a bitstream subset that is associated with an operation point. The operation point representation may include each NAL unit that is associated with the operation point. In some examples, the operation point representation does not include VCL NAL units that are not associated with the operation point.

In some examples, multi-view coding and 3-dimensional video coding may be used to produce a 3-dimensional effect for the viewer. To produce the three-dimensional effect in video, two views of a scene, e.g., a left eye view and a right eye view, may be shown simultaneously or nearly simultaneously. Two pictures of the same scene, corresponding to the left eye view and the right eye view of the scene, may be captured (or generated, e.g., as computer-generated graphics) from slightly different horizontal positions, representing the horizontal disparity between a viewer's left and right eyes. By displaying these two pictures simultaneously or nearly simultaneously, such that the left eye view picture is perceived by the viewer's left eye and the right eye view picture is perceived by the viewer's right eye, the viewer may experience a three-dimensional video effect. Other techniques may also be used to facilitate 3D, such as by creating a composite image that includes both the left eye view and the right eye view in combination. Light polarization (or possibly light color or other light characteristics) may be used to distinguish the right eye view and the left eye view within the composite image, and 3D glasses can filter the image as seen by the right eye and the left eye, so as to create the 3D effect. Multi-view video data may be useful in a variety of different ways for communicating and rendering 3D video.

In general, this disclosure describes techniques for coding and processing multi-view video data, e.g., video data used to produce a three-dimensional (3D) effect. As indicated elsewhere in this disclosure, multi-view video data may include both texture and depth information, where texture information generally describes luminance (brightness or intensity) and chrominance (color, e.g., blue hues and red hues) of a picture. Depth information may be represented by a depth map, in which individual pixels are assigned values that indicate whether corresponding pixels of the texture picture are to be displayed at the screen, relatively in front of the screen, or relatively behind the screen. These depth values may be converted into disparity values when synthesizing a picture using the texture and depth information.

Figure 3:
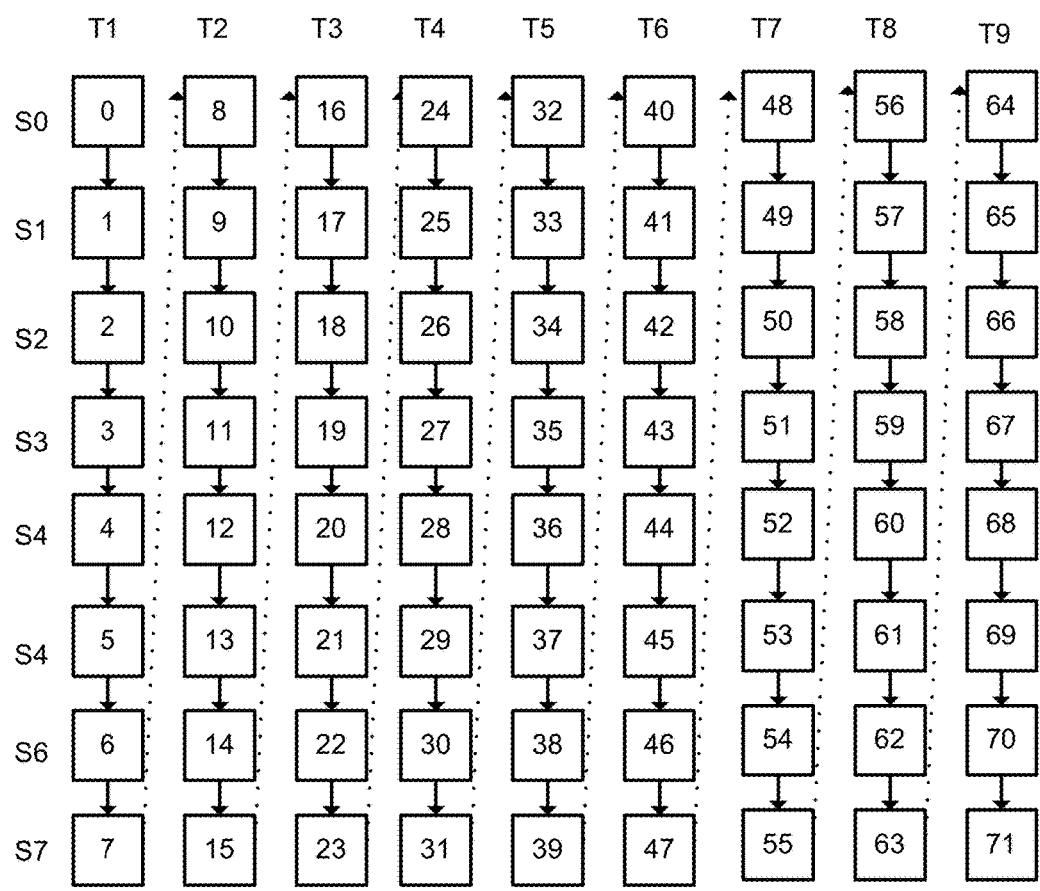
FIG. 3 is a conceptual diagram illustrating an example decoding order for multi-view video.

FIG. 3 is a conceptual diagram illustrating an example multi-view decoding order. In other words, a typical MVC decoding order (i.e., bitstream order) is shown in FIG. 3. In MVC, data for a plurality of views is coded in time-first order. Accordingly, the decoding order arrangement is referred to as time-first coding. In particular, view components (e.g., pictures) for each of the plurality of views at a common time instance may be coded, then another set of view components for a different time instance may be coded, and so on. The decoding order of access units is not necessarily identical to the output (or display) order of pictures in the access units.

The decoding order arrangement shown in FIG. 3 is referred as time-first coding. In FIG. 2, S0-S7 each refer to different views of the multi-view video. T0-T9 each represent one output time instance. As indicated above, an access unit may include the coded pictures of all the views for one output time instance. For example, a first access unit may include all of the views S0-S7 for time instance T0, a second access unit may include all of the views S0-S7 for time instance T1, and so forth.

In FIG. 3, each of the views includes sets of pictures. For example, view S0 includes a set of pictures 0, 8, 16, 24, 32, 40, 48, 56, and 64, view S1 includes a set of pictures 1, 9, 17, 25, 33, 41, 49, 57, and 65, and so forth. Each set includes two pictures: one picture is referred to as a texture view component, and the other picture is referred to as a depth view component. The texture view component and the depth view component within a set of pictures of a view may be considered as corresponding to one another. For example, the texture view component within a set of pictures of a view is considered as corresponding to the depth view component within the set of the pictures of the view, and vice-versa (i.e., the depth view component corresponds to its texture view component in the set, and vice-versa). As used in this disclosure, a texture view component that corresponds to a depth view component may be considered as the texture view component and the depth view component being part of a same view of a single access unit.

Figure 4:
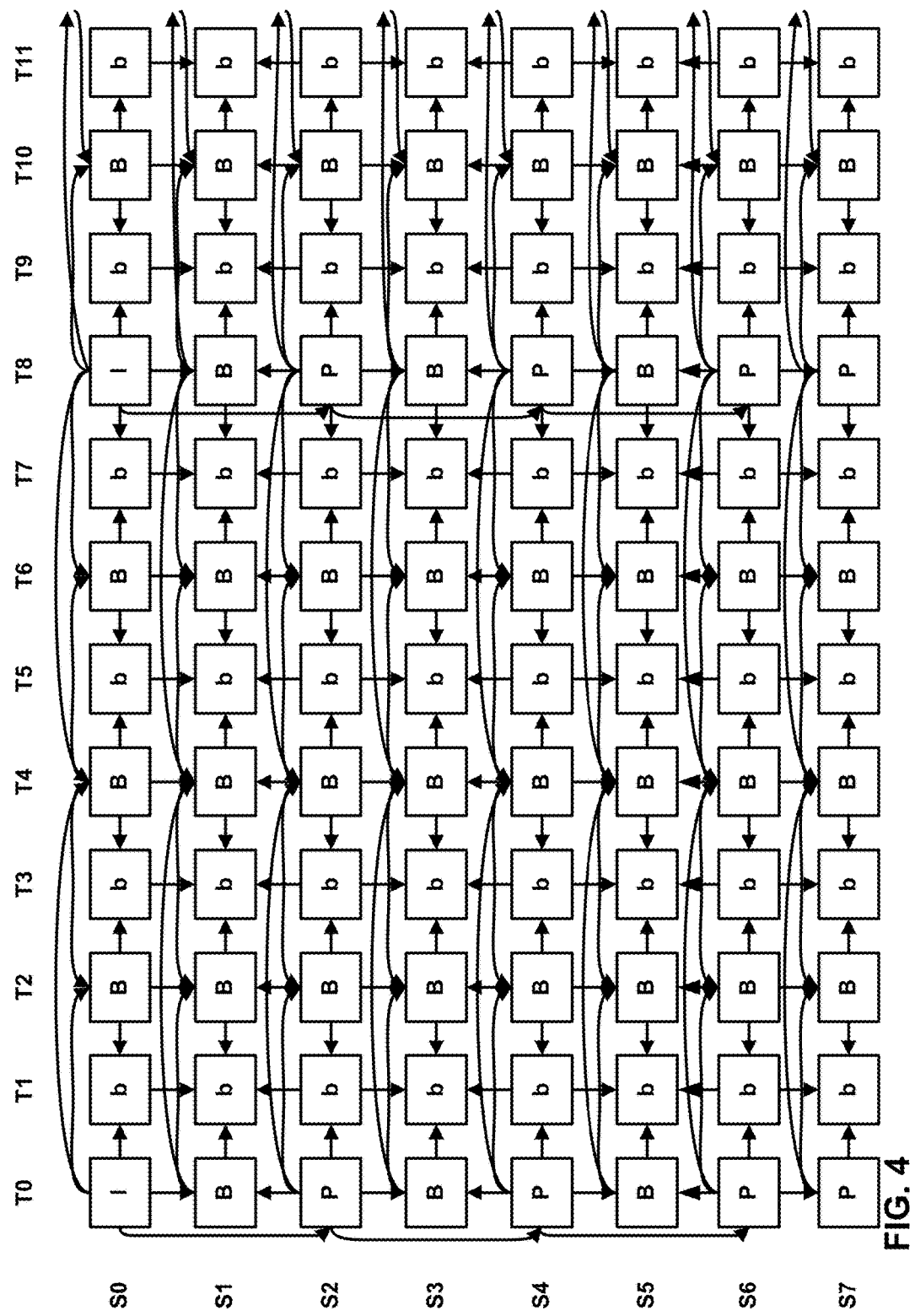
FIG. 4 is a conceptual diagram illustrating an example prediction structure for multi-view video.

FIG. 4 is a conceptual diagram illustrating an example prediction structure for multi-view coding. In other words, a typical MVC prediction structure (including both inter-picture prediction within each view and inter-view prediction) for multi-view video coding is shown in FIG. 4. Prediction directions are indicated by arrows, the pointed-to object using the pointed-from object as the prediction reference. In MVC, inter-view prediction is supported by disparity motion compensation, which uses the syntax of the H.264/AVC motion compensation, but allows a picture in a different view to be used as a reference picture. The example of FIG. 4 illustrates eight views (having view IDs "S0" through "S7") and twelve temporal locations ("T0" through "T11") for each view. That is, each row in FIG. 4 corresponds to a view, while each column indicates a temporal location. Pictures in FIG. 4 are indicated at the intersection of each row and each column. The H.264/AVC standard may use the term frame to represent a portion of the video. This disclosure may use the term picture and frame interchangeably.

The pictures in FIG. 4 are illustrated using a block including a letter, the letter designating whether the corresponding picture is intra-coded (that is, an I-picture), or inter-coded in one direction (that is, as a P-picture) or in multiple directions (that is, as a B-picture). In general, predictions are indicated by arrows, where the pointed-to pictures use the pointed-from picture for prediction reference. For example, the P-picture of view S2 at temporal location T0 is predicted from the I-picture of view S0 at temporal location T0.

As with single view video encoding, pictures of a multi-view video coding video sequence may be predictively encoded with respect to pictures at different temporal locations. For example, the b-picture of view S0 at temporal location T1 has an arrow pointed to it from the I-picture of view S0 at temporal location T0, indicating that the b-picture is predicted from the I-picture. Additionally, however, in the context of multi-view video encoding, pictures may be inter-view predicted. That is, a view component can use the view components in other views for reference. In MVC, for example, inter-view prediction is realized as if the view component in another view is an inter-prediction reference. The potential inter-view references are signaled in an SPS MVC extension (i.e., an extension of an SPS for syntax elements related to MVC) and can be modified by the reference picture list construction process, which enables flexible ordering of the inter-prediction or inter-view prediction references. Inter-view prediction is also a feature of proposed multi-view extension of HEVC, including 3D-HEVC (multi-view plus depth).

Although MVC has a so-called base view, which is decodable by H.264/AVC decoders, and stereo view pairs could be supported also by MVC, an advantage of MVC is that it could support an example that uses more than two views as a 3D video input and decodes this 3D video represented by the multiple views. Coding of two views could also be supported also MVC. One of the advantages of MVC is that an MVC encoder could take more than two views as a 3D video input and an MVC decoder can decode such a multi-view representation. A renderer of a client having an MVC decoder may expect 3D video content with multiple views.

In MVC, inter-view prediction is allowed among pictures in the same access unit (i.e., with the same time instance). When coding a picture in one of the non-base views, a picture may be added into a reference picture list if it is in a different view, but within the same time instance. An inter-view reference picture can be put in any position of a reference picture list, just like any inter prediction reference picture. When an inter-view reference picture is used for motion compensation, the corresponding motion vector is referred to as a "Disparity Motion Vector." As shown in FIG. 4, a view component can use the view components in other views for reference. In MVC, inter-view prediction is realized as if the view component in another view was an inter-prediction reference.

FIG. 4 provides various examples of inter-view prediction. Pictures of view S1, in the example of FIG. 4, are illustrated as being predicted from pictures at different temporal locations of view S1, as well as inter-view predicted from pictures of views S0 and S2 at the same temporal locations. For example, the b-picture of view S1 at temporal location T1 is predicted from each of the B-pictures of view S1 at temporal locations T0 and T2, as well as the b-pictures of views S0 and S2 at temporal location T1.

In some examples, FIG. 4 may be viewed as illustrating the texture view components. For example, the I-, P-, B-, and b-pictures illustrated in FIG. 4 may be considered as texture view components for each of the views. In accordance with the techniques described in this disclosure, there may be a corresponding depth view component for each of the texture view components illustrated in FIG. 4. In some examples, the depth view components may be predicted in a manner similar to that illustrated in FIG. 4 for the corresponding texture view components.

Figure 5:
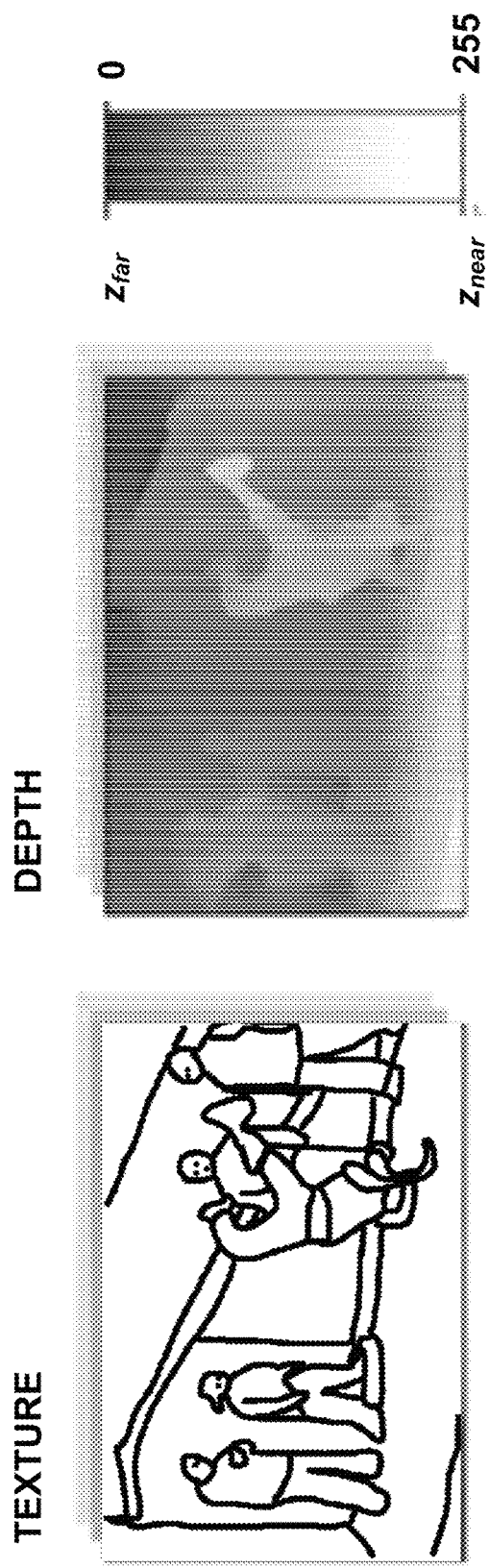
FIG. 5 is a conceptual diagram illustrating textures and depth values for 3-dimensional video.

Another type of multi-view video coding format introduces the use of depth values. For the multi-view-video-plus-depth (MVD) data format, texture images and depth maps can be coded with multi-view texture pictures independently. The MVD data format is popular for 3D television and free viewpoint videos. FIG. 5 is a conceptual diagram illustrating the MVD data format with a texture image and its associated per-sample depth map. The depth range may be restricted to be in the range of minimum $z_{near}$ and maximum $z_{far}$ distance from the camera for the corresponding 3D points.

Camera parameters and depth range values may be helpful for processing decoded view components prior to rendering on a 3D display. Therefore, a special supplemental enhancement information (SEI) message may be defined for the current version of H.264/MVC, i.e., multi-view acquisition information SEI, which includes information that specifies various parameters of the acquisition environment. However, there are no syntaxes specified in H.264/MVC for indicating the depth range related information.

3D video (3DV) may be represented using the Multi-view Video plus Depth (MVD) format, in which a small number of captured texture images of various views (which may correspond to individual horizontal camera positions), as well as associated depth maps, may be coded and the resulting bitstream packets may be multiplexed into a 3D video bitstream.

As in MVC, inter-view prediction based on reconstructed view components from different views is enabled in 3D-HEVC. When a block is coded using inter-view prediction, the type of the reference picture (e.g., temporal or inter-view) to which a TMVP in the co-located picture points, and the type of the target reference picture for the temporal merging candidate (i.e., the target reference picture with a reference index equal to 0 in HEVC) may be different. For example, one reference picture is an inter-view reference picture (type set to disparity) and the other reference picture is a temporal reference picture (type set to temporal). An inter-view reference picture may be a reference picture from another view from the current view being coded. An inter-view reference picture may be from the same time instance (e.g., the same POC) as the picture that the video coder is currently coding (i.e., the current picture) or from a different time reference. A temporal reference picture is a picture from a different time instance as the CU that the video coder is currently coding (i.e., the currently coded CU), but is in the same view as the currently-coded CU). In other examples, such as in particular versions of the 3D-HTM software, the target reference picture for the temporal merging candidate can be set to 0 or equal to the value of the reference picture index of the left neighboring PU relative to the currently coded PU. Therefore, the target reference picture index for the temporal merging candidate may not be equal to 0.

To further improve the coding efficiency, two new technologies namely "inter-view motion prediction" and "inter-view residual prediction" have been adopted in the latest reference software for 3D-HEVC. Inter-view motion prediction and inter-view residual prediction use motion vector candidates and CUs in different views from the currently coded view. The views used for motion search, motion estimation, and motion vector prediction may be from the same time instance as the currently coded view or may be from a different time instance. To enable these two coding tools, the first step is to derive a disparity vector. A video coder may use the disparity vector either to locate a corresponding block in another view for inter-view motion/residual prediction or to convert the disparity vector to a disparity motion vector for inter-view motion prediction.

Another concept used in inter-view motion/residual prediction is an implicit disparity vector (IDV). An IDV may be generated when a PU employs inter-view motion vector prediction (i.e., the candidate for AMVP or merge modes is derived from a corresponding block in the other view with the help of a disparity vector). Such a disparity vector is called an IDV. An IDV is stored to the PU for the purpose of disparity vector derivation A video coder may use a method called Neighboring Blocks based Disparity Vector (NBDV) derivation to derive a disparity vector. When a video coder uses NBDV derivation to derive a disparity vector for a block, the video coder checks spatial and temporal neighboring blocks for disparity motion vectors. As indicated above, a disparity motion vector points to a location in an inter-view reference picture. In some examples, the video coder checks the spatial or temporal neighboring blocks in a fixed checking order. In some examples, the video coder checks spatial neighboring blocks first, followed by temporal neighboring blocks.

Once the video coder identifies a disparity motion vector, the video coder may terminate the checking process, may return the identified disparity motion vector, and may convert the disparity motion vector to a disparity vector that the video coder may use in inter-view motion prediction and inter-view residual prediction. If the video coder does not find a disparity motion vector after checking all the pre-defined neighboring blocks, the video coder may use a zero disparity vector for inter-view motion prediction, while inter-view residual prediction may be disabled for the corresponding PU (i.e., the block for which the video coder is determining the disparity vector).

In some examples, the video coder checks five spatial neighboring blocks for disparity vector derivation. The five spatial neighboring blocks are the below-left, left, above-right, above and above-left blocks of the current PU, denoted by $A_0$, $A_1$, $B_0$, $B_1$ or $B_2$, as defined in FIG. 2. In some examples, the video coder checks the five spatial neighboring blocks in the order of $A_1$, $B_1$, $B_0$, $A_0$ and $B_2$. If one of the neighboring blocks uses a disparity motion vector, the video coder may terminate the checking process and may use the corresponding disparity motion vector as the final disparity vector.

Figure 6:
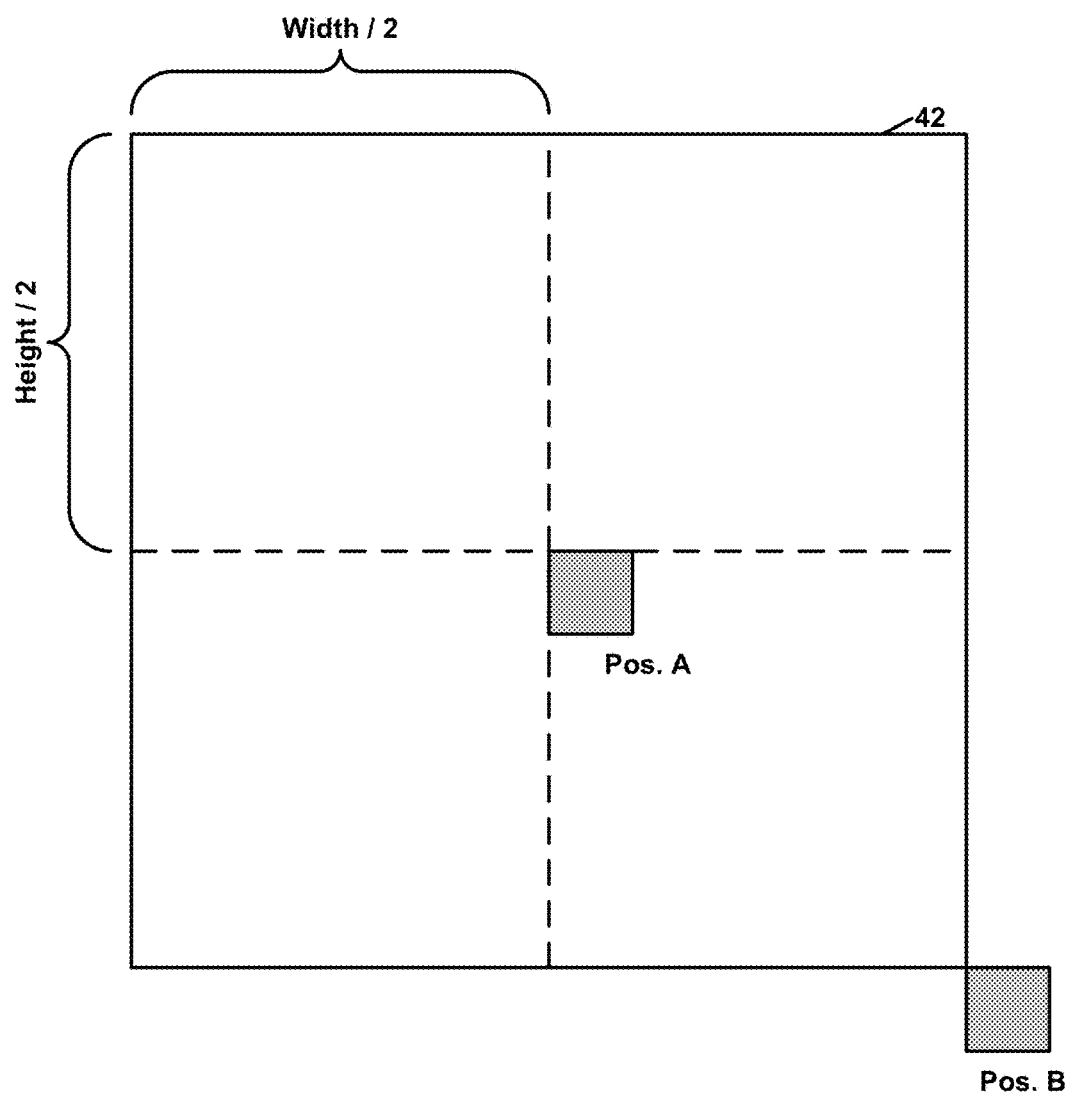
FIG. 6 is a conceptual diagram illustrating temporal neighboring blocks for neighboring blocks disparity vector derivation.

In some examples, the video coder may consider up to two reference pictures from the current view, the co-located picture, and the random-access picture or the reference picture with the smallest POC difference and smallest temporal ID, for temporal block checks. The video coder may check a random-access picture first, followed by the co-located picture. In general, a random access picture (i.e., a random access point (RAP) picture) is a picture at which a video coder may start a decoding process for a bitstream other than the beginning of the bitstream. FIG. 6 is a conceptual diagram illustrating temporal neighboring blocks for neighboring blocks disparity vector derivation. In the example of FIG. 6, the video coder may check two candidate blocks for each candidate picture:

a) Center block (CR): The center 4×4 block of the co-located region of the current PU, see 'Pos. A' in FIG. 6.

b) Bottom Right block (BR): Bottom-right 4×4 block of co-located region of the current PU, see 'Pos. B' in FIG. 6.

In some examples, for each candidate picture, the video coder checks the two blocks in order, CR and BR for the first non-base view, or BR and then CR for the second non-base view. If one of the blocks has a disparity motion vector, the video coder may terminate the checking process and may use the corresponding disparity motion vector as the final disparity vector.

If none of the spatial or temporal neighboring blocks has a disparity motion vector, the video coder may determine whether any of the five spatial neighboring blocks has an IDV. In other words, whether disparity motion vectors are used is first checked for all the spatial/temporal neighboring blocks, followed by IDVs. In some examples, when the video coder checks whether any of the five spatial neighboring blocks has an IDV, the video coder may check the five spatial neighboring blocks in the order of $A_0$, $A_1$, $B_0$, $B_1$ and $B_2$. If one of the five spatial neighboring blocks uses an IDV and the spatial neighboring block is coded as skip/merge mode, the video coder may terminate the checking process and may use the corresponding IDV as the final disparity vector.

In some examples, a video coder may further refine a disparity vector generated from the NBDV scheme using information in a coded depth map. For instance, the accuracy of the disparity vector could be enhanced by taking advantage of the information coded in a base view depth map. In some examples, the refinement steps are described as follows. First, locate a corresponding depth block by the derived disparity vector in the previously coded reference depth view, such as the base view; the size of the corresponding depth block is the same as that of the current PU. Second, the video coder calculates a disparity vector from the collocated depth block using the maximum value of the four corner depth values. The video coder sets the calculated disparity vector equal to the horizontal component of a disparity vector, while the video coder sets the vertical component of the disparity vector to 0.

This new disparity vector is called "depth oriented neighboring block based disparity vector (DoNBDV)." The video coder may then replace the disparity vector from the NBDV scheme by this newly derived disparity vector from the DoNBDV scheme for inter-view candidate derivation for the AMVP and merge modes. The video coder may use the unrefined disparity vector for inter-view residual prediction. In addition, the video coder may store the refined disparity vector as a motion vector of one PU if the PU is coded with backward view synthesis prediction (VSP) mode.

Block-based view synthesis prediction (VSP) using neighboring blocks in 3D-HEVC is now be discussed. The backward-warping VSP approach as proposed in Tian et al., "CE1.h: Backward View Synthesis Prediction using Neighbouring Blocks" (hereinafter, JCT3V-C0152) was adopted in the 3rd JCT-3V meeting. A copy of JCT3V-C0152 is available, as of Mar. 26, 2014, at http://phenix.int-evry.fr/jct3v/doc_end_user/current_document.php?id=594. The basic idea of backward-warping VSP (BVSP) is the same as the block-based VSP in 3D-AVC. Both of these two techniques use the backward-warping and block-based VSP to avoid transmitting the motion vector differences and to use more precise motion vectors. Implementation details are different due to different platforms.

In the following paragraphs, the term BVSP indicates the backward-warping VSP approach in 3D-HEVC. In 3D-HTM, texture first coding is applied in common test conditions. Therefore, the corresponding non-base depth view is unavailable when decoding one non-base texture view. Therefore, the depth information is estimated and used to perform BVSP. In order to estimate the depth information for a block, it is proposed to first derive a disparity vector from the neighboring blocks, and then use the derived disparity vector to obtain a depth block from a reference view.

The HTM 5.1 test model uses NBDV derivation to derive a disparity vector predictor. For NBDV derivation, let (dvx, dvy) denote the disparity vector identified from the NBDV derivation, and the current block position is (blockx, blocky). It is proposed to fetch a depth block at (blockx+dvx, blocky+dvy) in the depth image of the reference view. The fetched depth block would have the same size of the current prediction unit (PU). The video coder may then use the fetched depth block to perform backward warping for the current PU.

Figure 7:
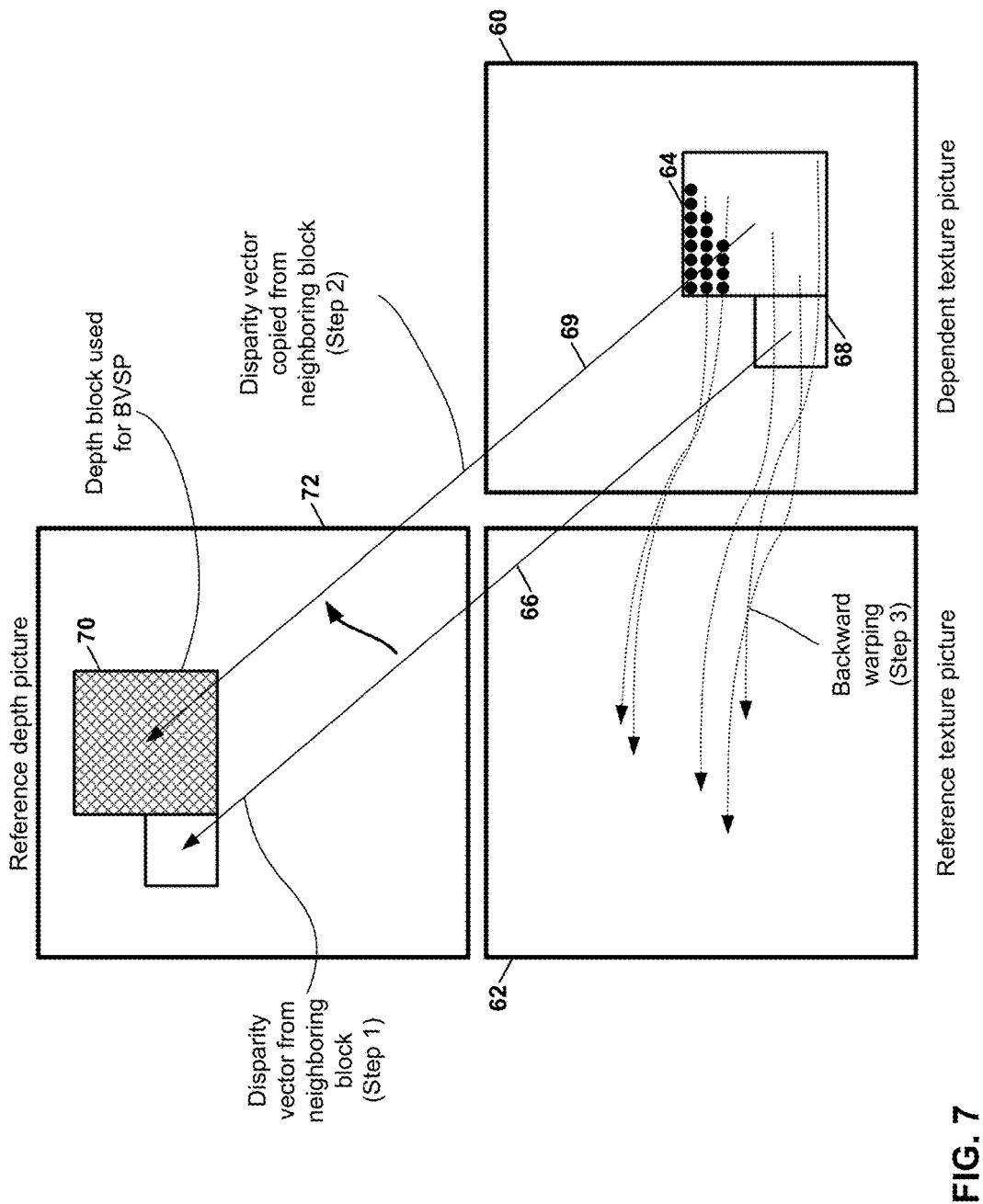
FIG. 7 is a conceptual diagram illustrating depth block derivation from a reference view in block-based view synthesis prediction.

FIG. 7 illustrates the three steps how a depth block from the reference view is located and then used for BVSP prediction. In the example of FIG. 7, a video coder is coding a current texture picture 60. Current texture picture 60 is labeled a "dependent texture picture" because current texture picture 60 is dependent on a synthesized reference texture picture 62. In other words, the video coder may need to synthesize reference texture picture 62 in order to decode current texture picture 60. Reference texture picture 62 and current texture picture 60 are in the same access unit but are in different views.

In order to synthesize reference texture picture 62, the video coder may process blocks (i.e., video units) of current texture picture 60. In the example of FIG. 7, the video coder is processing a current block 64. When the video coder processes current block 64, the video coder may perform the NBDV derivation process to derive a disparity vector for current block 64. For instance, in the example of FIG. 7, the video coder identifies a disparity vector 66 of a block 68 that neighbors current block 64. The identification of disparity vector 66 is shown as Step 1 of FIG. 7. Furthermore, in the example of FIG. 7, the video coder determines, based on disparity vector 66, a disparity vector 69 of current block 64. For instance, disparity vector 69 may be a copy of disparity vector 66. Copying disparity vector 66 is shown as Step 2 of FIG. 7.

The video coder may identify, based on disparity vector 69 of current block 64, a reference block 70 in a reference depth picture 72. Reference depth picture 72, current texture picture 60, and reference texture picture 62 may each be in the same access unit. Reference depth picture 72 and reference texture picture 62 may be in the same view. The video coder may determine, based on texture sample values of current block 64 and depth sample values of reference block 70, texture sample values of reference texture picture 62. The process of determining the texture sample values may be referred to as backward warping. Section H.8.5.2.2.7 of 3D-HEVC Test Model 3 describes the process of backward warping. Backward warping is shown as Step 3 of FIG. 7. In this way, FIG. 7 illuminates the three steps of how a depth block from the reference view is located and then used for BVSP prediction.

If BVSP is enabled in the sequence, the NBDV process for inter-view motion prediction is changed and the differences are shown in bold italics in the following paragraphs:

For each of the temporal neighboring blocks, if the temporal neighboring block uses a disparity motion vector, the video coder returns the disparity motion vector as the disparity vector and the disparity vector is further refined as described above.

For each of the spatial neighboring blocks, the following apply:

For each reference picture list 0 or reference picture list 1, the following applies: If the spatial neighboring block uses a disparity motion vector, the video coder returns the disparity motion vector as the disparity vector and the video coder further refines the disparity vector with the method described above.

Otherwise, if the spatial neighboring block uses BVSP mode, the video coder returns the associated motion vector as the disparity vector. The video coder further refines the disparity vector in a similar way as above. However, the video coder selects the maximum depth value from all pixels of the corresponding depth block rather than four corner pixels.

For each of the spatial neighboring blocks, if the spatial neighboring block uses an IDV, the video coder returns the IDV as the disparity vector and the video coder further refined the disparity vector with the method described above.

The introduced BVSP mode is treated as a special inter-coded mode and a flag indicating the usage of BVSP mode should be maintained for each PU. Rather than signaling the flag in the bitstream, the video coder may add a new merging candidate (i.e., BVSP merging candidate) to a merge candidate list and the flag is dependent on whether the decoded merge candidate index corresponds to a BVSP merging candidate. The BVSP merging candidate may be defined as follows:

Reference picture index for each reference picture list: −1

Motion vector for each reference picture list: the refined disparity vector

The inserted position of the BVSP merging candidate may be dependent on the spatial neighboring blocks. For instance, if any of the five spatial neighboring blocks (i.e., $A_0, A_1, B_0, B_1$ or $B_2$) is coded with the BVSP mode (i.e., the maintained flag of the neighboring block is equal to 1), the video coder may treat the BVSP merging candidate as the corresponding spatial merging candidate and may insert the BVSP merging candidate into the merge candidate list. The video coder may only insert the BVSP merging candidate into the merge candidate list once. Otherwise, if none of the five spatial neighboring blocks is coded with the BVSP mode, the video coder inserts the BVSP merging candidate into the merge candidate list immediately before the temporal merging candidates. During the combined bi-predictive merging candidate derivation process, the video coder checks additional conditions to avoid including the BVSP merging candidate.

For each BVSP-coded PU with its size denoted by N×M, the BVSP-coded PU is further partitioned into several sub-regions with the size equal to K×K (wherein K may be 4 or 2). For each sub-region, a separate disparity motion vector is derived and each sub-region is predicted from one block located by the derived disparity motion vector in the inter-view reference picture. In other words, the size of a motion-compensation unit for BVSP coded PUs are set to K×K. In common test conditions, K is set to 4.

This section discusses the disparity motion vector derivation process. For each sub-region (4×4 block) within one PU coded with BVSP mode, a corresponding 4×4 depth block is firstly located in the reference depth view with the refined disparity vector aforementioned above. Next, the video coder selects the maximum value of the sixteen depth pixels in the corresponding depth block. Next, the video coder converts the maximum value to the horizontal component of a disparity motion vector. The video coder sets the vertical component of the disparity motion vector to 0.

The next section of this disclosure discusses the inter-view candidate derivation process for skip/merge mode. Based on the disparity vector derived from DoNBDV scheme, a new motion vector candidate, (i.e., an Inter-view Predicted Motion Vector Candidate (IPMVC)), if available, may be added to AMVP and skip/merge modes. The inter-view predicted motion vector, if available, is a temporal motion vector. Because the skip mode has the same motion vector derivation process as merge mode, some or all techniques described in this document may apply to both merge and skip modes.

For the merge/skip mode, a video coder may derive the inter-view predicted motion vector by the following steps. First, the video coder uses the disparity vector to locate a corresponding block of a current PU/CU in a reference view of the same access unit. If the corresponding block is not intra-coded and not inter-view predicted and the reference picture of the corresponding block has a POC value equal to that of one entry (i.e., a reference picture) in the same reference picture list of the current PU/CU, the video coder may derive motion information (prediction direction, reference pictures, and motion vectors), after converting the reference index based on POC, to be the inter-view predicted motion vector.

Figure 8:
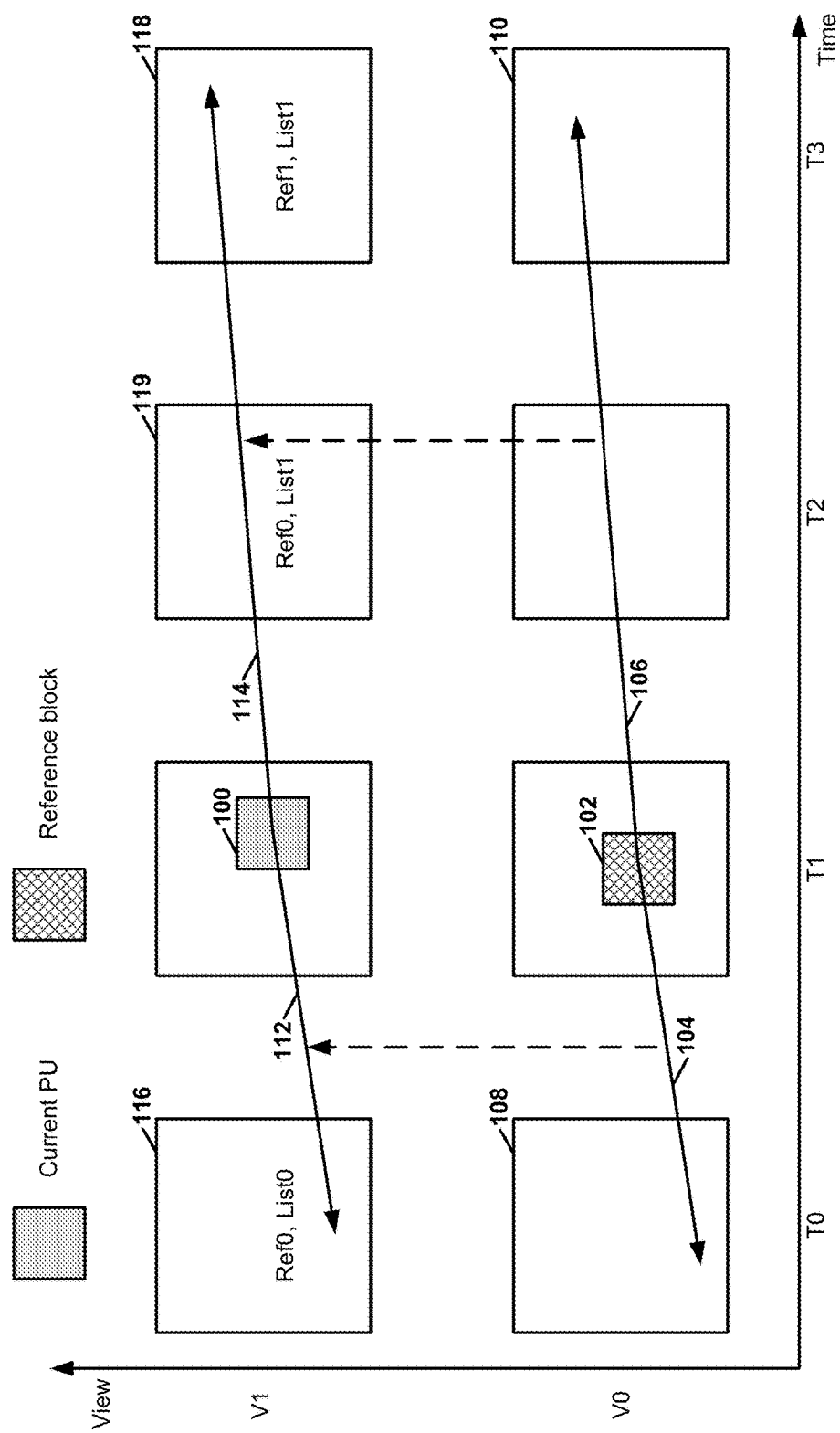
FIG. 8 is a conceptual diagram illustrating an example derivation process of an inter-view predicted motion vector candidate.

FIG. 8 shows an example of the derivation process of the inter-view predicted motion vector candidate. A disparity vector is calculated by finding a corresponding block 102 in a different view (e.g., view 0 or V0) to a current PU 100 in the currently coded view (view 1 or V1). If corresponding block 102 is not intra-coded and not inter-view predicted, and its reference picture has a POC value that is in the reference picture list of current PU 100 (e.g., Ref0, List 0; Ref0, List1; Ref1, List 1, as shown in FIG. 8), then the motion information for corresponding block 102 is used as an inter-view predicted motion vector. The video coder may scale the reference index based on the POC.

In the example of FIG. 8, a current PU 100 occurs in view V1 at a time instance T1. A reference PU 102 for current PU 100 occurs in a different view than current PU 100 (i.e., view V0) and at the same time instance as current PU 100 (i.e., time instance T1). In the example of FIG. 8, reference PU 102 is bi-directionally inter predicted. Hence, reference PU 102 has a first motion vector 104 and a second motion vector 106. Motion vector 104 indicates a position in a reference picture 108. Reference picture 108 occurs in view V0 and in time instance T0. Motion vector 106 indicates a position in reference picture 110. Reference picture 110 occurs in view V0 and in time instance T3.

The video coder may generate, based on the motion information of reference PU 102, an IPMVC for inclusion in a merge candidate list of current PU 100. The IPMVC may have a first motion vector 112 and a second motion vector 114. Motion vector 112 matches motion vector 104 and motion vector 114 matches motion vector 106. The video coder generates the IPMVC such that a first reference index of the IPMVC indicates a position in RefPicList0 for current PU 100 of a reference picture (i.e., reference picture 116) occurring in the same time instance as reference picture 108 (i.e., time instance T0). In the example of FIG. 8, reference picture 116 occurs in the first position (i.e., Ref0 ) in RefPicList0 for current PU 100. Furthermore, the video coder generates the IPMVC such that a second reference index of the IPMVC indicates a position in RefPicList1 for current PU 100 of a reference picture (i.e., reference picture 118) occurring in the same time instance as reference picture 110. Thus, in the example of FIG. 8, the RefPicList0 reference index of the IPMVC may be equal to 0. In the example of FIG. 8, a reference picture 119 occurs in the first position (i.e., Ref0) in RefPicList1 for current PU 100 and reference picture 118 occurs in the second position (i.e., Ref1) in RefPicList1 for current PU 100. Thus, the RefPicList1 reference index of the IPMVC may be equal to 1.

If the inter-view predicted motion vector candidate is not available (e.g., corresponding block 102 is intra-coded or inter-view predicted), the video coder may convert the disparity vector to an inter-view disparity motion vector, which the video coder adds into the AMVP or merge candidate list in the same position as an inter-view predicted motion vector candidate when it is available. The resulting candidate may be referred to as an Inter-view Disparity Motion Vector Candidate (IDMVC). Thus, the IDMVC may specify the disparity vector of the current block. Either the inter-view predicted motion vector or the inter-view disparity motion vector may be called an "inter-view candidate" in this context.

In AMVP mode, if the target reference index corresponds to a temporal motion vector, the video coder finds the IPMVC by checking the motion vectors in the corresponding block of the current PU located by the disparity vector. If the IPMVC is unavailable, the video coder adds a zero motion vector candidate to the candidate list. In AMVP mode, if the target reference index corresponds to a disparity motion vector, the video coder does not derive the IPMVC, but the video coder converts the disparity vector to an inter-view disparity motion vector and adds the inter-view disparity motion vector to the candidate list.

In the merge/skip mode, the video coder always inserts the IPMVC, if available, into the merge candidate list before all spatial and temporal merging candidates. The video coder inserts the IDMVC before the spatial merging candidate derived from $A_0$. Some version of the 3D-HTM software always insert the inter-view predicted motion vector or inter-view disparity motion vector before all spatial and temporal candidates in the AMVP candidate list.

The next section of this disclosure discusses merge candidate list construction in 3D-HEVC. First, the video coder derives a disparity vector with the method of DoNBDV. If the video coder does not find such a disparity vector, the video coder uses a zero disparity vector. With the disparity vector, the merging candidate list construction process in 3D-HEVC can be defined as follows:

1. IPMVC insertion.
    The video coder derives the IPMVC by the procedure described above. If the IPMVC is available, the video coder inserts the IPMVC into the merge list.
2. Derivation process for spatial merging candidates and IDMVC insertion in 3D-HEVC.

Check the motion information of spatial neighboring PUs in the following order: $A_1$, $B_1$, $B_0$, $A_0$, or $B_2$. The video coder performs constrained pruning by the following procedures:

If $A_1$ and IPMVC have the same motion vectors and the same reference indices, the video coder does not insert $A_1$ into the candidate list; otherwise the video coder inserts $A_1$ into the candidate list.

If $B_1$ and $A_1$/IPMVC have the same motion vectors and the same reference indices, the video coder does not insert $B_1$ into the candidate list; otherwise the video coder inserts $B_1$ into the candidate list.

If $B_0$ is available, the video coder adds $B_0$ to the candidate list. IDMVC is derived by the procedure described above. If the IDMVC is available and the IDMVC is different from the candidates derived from $A_1$ and $B_1$, the video coder inserts the IDMVC into the candidate list.

If BVSP is enabled for the whole picture or for the current slice, the video coder then inserts the BVSP merging candidate into the merge candidate list.

If $A_0$ is available, the video coder adds $A_0$ to the candidate list.

If $B_2$ is available, the video coder adds $B_2$ to the candidate list.

3. Derivation process for temporal merging candidate.
Similar to the temporal merging candidate derivation process in HEVC where the motion information of the co-located PU is utilized.

4. Derivation process for combined bi-predictive merging candidates in 3D-HEVC.
If the total number of candidates derived from the above two steps is less than the maximum number of candidates, the video coder performs the same process as defined in HEVC WD 10 (and/or other versions of HEVC), except for the specification of l0CandIdx and l1CandIdx. The relationship among combIdx, l0CandIdx and l1CandIdx are defined in the table shown in FIG. 9. The relationship among combIdx, l0CandIdx and l1CandIdx are defined in the table shown in FIG. 9. In other words, FIG. 9 is an example table that indicates an example specification of l0CandIdx and l1CandIdx.

5. Derivation process for zero motion vector merging candidates
The video coder performs the same procedure as defined in HEVC.

In some versions of the software for 3D-HEVC, the total number of candidates in the merge list is up to 6 and five_minus_max_num_merge_cand is signaled to specify the maximum number of the merge candidates subtracted from 6 in slice header. five_minus_max_num_merge_cand is in the range of 0 to 5, inclusive.

In another example of generating a merge candidate list, a disparity vector is first derived with the method of DoN-BDV. If such a disparity vector is not found, a zero disparity vector is utilized. With the disparity vector, the merging candidate list construction process in 3D-HEVC can be defined as follows:

1. IPMVC insertion
IPMVC is derived by the procedure described above. If the IPMVC is available, the IPMVC is inserted to the merge list.

2. Derivation process for spatial merging candidates and IDMVC insertion in 3D-HEVC Check the motion information of spatial neighboring PUs in the following order: A1, B1, B0, A0, or B2. Constrained pruning is performed by the following procedures:

If A1 and IPMVC have the same motion vectors and the same reference indices, A1 is not inserted into the candidate list; otherwise it is inserted into the list.

If B1 and A1/IPMVC have the same motion vectors and the same reference indices, B1 is not inserted into the candidate list; otherwise it is inserted into the list.

If B0 is available, it is added to the candidate list. IDMVC is derived by the procedure described above. If it is available and it is different from the candidates derived from A1 and B1, it is inserted to the candidate list.

If BVSP is enabled for the whole picture or for the current slice, then the BVSP merging candidate is inserted to the merge candidate list.

If A0 is available, it is added to the candidate list.
If B2 is available, it is added to the candidate list.

3. Derivation process for temporal merging candidate
Similar to the temporal merging candidate derivation process in HEVC where the motion information of the co-located PU is utilized, however, the target reference picture index of the temporal merging candidate may be changed instead of fixing to be 0. When the target reference index equal to 0 corresponds to a temporal reference picture (in the same view) while the motion vector of the co-located PU points to an inter-view reference picture, it is changed to another index which corresponds to the first entry of inter-view reference picture in the reference picture list. On the contrary, when the target reference index equal to 0 corresponds to an inter-view reference picture while the motion vector of the co-located PU points to a temporal reference picture, it is changed to another index which corresponds to the first entry of temporal reference picture in the reference picture list.

4. Derivation process for combined bi-predictive merging candidates in 3D-HEVC
If the total number of candidates derived from the above two steps is less than the maximum number of candidates, the same process as defined in HEVC is performed except the specification of l0CandIdx and l1CandIdx. The relationship among combIdx, l0CandIdx and l1CandIdx are defined in FIG. 9.

5. Derivation process for zero motion vector merging candidates
The same procedure as defined in HEVC is performed.

Alternative Technique for Merge Candidate List Construction in 3D-HEVC

In addition to the methods described above, co-pending U.S. Provisional Application 61/734,929, filed Dec. 7, 2012 (hereinafter, "the '929 application"), and U.S. Provisional Application 61/747,350, filed Dec. 30, 2012 (hereinafter, "the '350 application"), the entire contents of both of which are incorporated by reference herein, describe the following technique. The corresponding block identified by the refined disparity vector in a reference view is used to derive the IPMVC as in the current method. Two shifted disparity vectors are derived if applicable.

Left shifted Disparity Vector (LDV): subtract the disparity vector by 16 for the horizontal component.

Right shifted Disparity Vector (RDV): add the disparity vector by 16 for the horizontal component.

The usage of the LDV/RDV to derive IPMVCs is the same as the disparity vector in the current 3D-HEVC. If the derived IPMVC is available, the derived IPMVC is added into the merge candidate list. Otherwise, the video coder converts a shifted disparity vector to a disparity motion vector to be added into the merge candidate list as follows:

Left candidate: the disparity motion vector candidate is set to a motion vector which has a horizontal component equal to DV[0]−4 and vertical component equal to 0.

Right candidate: the disparity motion vector candidate is set to a motion vector which has a horizontal component equal to DV[0]+4 and vertical component equal to 0.

Additional Merge Candidates Derived from Shifted Disparity Motion Predictors

The following technique was proposed to construct the merge candidate list in Guillemot et al., "Additional merge candidates derived from shifted disparity candidate predictors," Joint Collaborative Team on 3D Video Coding Extension Development of ITU-T SG 16 WP 3 and ISO/IEC JTC 1/SC 29/WG 11, 3$^{rd}$ Meeting, Geneva, CH, 17-23 Jan. 2013, document JCT3V-C0148 (hereinafter, "JCT3V-C0148"). JCT3V-00148 is available, as of Mar. 26, 2014, from http://phenix.int-evey.fr/jct3v/doc_end_user/current_document.php?id=589, and is hereby incorporated by reference herein. In the technique proposed by JCT3V-C0148, the first to third positions of the candidates in the merge list are scanned in order to search for the first disparity motion vector candidate. If such a candidate is available, two new candidates are created by horizontally shifting disparity motion vector by +4 and −4. The generated candidates are inserted in the merge candidate list.

Co-pending U.S. Provisional Application No. 61/808,562, filed Apr. 4, 2013 (hereinafter, "the '562 application"), which is hereby incorporated by reference herein, proposes a technique to construct the merge candidate list. In the proposed technique of the '562 application, two candidates (namely, a left candidate and a right candidate) are generated by following the steps described below.

The disparity vector DV is shifted to derive two shifted disparity vectors, if applicable:
DV is shifted left/right by −4/4 horizontally to derive a LDV/RDV and it is used to derive a left/right IPMC candidate in a reference view.
If the left/right IPMC is unavailable, a candidate, denoted as Disparity Shifted Motion Vector (DSMV) is derived and set to be the left/right candidate. DSMV is derived as follows.
The first available disparity motion vector (DMV) corresponding to the RefPicList0 from the spatial neighboring blocks A1, B1, B0, A0 or B2 is used to derive.
If the DMV is available (that is denoted as 'mv')
 i. DSMV[0]=mv[0], DSMV[1]=mv[1] and DSMV[0][0]−/+=4, reference indices are inherited from the first available candidate (which contains the DMV).
 ii. When BVSP is enabled, DSMV[0][1] is set to 0.
Otherwise, DSMV[0][0]=DV[0]−/+4, DSMV[1][0]=DV[0]−/+4; DSMV[0][1]=0 and DSMV[1][1]=0. The left candidate and right candidate are inserted right before and after the temporal merging candidate, respectively. The left or right candidate is only compared with the IPMVC if it is an inter-view predicted motion vector candidate.

Figure 10:
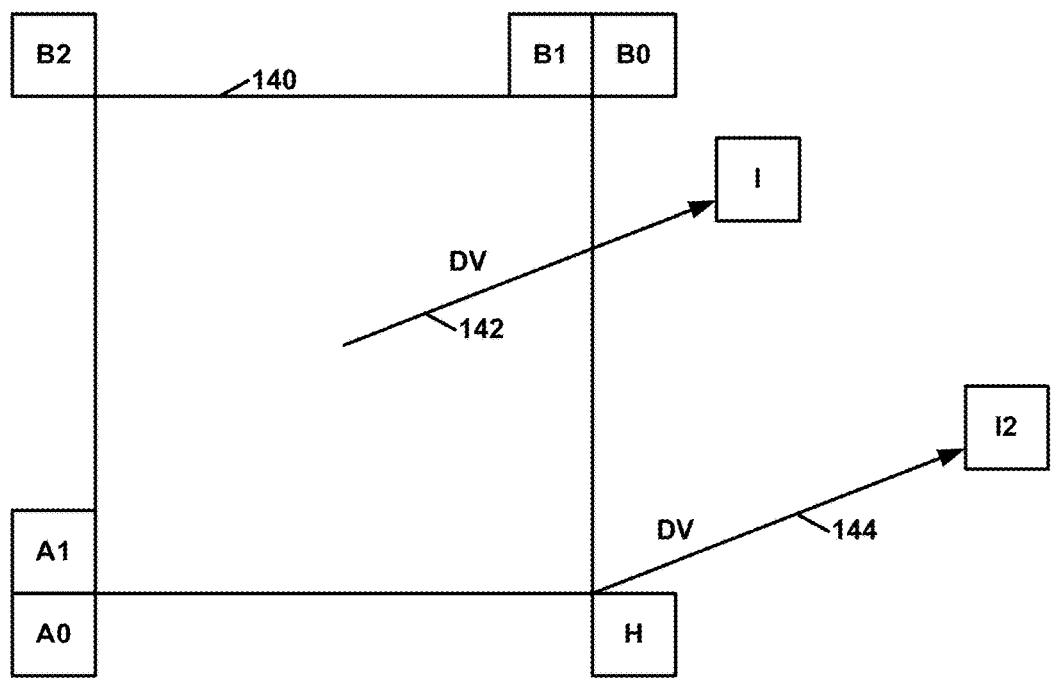
FIG. 10 is a conceptual diagram illustrating the derivation of an additional inter-view candidate for merge/skip mode.

Lin et al., "3D-CE5.h related: Additional inter-view merging candidate," Joint Collaborative Team on 3D Video Coding Extensions of ITU-T SG 16 WP 3 and ISO/IEC JTC 1/SC 29/WG 11, 4$^{th}$ Meeting, Incheon, KR, 20-26 Apr. 2013, document no. JCT3V-D0109 (hereinafter, "JCT3V-D0109") describes a process for including an additional inter-view candidate in a merging candidate list. JCT3V-D0109 is available, as of Mar. 26, 2014, from http://phenix.it-sudparis. eu/jct3v/doc_end_user/current_document.php?id=794, and is hereby incorporated by reference herein. FIG. 10 illustrates a process described in JCT3V-D0109 for including the additional inter-view candidate in the merging candidate list. In other words, FIG. 10 is a conceptual diagram illustrating the derivation of an additional inter-view candidate for merge/skip mode.

In the example of FIG. 10, a current block 140 has a disparity vector 142. Disparity vector 142 indicates a position of a block I in an inter-view reference picture. To derive the additional inter-view candidate a video coder may determine a shifted disparity vector 144. Shifted disparity vector 144 may have the same horizontal and vertical components as disparity vector 142, but the origin point of shifted disparity vector 144 is the position indicated in FIG. 10 by "H." The video coder may then use shifted disparity vector 144 to determine a block 12 in the inter-view reference picture. The additional inter-view candidate may have the motion information of block 12. Thus, in JCT3V-D0109, an additional inter-view predicted motion vector candidate is derived from a corresponding block (I2) which is located as the H position shifted by a disparity vector as shown in FIG. 10. The additional candidate is inserted into the merge candidate list right before the temporal merging candidate, only if the additional candidate is different from the original IPMVC.

Advanced Residual Prediction

As indicated above, 3D-HEVC may support inter-view residual prediction. In some proposals for 3D-HEVC, inter-view residual prediction is realized by the so-called Advanced Residual Prediction (ARP). ARP has been proposed in order to utilize the correlation between the residual signal of two views more efficiently.

Figure 11:
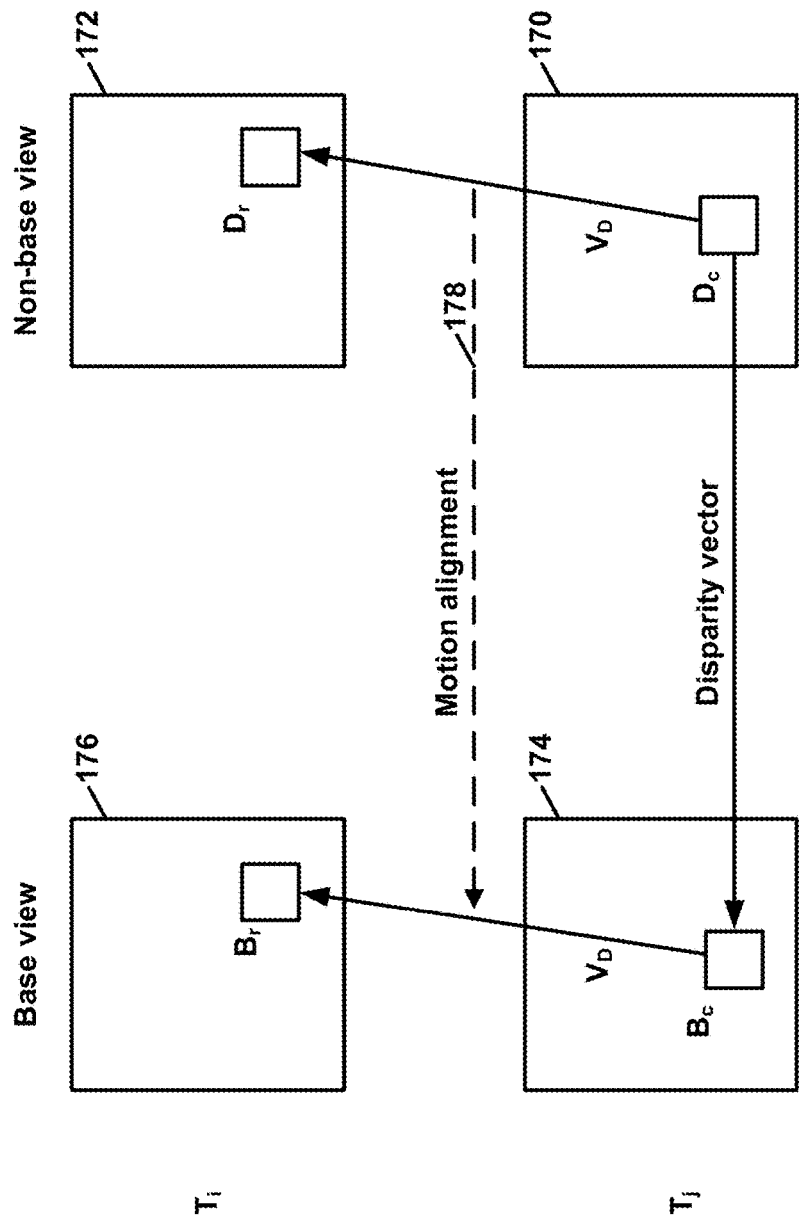
FIG. 11 is a conceptual diagram illustrating the prediction structure of advanced residual prediction.

FIG. 11 is a conceptual diagram illustrating an example prediction structure of ARP in multi-view video coding. In ARP, the residual of the reference block identified with disparity vector is generated on-the-fly, as depicted in FIG. 11, instead of maintaining a residual picture for the reference view and directly predicting the residual within the reference block in the residual picture. FIG. 11 includes four pictures: a current picture 170, a temporal reference picture 172, a disparity reference picture 174, and a temporal-disparity reference picture 176. Current picture 170 is in a non-base view V1 and is in time instance $T_j$. Temporal reference picture 172 is in the non-base view and is in time instance $T_i$. Disparity reference picture 174 is in a base view and is in time instance $T_j$. Temporal-disparity reference picture 176 is in the base view and is in time instance $T_i$.

Current picture 170 includes a current PU denoted as "$D_c$". In other words, $P_c$ represents a current block in a current view (i.e., the non-base view). $D_c$ has a temporal motion vector $V_D$ that indicates a location in temporal reference picture 172. Video encoder 20 may determine a temporal reference block $D_r$ based on samples in picture 172 that are associated with the location indicated by the temporal motion vector $V_D$. Thus, $D_r$ denotes $D_c$'s temporal prediction block from the same view (view 1) at time $T_i$ and $V_D$ denotes the motion from $D_c$ to $D_r$.

Furthermore, video encoder 20 may determine a disparity reference block $B_c$ based on samples in disparity reference picture 174 that are associated with a location indicated by a disparity vector of $D_c$. Thus, $B_c$ denotes a reference block (i.e., the representation of $D_c$ in the reference view (the base view) at time $T_a$). The top-left position of $B_c$ can be calculated with the derived disparity vector by adding the derived disparity vector to the top-left position of $D_c$. Since $D_c$ and $B_c$ may be projections of the same object in two different views, $D_c$ and $B_c$ should share the same motion information. Therefore, $B_c$'s temporal prediction block $B_r$ in view 0 at time $T_i$ can be located from $B_c$ by applying the motion information of $V_D$.

Video encoder 20 may determine a temporal-disparity reference block $B_r$ (the predictive block of $B_c$) in temporal-disparity picture 176. As indicated above, temporal-disparity picture 176 is in the same view (i.e., view V0) as $B_r$ and is in the same time instance as $D_r$ (i.e., time instance $T_i$). Video encoder 20 may determine $B_r$ based on samples at a location indicated by the motion vector $V_D$ of $D_c$. Thus, the top-left position of $B_r$ can be calculated with the re-used motion vector $V_D$ by adding the motion vector $V_D$ to the top-left position of $B_c$. The top-left position of $B_c$ can be equal to the sum of the top-left position of $D_c$ and the disparity vector. Thus, the top-left position of $B_r$ may be equal to the sum of the coordinates of the top-left position of $D_c$, the disparity vector, and the motion vector $V_D$. In this way, as shown in FIG. 11 by arrow 178, video encoder 20 may re-use the motion vector $V_D$ for determining $B_r$. Thus, as shown in FIG. 11, to better predict the residual of the current block in a non-base view, denoted as $D_c$, the reference block $B_c$ is firstly identified by the disparity vector and the motion compensation of the reference block is invoked to derive the residual between the prediction signal $B_r$ and the reconstructed signal of the reference block $B_c$.

Furthermore, in ARP, each sample in a first residual block may indicate the difference between a sample in $D_c$ and a corresponding sample of $D_r$. The first residual block may be referred to as an original residual block for $D_c$. Each sample in a second residual block may indicate a difference between a sample in $B_c$ and a corresponding sample in $B_r$. The second residual block may be referred to as a "residual predictor." Because video encoder 20 uses the motion vector $V_D$ to determine $B_r$, the residual predictor may be different than the actual residual data of $B_c$.

When the ARP mode is invoked, the predicted residual may be added on top of the prediction signal of the non-base view which, in some examples, is generated by motion compensation from the block $D_r$ in the reference picture of the non-base view. One of the advantages of the ARP mode is that the motion vector used by the reference block (when generating the residue for ARP), is aligned with the motion vector of the current block, so the residual signal of the current block can be more precisely predicted. Therefore, the energy of the residue can be significantly reduced. Because quantization difference between base (reference) and non-base views may lead to less prediction accuracy, the video coder may adaptively apply two weighting factors to the residue generated from the reference view: 0.5 and 1.

Furthermore, because additional motion compensation at the base (reference) view may require significant increase of memory access and calculations, several techniques to make the design more practical with minor sacrifice of coding efficiency have been adopted. Firstly, ARP mode is only enabled with respect to a PU when the PU is coded with 2N×2N (i.e., the CU containing the PU only has a single PU) to reduce the computations, especially at video encoder 20. Secondly, bi-linear filters are adopted for the motion compensation of both the reference block and the current block to significantly reduce the memory access for blocks coded with the ARP mode. Thirdly, to improve the cache efficiency, although motion vectors may point to different pictures in the non-base view, the reference picture in the base view is fixed. In this case, the video coder may need to scale the motion vector of the current block based on the picture distances.

The current design of motion related technologies in HEVC-based multi-view/3DV coding has the following problems because the derived disparity vector might not be accurate enough for optimal coding efficiency. As one example, an inaccurate disparity vector may lead to inaccurate inter-view predicted motion vector candidates and inter-view disparity motion vector candidates. Also, the fact that the disparity motion vector of the spatial neighboring candidates $A_0$, $A_1$, $B_0$, $B_1$ or $B_2$ is highly correlated with the disparity motion vector of the current coding PU is not well exploited while creating the merge candidate list.

In view of these drawbacks, this disclosure proposes various techniques to derive more accurate candidates to be added into the merge candidate lists, especially for the non-base texture views of 3D-HEVC.

For clarity of the following descriptions, this disclosure denotes the motion vectors of a prediction unit (block) by mv[0] for reference picture list 0 and mv[1] for reference picture list 1, the disparity vector of the current block by DV, and given shift values by N, M1 and M2, the horizontal and vertical components of one motion vector mv[i] is denoted by mv[i][j] with j being 0 and 1, respectively.

Each of the following examples of this disclosure may be used separately (e.g., the following examples of this disclosure are alternative examples) to generate one additional candidate for one shift direction (with N/M being negative or positive). In some instances, one or more of the following examples may be used in conjunction.

In a first example of this disclosure, a video coder identifies the first one of the spatial neighboring blocks $A_1$, $B_1$, $B_0$, $A_0$, or $B_2$ that has a disparity motion vector in RefPicList0. The video coder may the set the RefPicList0 motion vector of an additional motion vector candidate (MvC) equal to the RefPicList0 disparity motion vector of the identified spatial neighboring block. In addition, the video coder may set the RefPicList 1 motion vector of the MvC equal to the RefPicList1 motion vector of the identified spatial neighboring block. The video coder may then shift the horizontal component of the RefPicList0 motion vector of the MvC. The resulting candidate may be referred to herein as the Disparity Shifted Motion Vector (DSMV) candidate. In other words, the first available disparity motion vector (DMV) corresponding to the RefPicList0 of the spatial neighboring blocks $A_1$, $B_1$, $B_0$, $A_0$ or $B_2$ is used to derive an additional candidate by shifting the horizontal component of the mv[0] (which is the available disparity motion vector) to generate the additional motion vector candidate MvC. This candidate is denoted as Disparity Shifted Motion Vector (DSMV) or the "DSMV candidate."

Thus, in this first example, if the disparity motion vector is available, MvC[0]=mv[0], MvC[1]=mv[1] and MvC[0][0]+=N, reference indices are inherited from the first available candidate (which contains the DMV). In one alternative example, the candidate is combined from DV and the motion vector of the block (which contains the DMV) corresponding to the RefPicList1. That is, MvC[0]=DV, MvC[1]=mv[1] and MvC[0][0]+=N. If the DMV is unavailable, no additional candidates are generated for the fixed N.

In this way, the video coder may determine a first available disparity motion vector among spatial neighboring blocks of a current block of the video data. The first available disparity motion vector corresponds to a first reference picture list (e.g., RefPicList0). Furthermore, the video coder may shift a horizontal component of the first available disparity motion vector to derive the DSMV candidate. The video coder may add the DSMV candidate into a merge candidate list. Furthermore, in some examples, the spatial neighboring blocks include a particular spatial neighboring block and the first available disparity motion vector is a first motion vector of the particular spatial neighboring block. When at least one of the spatial neighboring blocks has a disparity motion vector, the video coder may set a first motion vector of the DSMV candidate to the first motion vector of the particular spatial neighboring block. In addition, the video coder may set a second motion vector of the DSMV candidate to a second motion vector of the particular spatial neighboring block, the second motion vector of the particular spatial neighboring block corresponding to a second reference picture list. The video coder may add an offset to a horizontal component of the first motion vector of the DSMV candidate, thereby effectively shifting the horizontal component of the first available disparity motion vector to derive the DSMV candidate. In some examples, the offset is equal to 4.

In a second example of this disclosure, the video coder may firstly generate the DSMV candidate as described in the first example. If the DSMV candidate is not available, the video coder may generate the DSMV candidate (denoted as MvC) by setting the motion vectors to vectors shifted from disparity vector, more specifically as follows: MvC[0]=DV and MvC[0][0]+=N; MvC[0][1]=0 and MvC[1]=DV and MvC[1][0]+=N; MvC[1][1]=0 and the reference index corresponding to MvC[X] is set to the reference index of the picture in RefPicListX which belongs to the reference view as identified during the NBDV process together with the disparity vector. In an alternative example, the video coder sets the reference index associated with RefPicListX to −1.

In this way, when none of the spatial neighboring blocks has a disparity motion vector, the video coder may set the first motion vector (i.e., MvC[0]) of a DSMV candidate and the second motion vector (i.e., MvC[1]) of the DSMV candidate to a disparity vector (i.e., DV) of the current block. Furthermore, the video coder may add the offset (i.e., N) to the horizontal component (i.e., MvC[0][0]) of the first motion vector of the DSMV candidate and the offset to a horizontal component (i.e., MvC[1][0]) of the second motion vector of the DSMV candidate. The video coder may set a vertical component (i.e., MvC[0][1]) of the first motion vector of the DSMV candidate and a vertical component (i.e., MvC[1][1]) of the second motion vector of the DSMV candidate to 0. In this example, the video coder may perform a process based on neighboring blocks (e.g., an NBDV derivation process, a DoNBDV derivation process, etc.) to determine the disparity vector of the current block. The process may identify a reference view along with the disparity vector of the current block. Furthermore, when none of the spatial neighboring blocks has a disparity motion vector, the video coder may set a reference index corresponding to the first motion vector of the DSMV candidate to a reference index of a picture that is in the first reference picture list and that belongs to the identified reference view. In addition, the video coder may set a reference index corresponding to the second motion vector of the DSMV candidate to a reference index of a picture that is in the second reference picture list and that belongs to the identified reference view.

In a third example of this disclosure, a DSMV candidate is to be generated first according to the first example, above.

In addition, the video coder may also consider an IPMVC from the reference view that is derived from a shifted disparity vector of the current PU/CU to generate the merge candidate list. If an IPMVC from a shifted disparity vector is available, the video coder sets the additional candidate to IPMVC. Otherwise, if the DSMV candidate is available, the video coder sets the additional candidate to the DSMV candidate. Otherwise, there is no additional candidate for the same shift direction (negative or positive shift values). The IPMVC and the DSMV candidate both have the negative or positive shift. Assuming that the shift to generate the DSMV candidate is N, the shift to generate the corresponding IPMVC is M, wherein N and M may be different.

In a fourth example of this disclosure, the priority of generating the candidate based on either the IPMVC candidates or the DSMV candidate could be reversed. More specifically, if a DSMV candidate is available, the video coder sets the additional candidate to the DSMV candidate. Otherwise, if the IPMVC is available, the video coder sets the additional candidate to the IPMVC. Otherwise, there is no additional candidate for the same shift direction.

In a fifth example of this disclosure, the technique of generating the DSMV candidate described in the second example may be combined such that when BVSP is enabled for the whole picture or enabled for the current sequence, the video coder may set the vertical component of a motion vector MvC[X] to 0 when MvC[X] is derived from the disparity motion vector (DMV), with X being equal to 0 or 1. After the video coder conducts the steps in the second example, the video coder may set MvC[0][1] to 0 if the DMV is available and BVSP is enabled. In an alternative example, if DMV is available and BVSP is enabled, the video coder sets MvC[0][1] and/or MvC[1][1] to zero. In this way, when backward warping view synthesis prediction is enabled for a whole picture or a current sequence, the video coder may set a vertical component of the first motion vector of the DSMV candidate to 0 when the first motion vector of the DSMV candidate is derived from the first available disparity motion vector (i.e., DMV). Furthermore, when backward warping view synthesis prediction is enabled for a whole picture or a current sequence, the video coder may set a vertical component of the second motion vector of the DSMV candidate to 0 when the second motion vector of the DSMV candidate is derived from the first available disparity motion vector.

In a sixth example of this disclosure, the video coder first generates a DSMV candidate according to either the second or fifth examples described above. However, in this sixth example, the video coder may additionally consider an IPMVC from the reference view that is derived from a shifted disparity vector of the current PU/CU to generate the merge candidate list. In this example, assume the final candidate is MvComC. For X from 0 to 1, inclusive, if IPMVC[X] is available, MvComC[X]=IPMVC[X], otherwise MvComC[X]=DSMV[X].

The following paragraphs provide a series of examples describing alternative configurations. In a first example alternative configuration, when generating a DSMV, the video coder may set the vertical component of a motion vector MvC[X] to 0 when MvC[X] is derived from the disparity vector (DV) or from the disparity motion vector (DMV), with X being equal to 0 or 1. Alternatively, vertical component of a motion vector MvC[X] may not be set to 0.

In a second example alternative configuration, N is used to generate the DSMV and M is used to generate the IPMVC. When used together, N and M may or may not be the same. Alternatively, both M and N are positive or negative. In some examples, M is equal to any value of 4, 8, 16, 32, 64, −4, −8, −16, −32, −64 or width/height of the smallest PU within one view. Furthermore, in some examples, N is equal to any value of 4, 8, 16, 32, 64, −4, −8, −16, −32, −64 or width/height of the smallest PU within one view.

In a third example alternative configuration, two candidates, each from either DSMV or IPMVC with a negative combination of (N, M) (both being negative) or with a positive combination of (N, M) are generated. The video coder generates up to two candidates and may add the two candidates into the merge candidate list. In another alternative, the video coder generates one candidate using either positive or negative combination.

In a fourth example alternative configuration, the video coder inserts the additional candidates into the merge candidate list after inserting all the spatial candidates and BVSP candidates and more specifically in one of the following ways. In one alternative, the video coder adds both the two candidates right after the TMVP merging candidate. In one alternative, the video coder adds both the two candidates right before the TMVP merging candidate. In another alternative, the video coder adds one candidate right before the TMVP and the other candidate right after the TMVP merging candidate. In one alternative, the candidate derived by positive combination of (N, M) is the first one of (these two added candidates) added into the merge candidate list. In general, a positive combination occurs when both N and M are positive. In one alternative, the candidate derived by negative combination of (N, M) is the first one of (these two added candidates) added into the merge candidate list. In general, a negative combination occurs when both N and M are negative. The candidate may be added with pruning, (i.e., the candidate may be added if the motion information of the candidate is not equal to the motion information of the original IPMVC). Here, the motion information includes motion vectors and reference indexes.

In a fifth example alternative configuration, to generate a DSMV, instead of checking all spatial neighboring blocks (i.e., blocks $A_1$, $B_1$, $B_0$, $A_0$ and $B_2$), less blocks of $A_1$, the video coder checks $B_1$, $B_0$, $A_0$ and $B_2$. In one alternative, only the spatial blocks $A_1$ and $B_1$ are checked in order. Alternatively, the spatial blocks $A_1$, $B_1$, and $B_0$ are checked in order. Alternatively, the spatial blocks $A_1$, $B_1$, $B_0$, and $A_0$ are checked in order. Alternatively, a spatial block coded with BVSP is not considered to be used to generate the DMV, meaning a block coded with BVSP is not checked. Alternatively, only the spatial candidates $A_1$, $B_1$, $B_0$, $A_0$ and $B_2$ that are inserted in the candidate list are checked. Alternatively, a spatial block coded with BVSP is considered to be used to generate the DMV. Alternatively, a spatial block coded bi-directionally from inter-view reference pictures is not considered. Alternatively, a spatial block coded bi-directionally from BVSP is not considered. Alternatively, a spatial block coded bi-directionally but does not contain any temporal motion vector is not considered.

In a sixth example alternative configuration, to generate a DSMV, instead of identifying the first available spatial merging candidate which contains a DMV, the video coder only generates the DSMV when a first condition or a second condition is true. The first condition specifies that both of the first two available merging candidates contain a DMV in one reference picture list. The second condition specifies that the merging candidates derived from $A_1$ and $B_1$ are included in the merge candidate list and both of them contain a DMV in one reference picture list.

In a seventh example alternative configuration, to generate a DSMV, instead of just checking the spatial merging candidates, the video coder also checks the temporal merging candidate. However, the video coder does not check the zero motion vector merging candidates or the combined bi-predictive merging candidates.

In an eighth example alternative configuration, to generate a DSMV, the video coder only generates a DSMV when the video coder detects a DMV from one block which is bi-directionally predicted with one from inter-view prediction reference and one from temporal reference, the motion vector (DMV) corresponding to the inter-view prediction reference is shifted and the motion vector corresponding to the temporal reference is kept to generate a new candidate.

The techniques described in one or more of the examples above may be implemented in various ways. In one example implementation, the video coder uses the coding system described in the sixth example described above to generate each additional merge candidate, where the video coder generates the DSMV candidate as described in the fifth example described above. In this example implementation, the video coder generates up to two candidates with (N, M)=(−4, −4) and (N, M)=(4, 4), respectively in order. Furthermore, in this example implementation, the video coder adds the first additional candidate right before the TMVP and other additional candidate right after the TMVP candidates. If the TMVP is not available, the video coder adds the two candidates after inserting all the spatial candidates and the BVSP candidates.

In the example implementation of the previous paragraph, the video coder may perform the following merge candidate list construction process with additional candidates. Portions of the following merge candidate list construction process related to the insertion of the two additional left/right candidate into the merge candidate list are underlined.

1. IPMVC Insertion
    The video coder derives the IPMVC by the procedure described above. If the IPMVC is available, the video coder inserts the IPMVC into the merge candidate list.
2. Derivation process for spatial merging candidates and IDMVC insertion in 3D-HEVC
    Check the motion information of spatial neighboring PUs in the following order: $A_1$, $B_1$, $B_0$, $A_0$, or $B_2$. The video coder performs constrained pruning by the following procedures:
    If $A_1$ and IPMVC have the same motion vectors and the same reference indices, the video coder does not insert $A_1$ into the merge candidate list. Otherwise, if $A_1$ is not coded in BVSP mode, the video coder inserts $A_1$ into the merge candidate list, if available. Otherwise, the video coder adds the BVSP merging candidate to the merge candidate list.
    If $B_1$ and $A_1$/IPMVC have the same motion vectors and the same reference indices, the video coder does not insert $B_1$ into the merge candidate list. Otherwise, if $B_1$ is not coded in BVSP mode, the video coder inserts $B_1$ into the merge candidate list, if $B_1$ available. Otherwise, if previously no BVSP candidates are added to the merge candidate list, the video coder adds a BVSP merging candidate to the merge candidate list.
    If $B_0$ is not coded in the BVSP mode, the video coder adds $B_0$ to the merge candidate list, if $B_0$ is available. Otherwise, if previously no BVSP candidates are added to the merge candidate list, the video coder adds a BVSP merging candidate to the merge candidate list.

The video coder derives the IDMVC by the procedure described above. If the IDMVC is available and the IDMVC is different from the candidates derived from $A_1$ and $B_1$, the video coder inserts the IDMVC into the merge candidate list.

If $A_0$ is not coded in the BVSP mode, the video coder adds $A_0$ to the merge candidate list, if $A_0$ is available. Otherwise, if previously no BVSP candidates are added to the merge candidate list, the video coder adds a BVSP merging candidate to the merge candidate list.

If $B_2$ is not coded in the BVSP mode, the video coder adds $B_2$ to the merge candidate list, if $B_2$ is available. Otherwise, if previously no BVSP candidates are added to the merge candidate list, the video coder adds a BVSP merging candidate to the merge candidate list.

If none of the five spatial neighbouring blocks are coded with the BVSP mode, the video coder inserts the BVSP merging candidate into the merge candidate list.

Insert the left additional candidate,
If the left candidate is an IPMVC, the video coder compares the left candidate with only the IPMC in step 1. Otherwise, the left candidate is a DSMV candidate and the video coder does not compare the left candidate with any existing candidate.

3. Derivation process for temporal merging candidate
The video coder performs the same procedure as defined in HEVC Working Draft 10.

4. Insert the right additional candidate,
If the right candidate is an IPMVC, the video coder compares the right candidate with only the IPMC in step 1. Otherwise, the right candidate is a DSMV candidate and the video coder does not compare the right candidate with any existing candidate.

5. Derivation process for combined bi-predictive merging candidates in 3D-HEVC
If the total number of candidates derived from the above two steps are less than the maximum number of candidates, the video coder performs the same process as defined in HEVC Working Draft 10 except the specification of l0CandIdx and l1CandIdx. The relationship among combIdx, l0CandIdx and l1CandIdx are defined in FIG. 9.

1. Derivation process for zero motion vector merging candidates
The video coder performs the same procedure as defined in HEVC Working Draft 10 to derive the zero motion vector merging candidates.

As indicated in steps 3 and 4 of the process described above, the video coder may insert a left additional candidate (LDV) and/or a right additional candidate (RDV) into the merge candidate list. The video coder may generate the LDV and the RDV as follows: LDV=DV, LDV[0]+=−4 (RDV=DV, RDV[0]+=4).

1) Use LDV/RDV to generate a left/right IPMVC as described above in section of this disclosure entitled "Alternative technique for merge candidate list construction in 3D-HEVC."
2) If left/right IPMVC is available, the left/right candidate is set to left/right IPMVC;
3) Otherwise, left/right DSMV candidate is generated as described respectively in the section of this disclosure entitled "Generation of left/right DSMV candidate."

Generation of Left/Right DSMV Candidate
In some examples, a process to invoke generation of the left DSMV candidate may be invoked only when to the left/right IPMVC is unavailable and MvC is returned as the final left/right candidate. The left/right DSMV candidate may be generated as follows.

1) Consider the DMV is not available.
   a) For each spatial candidates C[i] in the list C={$A_1$, $B_1$, $B_0$, $A_0$ and $B_2$}
      i) If refIdxL0 of C[i] corresponds to an inter-view reference, the following apply. Alternatively, this condition is changed to "If refIdxL0 of C[i] corresponds to an inter-view reference and refIdxL1 of C[i] corresponds to a temporal reference".
         (1) Assume the motion vector of C[i] is my.
         (2) DMV is set to mv[0] and considered as available.
         (3) Terminate the loop (break;).
2) If DMV is available, the following apply to get the additional left/right candidate MvC.
   a) (MvC[0][0], MyC[0][1]) is set to (my[0][0]+N, my[0][1]); (MvC[1][0], MvC[1][1]) is set to (my[1][0], my[1][1]).
   b) refIdL0 of MvC is set equal to the refIdxLX of the first available spatial candidate that contains the DMV.
   c) refIdxL1 of MvC is set equal to the refIdxL1 of the spatial neighboring block containing the DMV.
   d) When BVSP is enabled for the current picture, MyC[0][1] is further set to 0.
3) Otherwise, MvC is generated as follows:
   a) (MvC[0][0], MvC[0][1])=(DV[0][0]+N, 0), (MvC[1][0], MvC[1][1])=(DV[1][]+N, 0);
   b) For X from 0 to 1, inclusive, refIdxLX is set equal to the reference index of the picture in RefPicListX which belongs to the reference view as identified during the NBDV process together with the disparity vector.

In this example, N is −4 for left candidate and 4 for right candidate.

In some aspects, the techniques of this disclosure can be summarized as follows. In a ninth example, more IPMVCs from the reference view may be derived from shifted disparity vectors of the current PU/CU to generate the merge candidate list. The disparity vector DV is shifted horizontally by DV[0]+$M_1$ and vertically by DV[0]+$M_2$. The video coder may use the shifted disparity vector (DV[0]+$M_1$, DV[1]+$M_2$) to locate the corresponding block in the reference view in order to generate the IPMVC. If the IPMVC is available, the video coder may use the IPMVC as the additional candidate for the merge list.

In a tenth example, if an IPMVC from a shifted disparity vector as the previous paragraph is unavailable, the first available disparity motion vector (DMV) corresponding to the RefPicList0 of the spatial neighboring blocks $A_1$, $B_1$, $B_0$, $A_0$, or $B_2$ is used to derive an additional candidate by shifting the horizontal component of the mv[0] (which is the available disparity motion vector) to generate the additional motion vector candidate MvC. This candidate is denoted as a Disparity Shifted Motion Vector (DSMV). If the DMV is available, MvC[0]=mv[0], MvC[1]=mv[1] and MvC[0][0]+=N, reference indices are inherited from the first available candidate (which contains the DMV). Thus, a video coder may set a first motion vector of the DSMV candidate to the first motion vector of a particular spatial neighboring block. The particular spatial neighboring block may have the first available disparity motion vector among spatial neighboring blocks of the current block. In addition, the video coder may set a second motion vector of the DSMV candidate to a second motion vector of the particular spatial neighboring block, the second motion vector of the particular spatial neighboring block corresponding to a second reference picture list. Furthermore, the video coder may set a reference index corresponding to the first motion vector of the DSMV to a reference index corresponding to the first motion vector of the particular spatial neighboring block. The video coder may set a reference index corresponding to the second motion vector of the DSMV to a reference index corresponding to the second motion vector of the particular spatial neighboring block. In one alternative, when BVSP is enabled for the whole picture or for the current sequence, the vertical component of the motion vector MvC[0][1] and/or MvC[1][1] may be set to 0. If the DMV is unavailable, no additional candidates are generated for the fixed N.

In an eleventh example, the video coder first generates the DSMV as described in the tenth example. However, in this example, if the DSMV is not available, the video coder may derive the DSMV (denoted as MvC) by setting the motion vectors to vectors shifted from disparity vector, as follows: MvC[0]=DV and MvC[0][0]+=N; MvC[0][1]=0 and MvC[1]=DV and MvC[1][0]+=N; MvC[1][1]=0 and the reference index corresponding to MvC[X] is set to the reference index of the picture in RefPicListX which belongs to the reference view as identified during the NBDV process together with the disparity vector. Alternatively, the reference index associated with RefPicListX is set to −1.

In a twelfth example, the shift values $M_1$ and $M_2$ used to generate the IPMVC may or may not be the same. In this example, $M_1$ and $M_2$ may take any value of 4, 8, 16, 32, 64, −4, −8, −16, −32, −64. In one alternative $M_1$ may be equal to $M_2$, e.g., they can both be equal to 16 or both are equal to −16. In one alternative, $M_1$ and $M_2$ are equal to the width and height of the smallest PU within one view, or the width and height of any the smallest CU, or the width and height of the current PU/CU. Alternatively, both $M_1$ and $M_2$ may be positive. Alternatively, both $M_1$ and $M_2$ may be negative. Alternatively, $M_1$ may be positive and $M_2$ may be negative. Alternatively, $M_1$ may be negative and $M_2$ may be positive. Alternatively, $M_1$ may be equal to (((Width/2)*4)+4) and $M_2$ may be equal to (((Height/2)*4)+4), where the current PU size is Width×Height. Alternatively, $M_1$ and $M_2$ are respectively equal to the width and height of the smallest PU within one view, or the width and height of any the smallest CU, or two times the width (i.e., 2*Width) and two times the height (i.e., 2*Height) of the current PU/CU.

In a thirteenth example, the shift value N used to generate the DSMV candidate may be set equal to any one of the values of 4, 8, 16, 32, 64, −4, −8, −16, −32, −64 or width/height of the smallest PU within one view. In one alternative, the shifts values N and $M_i$ (with i being equal to 1 or 2) may be the same. In one alternative, the shifts values N and $M_i$ (with i being equal to 1 or 2) may not be same.

In a fourteenth example, two candidates, each from either DSMV or IPMVC with a positive combination of (N, $M_1$, $M_2$) (all being positive) or with a negative combination of (N, $M_1$, $M_2$) are generated. Up to two candidates are generated and may be added into the merge candidate list. In another alternative, only one candidate using either positive or negative combination is generated.

In a fifteenth example, when the video coder only generates one additional candidate, the video coder inserts the additional candidate into the merge candidate list after inserting all the spatial candidates and more specifically in one of the following ways. In one alternative, the video coder adds the candidate right before the TMVP merging candidate. In one alternative, the video coder adds the candidate right after the TMVP merging candidate. In one alternative, the video coder adds the candidate right after the spatial merging candidate $A_0$ and right before the spatial merging candidate $B_2$. In other words, the video coder may add the additional IPMVC into the merge candidate list immediately after a merge candidate for a spatial neighboring block that is above and left of the current block. In one alternative, the video coder adds the candidate right after the BVSP candidate and right before the spatial merging candidate $A_0$. Furthermore, the candidate may be added with pruning. In one example where the candidate may be added with pruning, only the additional IPMC candidate generated as in ninth example is pruned with the original IPMC candidate and DSMV candidate generated as in examples tenth and eleventh is not pruned with any candidate.

In a sixteenth example, the video coder inserts the additional candidates into the merge candidate list added after inserting all the spatial candidates and more specifically in one of the following ways. In one alternative, the video coder adds both the two candidates right after the TMVP merging candidate. In one alternative, the video coder adds both the two candidates right before TMVP merging candidate. In one alternative, the video coder adds one candidate right before TMVP and the other candidate right after TMVP merging candidate. In one alternative, the candidate derived by positive combination of (N, M1, M2) is the first one of (these two added candidates) added into the merge candidate list. In one alternative, the candidate derived by negative combination of (N, M1, M2) is the first one of (these two added candidates) added into the merge candidate list. The candidate may be added with pruning, which is similar to the pruning process as mentioned in U.S. Provisional Application 61/734,929 and U.S. Provisional Application 61/747,350.

In this section, the implementation of one of the proposed techniques of this disclosure for generating the additional merge candidates is described. In one example, up to two candidates are generated with (N, M1, M2)=(4, 16, 16) and (N, M1, M2)=(−4, −16, −16), respectively in order. The video coder adds the first additional candidate (left candidate) right before the TMVP and the second additional candidate (right candidate) right after the TMVP candidates. If a TMVP candidate is not available, the video coder adds the two candidates after inserting all the spatial candidates.

Merge candidate list construction with additional candidates will now be discussed. The video coder inserts the two additional left/right candidates in the merge candidate list, as is highlighted in bold text below.

1. IPMVC insertion

IPMVC is derived by the procedure described above. If the IPMVC is available, the IPMVC is inserted to the merge list.

2. Derivation process for spatial merging candidates and IDMVC insertion in 3D-HEVC.

Check the motion information of spatial neighboring PUs in the following order: $A_1$, $B_1$, $B_0$, $A_0$, or $B_2$. Constrained pruning is performed by the following procedures:

If $A_1$ and IPMVC have the same motion vectors and the same reference indices, $A_1$ is not inserted into the candidate list. Otherwise, the video coder inserts $A_1$ into the list.

If $B_1$ and $A_1$/IPMVC have the same motion vectors and the same reference indices, the video coder does not insert $B_1$ into the candidate list. Otherwise, the video coder inserts $B_1$ into the list.

If $B_0$ is available, the video coder adds $B_0$ to the candidate list.

The IDMVC is derived by the procedure described above. If the IDMVC is available and the IDMVC is different from the candidates derived from $A_1$ and $B_1$, the video coder inserts the IDMVC into the candidate list.

If BVSP is enabled for the whole picture or for the current slice, then the video coder inserts the BVSP merging candidate to the merge candidate list.

If $A_0$ is available, the video coder adds $A_0$ to the candidate list.

If $B_2$ is available, the video coder adds $B_2$ to the candidate list.

Insert the left additional candidate that is derived as described above

If the left candidate is an IPMVC, the video coder compares the left candidate with the IPMC in step 1. If the left candidate is not equal to the IPMC or if the left candidate is a DSMV (when left IPMC is unavailable), the video coder inserts the left candidate.

3. Derivation process for temporal merging candidate.

Similar to the temporal merging candidate derivation process in HEVC where the motion information of the co-located PU is utilized, however, the target reference picture index of the temporal merging candidate may be changed, as explained above, instead of fixing to be 0.

4. Insert the right additional candidate that is derived as explained above.

If the right candidate is an IPMVC, the right candidate is compared with the IPMC in step 1. If the right candidate is not equal to the IPMC or if the right candidate is a DSMV (when right IPMC is unavailable), the video coder inserts the right candidate.

5. Derivation process for combined bi-predictive merging candidates in 3D-HEVC.

If the total number of candidates derived from the above two steps are less than the maximum number of candidates, the video coder performs the same process as defined in HEVC except the specification of l0CandIdx and l1CandIdx. The relationship among combIdx, l0CandIdx and l1CandIdx are defined in the FIG. 9.

6. Derivation process for zero motion vector merging candidates.

The video coder performs the same procedure as defined in HEVC Working Draft 10.

A video coder may generate the left/right additional candidates in various ways. In one example, the video coder generates the LDV/RDV as follows: LDV=DV, LDV[0]+=16, LDV[1]+=16 (RDV=DV, RDV[0]+=−16, RDV[1]+=−16). In this example, the video coder may use LDV/RDV to generate a left/right IPMVC as described in U.S. Provisional Patent Applications 61/734,929 and 61/747,350 and U.S. patent application Ser. No. 14/098,151, each of which are incorporated herein by reference. If the left/right IPMVC is available, the video coder sets the left/right candidate to the left/right IPMVC. Otherwise, the video coder generates the left/right DSMV candidate as described above.

A video coder may generate the left/right DSMV candidates in various ways. In one example, the video coder only invokes the process to generate the left/right DSMV candidate when the left/right IPMVC is unavailable and MvC is returned as the final left/right candidate. In this example, the video coder generates the left/right DSMV candidate as follows.

First, consider the DMV is not available. For each spatial candidates C[i] in the list C={A1, B1, B0, A0 and B2} i) If refIdxL0 of C[i] corresponds to an inter-view reference, the following apply. In one alternative, this condition is changed to "If refIdxL0 of C[i] corresponds to an inter-view reference and refIdxL1 of C[i] corresponds to a temporal reference".

(1) Assume the motion vector of C[i] is mv.
(2) DMV is set to mv[0] and considered as available.
(3) Terminate the loop (break;).

2) If DMV is available, the following apply to get the additional left/right candidate MvC.

a) (MvC[0][0], MyC[0][1]) is set to (my[0][0]+N, my[0][1]); (MvC[1][0], MvC[1][1]) is set to (my[1][0], my[1][1]).

b) refIdL0 of MvC is set equal to the refIdxLX of the first available spatial candidate that contains the DMV.

c) refIdxL1 of MvC is set equal to the refIdxL1 of the spatial neighboring block containing the DMV.

d) When BVSP is enabled for the current picture, MyC[0][1] is further set to 0.

3) Otherwise, the video coder generates MvC as follows:

a) (MvC[0][0], MyC[0][1])=(DV[0][0]+N, 0), (MvC[1][0], MvC[1][1])=(DV[1][0]+N, 0);

b) For X from 0 to 1, inclusive, refIdxLX is set equal to the reference index of the picture in RefPicListX which belongs to the reference view as identified during the NBDV process together with the disparity vector.

Here, N is 4 for left candidate and −4 for right candidate.

In another example, the video coder generates only one candidate with (N, $M_1$, $M_2$)=(4, (((Width/2)*4)+4), (((Height/2)*4)+4)), where the current PU size is Width× Height. The only one additional candidate is added right before the TMVP candidate. If TMVP is not available, the video coder adds the additional candidate after inserting all the spatial candidates.

The following is another example technique of this disclosure for merge candidate list construction with additional candidates. In this example, only one additional candidate is inserted in the merge candidate list, as highlighted in bold below.

1. IPMVC insertion

IPMVC is derived by the procedure described above. If it is available, it is inserted to the merge list.

2. Derivation process for spatial merging candidates and IDMVC insertion in 3D-HEVC Check the motion information of spatial neighboring PUs in the following order: $A_1$, $B_1$, $B_0$, $A_0$, or $B_2$. The video coder performs constrained pruning by the following procedures:

If $A_1$ and IPMVC have the same motion vectors and the same reference indices, the video coder does not insert $A_1$ into the candidate list. Otherwise, the video coder inserts $A_1$ into the candidate list.

If $B_1$ and $A_1$/IPMVC have the same motion vectors and the same reference indices, the video coder does not insert $B_1$ into the candidate list. Otherwise, the video coder inserts $B_1$ into the candidate list.

If B₀ is available, the video coder adds B₀ into the candidate list.

IDMVC is derived by the procedure described above. If the IDMVC is available and the IDMVC is different from the candidates derived from A₁ and B₁, the video coder inserts the IDMVC into the candidate list.

If BVSP is enabled for the whole picture or for the current slice, then the video coder inserts the BVSP merging candidate into the merge candidate list.

If A₀ is available, the video coder adds A₀ to the candidate list.

If B₂ is available, the video coder adds B₂ to the candidate list.

Insert the additional candidate that is derived as described in the following section, If the additional candidate is an IPMVC, the video coder compares the additional candidate only with the IPMC in step 1. If the additional candidate is not equal to the IPMC or if the additional candidate is a DSMV (when the additional IPMVC is unavailable), the video coder inserts the additional candidate into the candidate list.

3. Derivation process for temporal merging candidate

The derivation process for the temporal merging candidate is similar to the temporal merging candidate derivation process in HEVC where the motion information of the co-located PU is utilized. However, the target reference picture index of the temporal merging candidate may be changed as explained in the section of this disclosure titled "Generation of one additional candidate" instead of fixing to be 0.

4. Derivation process for combined bi-predictive merging candidates in 3D-HEVC

If the total number of candidates derived from the above two steps are less than the maximum number of candidates, the same process as defined in HEVC is performed except the specification of l0CandIdx and l1CandIdx. The relationship among combIdx, l0CandIdx and l1CandIdx are defined in FIG. 9.

5. Derivation process for zero motion vector merging candidates

The same procedure as defined in HEVC may be performed to derive zero motion vector candidates.

Generation of One Additional Candidate:

1) The RDV is generated as follows: RDV=DV, RDV[0]+=(((Width/2)*4)+4), RDV[1]+=(((Height/2)*4)+4).

2) Use RDV to generate an IPMVC similar as the IPMVC generated by disparity vector in 3D-HEVC: wherein the center position of the current block is shifted with RDV to identify a pixel in a reference block of the reference view and the motion information inside the block (4×4) covering the pixel are used to create the IPMVC candidate.

3) If IPMVC in step (2) is available, the additional candidate is set to IPMVC.

4) Otherwise, when the IPMVC in step (2) is unavailable, DSMV candidate is generated as described in the section of this disclosure entitled "Generation of one DSMV candidate."

Generation of One DSMV Candidate

This is subsection is the similar the corresponding procedure discussed above with respect to other examples of this disclosure. One difference is that DSMV generated is always the right DSMV. This process is invoked only when the additional IPMVC in previous section is unavailable and MvC is returned as the final candidate. The DSMV candidate is generated as follows, by setting N equal to 4.

1) Consider the DMV is not available.
   a) For each spatial candidates C[i] in the list C={A₁, B₁, B₀, A₀ and B₂}
      i) If refIdxL0 of C[i] corresponds to an inter-view reference, the following apply. Alternatively, this condition is changed to "If refIdxL0 of C[i] corresponds to an inter-view reference and refIdxL1 of C[i] corresponds to a temporal reference".
         (1) Assume the motion vector of C[i] is my.
         (2) DMV is set to mv[0] and considered as available.
         (3) Terminate the loop (break;).

2) If DMV is available, the following apply to get the additional candidate MvC.
   a) (MvC[0][0], MyC[0][1]) is set to (my[0][0]+N, my[0][1]); (MvC[][0], MvC[1][1]) is set to (my[1][0], my[1][1]).
   b) refIdL0 of MvC is set equal to the refIdxL0 of the first available spatial candidate that contains the DMV.
   c) refIdxL1 of MvC is set equal to the refIdxL1 of the spatial neighboring block containing the DMV.
   d) When BVSP is enabled for the current picture, MvC[0][1] is further set to 0.

3) Otherwise, MvC is generated as follows:
   a) (MvC[0][0], MvC[0][1])=(DV[0][0]+N, 0), (MvC[1][0], MvC[1][1])=(DV[1][0]+N, 0);
   b) For X from 0 to 1, inclusive, refIdxLX is set equal to the reference index of the picture in RefPicListX which belongs to the reference view as identified during the NBDV process together with the disparity vector.

Thus, in the description above, a video coder may determine a shifted disparity vector (i.e., RDV) by shifting a disparity vector (i.e., DV) of the current block horizontally by a first value and vertically by a second value. In some examples, the first value is equal to (((W/2)*4)+4) and the second value is equal to (((H/2)*4)+4), wherein W is the width of the current block and H is the height of the current block. Furthermore, the video coder may use the shifted disparity vector (i.e., RDV) to locate a corresponding block in a reference view. An additional IPMVC indicates motion information of the corresponding block in the inter-view reference picture. The video coder may insert the additional IPMVC into the merge candidate list when the additional IPMVC is different from the original IPMC. However, when the additional IPMVC is not available, the video coder may generate a DSMV candidate. As indicated elsewhere in this disclosure, the video coder may determine a first available disparity motion vector among spatial neighboring blocks of a current block of the video data, the first available disparity motion vector corresponding to a first reference picture list. The video coder may then shift a horizontal component of the first available disparity motion vector to derive the DSMV candidate. When none of the spatial neighboring blocks contains a disparity motion vector, the DSMV candidate may be generated by setting the horizontal component of the DSMV candidate equal to a horizontal component of the disparity vector of the current block plus an offset, and a vertical component of the DSMV candidate is set to zero.

Figure 12:
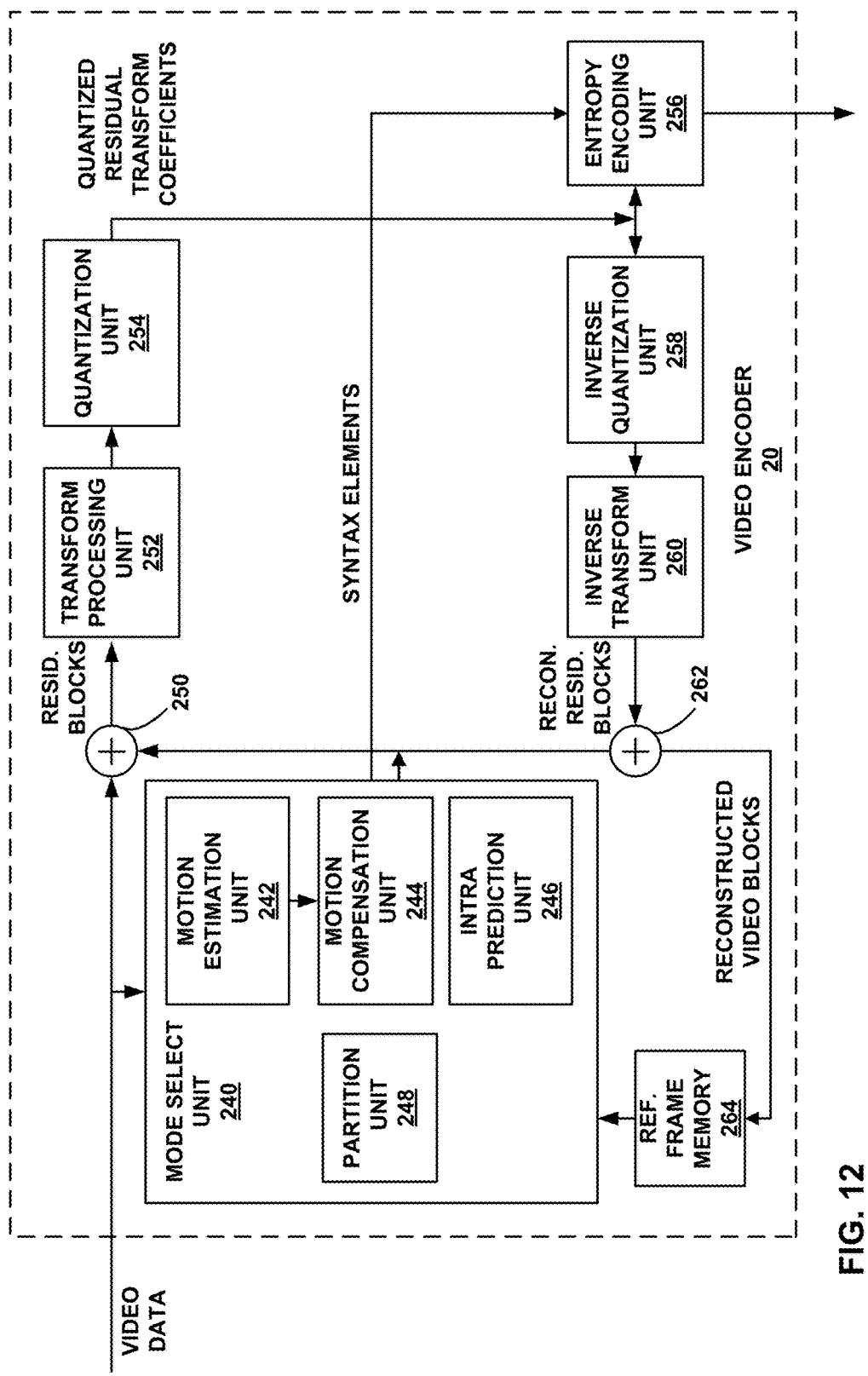
FIG. 12 is a block diagram illustrating an example of a video encoder that may implement the inter-prediction techniques of this disclosure.

FIG. 12 is a block diagram illustrating an example of video encoder 20 that may implement the techniques of this disclosure. Video encoder 20 may perform intra- and inter-coding (including inter-view coding) of video blocks within video slices, e.g., slices of both texture images and depth maps. Texture information generally includes luminance (brightness or intensity) and chrominance (color, e.g., red hues and blue hues) information. In general, video encoder 20 may determine coding modes relative to luminance slices, and reuse prediction information from coding the luminance information to encode chrominance information (e.g., by reusing partitioning information, intra-prediction mode selections, motion vectors, or the like). Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

In the example of FIG. 12, video encoder 20 includes a mode select unit 240, a reference frame memory 264, a summer 250, a transform processing unit 252, a quantization unit 254, and an entropy encoding unit 256. Mode select unit 240, in turn, includes a motion compensation unit 244, a motion estimation unit 242, an intra-prediction unit 246, and a partition unit 248. For video block reconstruction, video encoder 20 also includes inverse quantization unit 258, an inverse transform unit 260, and a summer 262. A deblocking filter (not shown in FIG. 12) may also be included to filter block boundaries to remove blockiness artifacts from reconstructed video. If desired, the deblocking filter typically filters the output of summer 262. Additional filters (in loop or post loop) may also be used in addition to the deblocking filter. Such filters are not shown for brevity, but if desired, may filter the output of summer 250 (as an in-loop filter).

During an encoding process, video encoder 20 receives a video frame or slice to be coded. The frame or slice may be divided into multiple video blocks. Thus, as shown in FIG. 12, video encoder 20 receives a current video block (that is, a block of video data, such as a luminance block, a chrominance block, or a depth block) within a video frame (e.g., a texture image or a depth map) to be encoded.

Motion estimation unit 242 and motion compensation unit 244 may perform inter-predictive coding of a received video block relative to one or more blocks in one or more reference frames to provide temporal prediction or inter-view prediction. Intra-prediction unit 246 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 248 may partition blocks of video data into sub-blocks, based on evaluation of previous partitioning schemes in previous coding passes. For example, partition unit 248 may initially partition a frame or slice into LCUs, and partition each of the LCUs into sub-CUs based on rate-distortion analysis (e.g., rate-distortion optimization). Mode select unit 240 may further produce a quadtree data structure indicative of partitioning of an LCU into sub-CUs. Leaf-node CUs of the quadtree may include one or more PUs and one or more TUs.

Mode select unit 240 may select one of the coding modes, intra or inter, e.g., based on error results, and may provide the resulting intra- or inter-coded block to summer 250 to generate residual block data and to summer 262 to reconstruct the encoded block for use as a reference frame. Mode select unit 240 may also provide syntax elements, such as motion vectors, intra-mode indicators, partition information, and other such syntax information, to entropy encoding unit 256.

Motion estimation unit 242 and motion compensation unit 244 may be highly integrated, but are illustrated separately for conceptual purposes. Motion estimation, performed by motion estimation unit 242, is the process of generating motion vectors, which estimate motion for video blocks. In some examples, a motion vector may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 264. For example, video encoder 20 may interpolate values of one-quarter pixel positions, one-eighth pixel positions, or other fractional pixel positions of the reference picture. Therefore, motion estimation unit 242 may perform a motion search relative to the full pixel positions and fractional pixel positions and output a motion vector with fractional pixel precision.

Motion estimation unit 242 calculates a motion vector for a PU of a video block in an inter-coded slice by comparing the position of the PU to the position of a predictive block of a reference picture. The reference picture may be selected from a first reference picture list ("List 0" or "RefPicList0") or a second reference picture list ("List 1" or "RefPicList1"), each of which identify one or more reference pictures stored in reference frame memory 264. Motion estimation unit 242 may send the calculated motion vector to entropy encoding unit 256 and motion compensation unit 244.

Motion compensation, performed by motion compensation unit 244, may involve fetching or generating the predictive block based on the motion vector determined by motion estimation unit 242. Again, motion estimation unit 242 and motion compensation unit 244 may be functionally integrated, in some examples. Upon receiving the motion vector for the PU of the current video block, motion compensation unit 244 may locate the predictive block to which the motion vector points in one of the reference picture lists. In some examples, summer 250 forms a residual video block by subtracting pixel values of the predictive block from the pixel values of the current video block being coded, forming pixel difference values, as discussed below. In general, motion estimation unit 242 performs motion estimation relative to luma components, and motion compensation unit 244 uses motion vectors calculated based on the luma components for both chroma components and luma components. In this manner, motion compensation unit 244 may reuse motion information determined for luma components to code chroma components such that motion estimation unit 242 need not perform a motion search for the chroma components. Mode select unit 240 may also generate syntax elements associated with the video blocks and the video slice for use by video decoder 30 in decoding the video blocks of the video slice.

In accordance with one or more techniques of this disclosure, motion estimation unit 242 may generate a merge candidate list. As part of generating the merge candidate list, motion estimation unit 242 may determine a first available disparity motion vector among spatial neighboring blocks of a current block of the video data. The first available disparity motion vector may correspond to a first reference picture list (e.g., RefPicList0). Furthermore, motion estimation unit 242 may shift a horizontal component of the first available disparity motion vector to derive a DSMV candidate. When none of the spatial neighboring blocks contain a disparity motion vector, motion estimation unit 242 may generate the DSMV candidate by setting the horizontal component of the DSMV candidate may be equal to a horizontal component of the disparity vector of the current block plus an offset, and by setting a vertical component of the DSMV candidate to zero. In addition, motion estimation unit 242 may generate an additional IPMVC using the motion information of the inter-view reference picture that is pointed by shifting the disparity vector both horizontally and vertically. Motion estimation unit 242 may add the DSMV candidate or the additional IPMVC into a merge candidate list. In some examples, motion estimation unit 242 adds the DSMV candidate to the merge candidate list in place of the additional IPMVC candidate if the additional IPMVC is not available. Motion estimation unit 242 may select a candidate from the merge candidate list and include, in a bitstream, data representing an index of the selected merge candidate. Motion compensation unit 244 may determine, based on motion information of the selected merge candidate, a predictive block for the current block.

Intra-prediction unit 246 may intra-predict a current block, as an alternative to the inter-prediction performed by motion estimation unit 242 and motion compensation unit 244, as described above. In particular, intra-prediction unit 246 may determine an intra-prediction mode to use to encode a current block. In some examples, intra-prediction unit 246 may encode a current block using various intra-prediction modes, e.g., during separate encoding passes, and intra-prediction unit 246 (or mode select unit 240, in some examples) may select an appropriate intra-prediction mode to use from the tested modes.

For example, intra-prediction unit 246 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction unit 246 may calculate ratios from the distortions and rates for the various encoded blocks to determine which intra-prediction mode exhibits the best rate-distortion value for the block.

After selecting an intra-prediction mode for a block, intra-prediction unit 246 may provide information indicative of the selected intra-prediction mode for the block to entropy encoding unit 256. Entropy encoding unit 256 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

In some examples, video encoder 20 forms a residual video block by subtracting the prediction data from mode select unit 240 from the original video block being coded.

Summer 250 represents the component or components that perform this subtraction operation. Transform processing unit 252 may apply a transform, such as a discrete cosine transform (DCT) or a conceptually similar transform, to the residual block, producing a video block comprising residual transform coefficient values. Transform processing unit 252 may perform other transforms which are conceptually similar to DCT. Wavelet transforms, integer transforms, sub-band transforms or other types of transforms could also be used. In any case, transform processing unit 252 applies the transform to the residual block, producing a block of residual transform coefficients.

The transform may convert the residual information from a pixel value domain to a transform domain, such as a frequency domain. Transform processing unit 252 may send the resulting transform coefficients to quantization unit 254. Quantization unit 254 quantizes the transform coefficients to further reduce bit rate. The quantization process may reduce the bit depth associated with some or all of the coefficients. The degree of quantization may be modified by adjusting a quantization parameter. In some examples, quantization unit 254 may then perform a scan of the matrix including the quantized transform coefficients. Alternatively, entropy encoding unit 256 may perform the scan.

Following quantization, entropy encoding unit 256 may entropy code the quantized transform coefficients. For example, entropy encoding unit 256 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 256, the encoded bitstream may be transmitted to another device (e.g., video decoder 30) or archived for later transmission or retrieval.

Inverse quantization unit 258 and inverse transform unit 260 apply inverse quantization and inverse transformation, respectively, to reconstruct the residual block in the pixel domain, e.g., for later use as a reference block. Motion compensation unit 244 may calculate a reference block by adding the residual block to a predictive block of one of the frames of reference frame memory 264. Motion compensation unit 244 may also apply one or more interpolation filters to the reconstructed residual block to calculate sub-integer pixel values for use in motion estimation. Summer 262 may add the reconstructed residual block to the motion compensated prediction block produced by motion compensation unit 244 to produce a reconstructed video block for storage in reference frame memory 264. The reconstructed video block may be used by motion estimation unit 242 and motion compensation unit 244 as a reference block to inter-code a block in a subsequent video frame.

Video encoder 20 may encode depth maps in a manner that substantially resembles coding techniques for coding luminance components, albeit without corresponding chrominance components. For example, intra-prediction unit 246 may intra-predict blocks of depth maps, while motion estimation unit 242 and motion compensation unit 244 may inter-predict blocks of depth maps.

Figure 13:
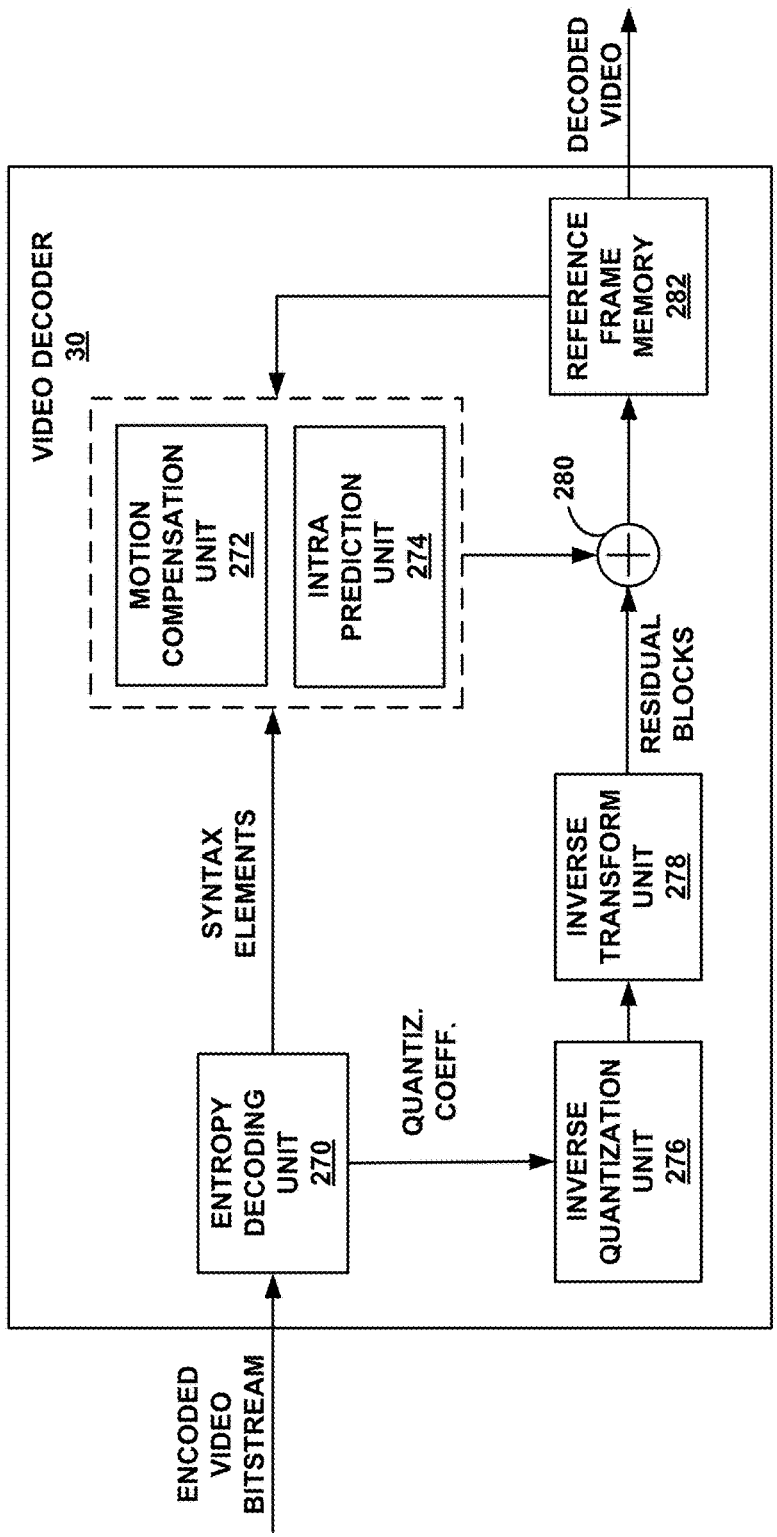
FIG. 13 is a block diagram illustrating an example of a video decoder that may implement the inter-prediction techniques of this disclosure.

FIG. 13 is a block diagram illustrating an example of video decoder 30 that may implement the techniques of this disclosure. In the example of FIG. 13, video decoder 30 includes an entropy decoding unit 270, a motion compensation unit 272, an intra-prediction unit 274, an inverse quantization unit 276, an inverse transformation unit 278, a reference frame memory 282 and a summer 280. In some examples, video decoder 30 performs a decoding pass generally reciprocal to the encoding pass described with respect to video encoder 20 (FIG. 12). Motion compensation unit 272 may generate prediction data based on motion vectors received from entropy decoding unit 270. In other words, motion compensation unit 272 may generate the prediction data based on motion vectors determined from syntax elements received from entropy decoding unit 270. In different examples, entropy decoding unit 270 may or may not entropy decode such syntax elements. Intra-prediction unit 274 may generate prediction data based on intra-prediction mode indicators received from entropy decoding unit 270.

During the decoding process, video decoder 30 receives an encoded video bitstream that represents video blocks of an encoded video slice and associated syntax elements from video encoder 20. Entropy decoding unit 270 entropy decodes the bitstream to generate quantized coefficients, motion vectors or intra-prediction mode indicators, and other syntax elements. In other words, entropy decoding unit 270 may entropy decode at least some syntax elements in the bitstream. Various components of video decoder 30 may use such syntax elements to determine the quantized coefficients, motion vectors, intra prediction mode indicators, and so on. In some examples, entropy decoding unit 270 forwards motion vectors and various syntax elements to motion compensation unit 272. Video decoder 30 may receive the syntax elements at the video slice level and/or the video block level.

When the video slice is coded as an intra-coded (I) slice, intra-prediction unit 274 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 272 may produce predictive blocks for a video block of the current video slice based on motion vectors and syntax elements received from entropy decoding unit 270. The predictive blocks may be produced from one of the reference pictures within one of the reference picture lists. Video decoder 30 may construct the reference frame lists, List 0 and List 1, based on reference pictures stored in reference frame memory 282.

Motion compensation unit 272 may determine prediction information for a video block of the current video slice by parsing the motion vectors and other syntax elements, and may use the prediction information to produce the predictive blocks for the current video block being decoded. For example, motion compensation unit 272 may use some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 272 may also perform interpolation based on interpolation filters. Motion compensation unit 272 may use the same interpolation filters as used by video encoder 20 during encoding of the video blocks to calculate interpolated values for sub-integer pixels of reference blocks. In this case, motion compensation unit 272 may determine the interpolation filters used by video encoder 20 from the received syntax elements and use the interpolation filters to produce predictive blocks.

In accordance with one or more techniques of this disclosure, motion compensation unit 272 may generate a merge candidate list. As part of generating the merge candidate list, motion compensation unit 272 may determine a first available disparity motion vector among spatial neighboring blocks of a current block of the video data. The first available disparity motion vector may correspond to a first reference picture list (e.g., RefPicList0). Furthermore, motion compensation unit 272 may shift a horizontal component of the first available disparity motion vector to derive a DSMV candidate. Motion compensation unit 272 may add the DSMV candidate or an additional IPMVC into a merge candidate list. In some examples, motion compensation unit 272 adds the DSMV candidate to the merge candidate list in place of the additional IPMVC candidate if the additional IPMVC candidate is not available. Furthermore, motion compensation unit 272 may determine, based on data (e.g., a merge candidate index) obtained from the bitstream, a selected candidate in the merge candidate list. Motion compensation unit 272 may determine, based on motion information of the selected merge candidate, a predictive block for the current block.

Inverse quantization unit 276 may inverse quantize, i.e., de-quantize, the quantized transform coefficients provided in the bitstream and decoded by entropy decoding unit 270. In other words, inverse quantization unit 276 may inverse quantize quantized transform coefficients indicated by syntax elements included in the bitstream, which may be entropy decoded by entropy decoding unit 270. The inverse quantization process may include use of a quantization parameter QPy calculated by video decoder 30 for each video block in the video slice to determine a degree of quantization and, likewise, a degree of inverse quantization that should be applied. Inverse transform unit 278 may apply an inverse transform, e.g., an inverse DCT, an inverse integer transform, or a conceptually similar inverse transform process, to the transform coefficients in order to produce residual blocks in the pixel domain.

After motion compensation unit 272 generates the predictive block for the current video block based on the motion vectors and other syntax elements, video decoder 30 may form a decoded video block (e.g., by summing the residual blocks from inverse transform unit 278 with the corresponding predictive blocks generated by motion compensation unit 272). Summer 280 may represent the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 282, which stores reference pictures used for subsequent motion compensation. Reference frame memory 282 also stores decoded video for later presentation on a display device, such as display device 32 of FIG. 1.

Figure 14A:
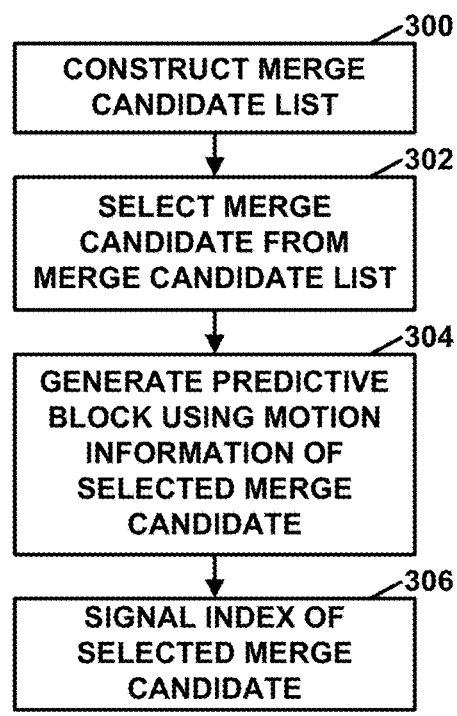
FIG. 14A is a flowchart illustrating an example operation of a video encoder, in accordance with one or more techniques of this disclosure.

FIG. 14A is a flowchart illustrating an example operation of video encoder 20, in accordance with one or more techniques of this disclosure. Although FIG. 14A is explained with reference to FIG. 12, the operation of FIG. 14A is not so limited. In the example of FIG. 14A, one or more actions may be rearranged or omitted. In other examples, similar operations may include additional actions.

In the example of FIG. 14A, motion estimation unit 242 of video encoder 20 may construct a merge candidate list for a current block (e.g., a current PU) (300). In accordance with at least some techniques of this disclosure, motion estimation unit 242 may generate the merge candidate list such that the merge candidate list includes a DSMV candidate or an additional IPMVC. In some examples, motion estimation unit 242 generates the DSMV candidate by shifting a horizontal component of a disparity motion vector of a spatial neighboring block. In other words, a horizontal component of the DSMV candidate may be equal to a horizontal component of the disparity motion vector of the spatial neighboring block containing the DMV plus an offset, and a vertical component of the DSMV candidate may be equal to a vertical component of the disparity vector of the spatial neighboring block containing the DMV. When none of the spatial neighboring blocks contain a disparity motion vector, motion estimation unit 242 may generate the DSMV by setting a horizontal component of the DSMV candidate equal to a horizontal component of the disparity vector of the current block plus an offset, and by setting a vertical component of the DSMV candidate to zero. Furthermore, in some examples, motion estimation unit 242 performs the example operations shown in FIG. 15 and FIG. 16 to generate the merge candidate list.

After generating the merge candidate list, motion estimation unit 242 may select a merge candidate from the merge candidate list (302). In addition, motion compensation unit 244 of video encoder 20 may generate one or more predictive blocks for the current block using motion information of the selected merge candidate (304). Video encoder 20 may signal an index of the selected merge candidate in a bitstream (306).

Figure 14B:
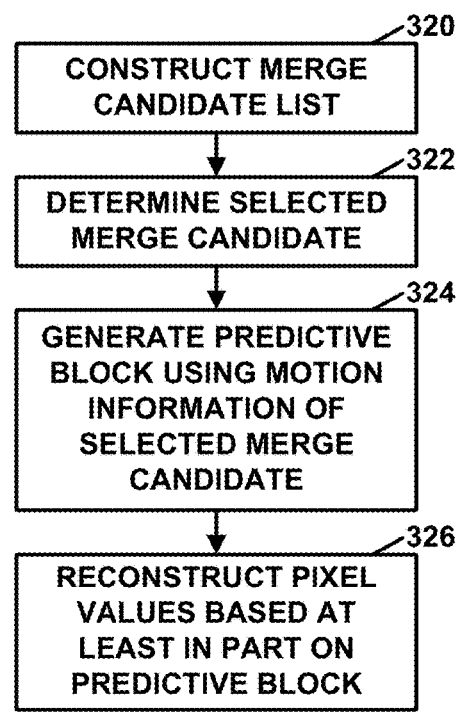
FIG. 14B is a flowchart illustrating an example operation of a video decoder, in accordance with one or more techniques of this disclosure.

FIG. 14B is a flowchart illustrating an example operation of video decoder 30, in accordance with one or more techniques of this disclosure. Although FIG. 14B is explained with reference to FIG. 13, the operation of FIG. 14B is not so limited. In the example of FIG. 14B, one or more actions may be rearranged or omitted. In other examples, similar operations may include additional actions.

In the example of FIG. 14B, motion compensation unit 272 of video decoder 30 may construct a merge candidate list for a current block (e.g., a current PU) (320). In accordance with at least some techniques of this disclosure, motion compensation unit 272 may generate the merge candidate list such that the merge candidate list includes an additional IPMVC or a DSMV candidate. In some examples, motion compensation unit 272 generates the DSMV candidate by shifting a horizontal component of a disparity motion vector of a spatial neighboring block. In other words, a horizontal component of the DSMV candidate may be equal to a horizontal component of the disparity motion vector of the spatial neighboring block plus an offset, and a vertical component of the DSMV candidate may be equal to a vertical component of the disparity motion vector of the spatial neighboring block. When none of the spatial neighboring blocks contain a disparity motion vector, motion compensation unit 272 may generate the DSMV by setting a horizontal component of the DSMV candidate equal to a horizontal component of the disparity vector of the current block plus an offset, and by setting a vertical component of the DSMV candidate to zero. Furthermore, in some examples, motion compensation unit 272 performs the example operations shown in FIG. 15 and FIG. 16 to generate the merge candidate list.

Motion compensation unit 272 may determine, based on an index signaled in a bitstream, a selected merge candidate in the merge candidate list (322). In addition, motion compensation unit 272 may generate one or more predictive blocks for the current block using motion information of the selected merge candidate (324). Video decoder 30 may reconstruct pixel values based at least in part on the predictive block of the current block (326).

Figure 15:
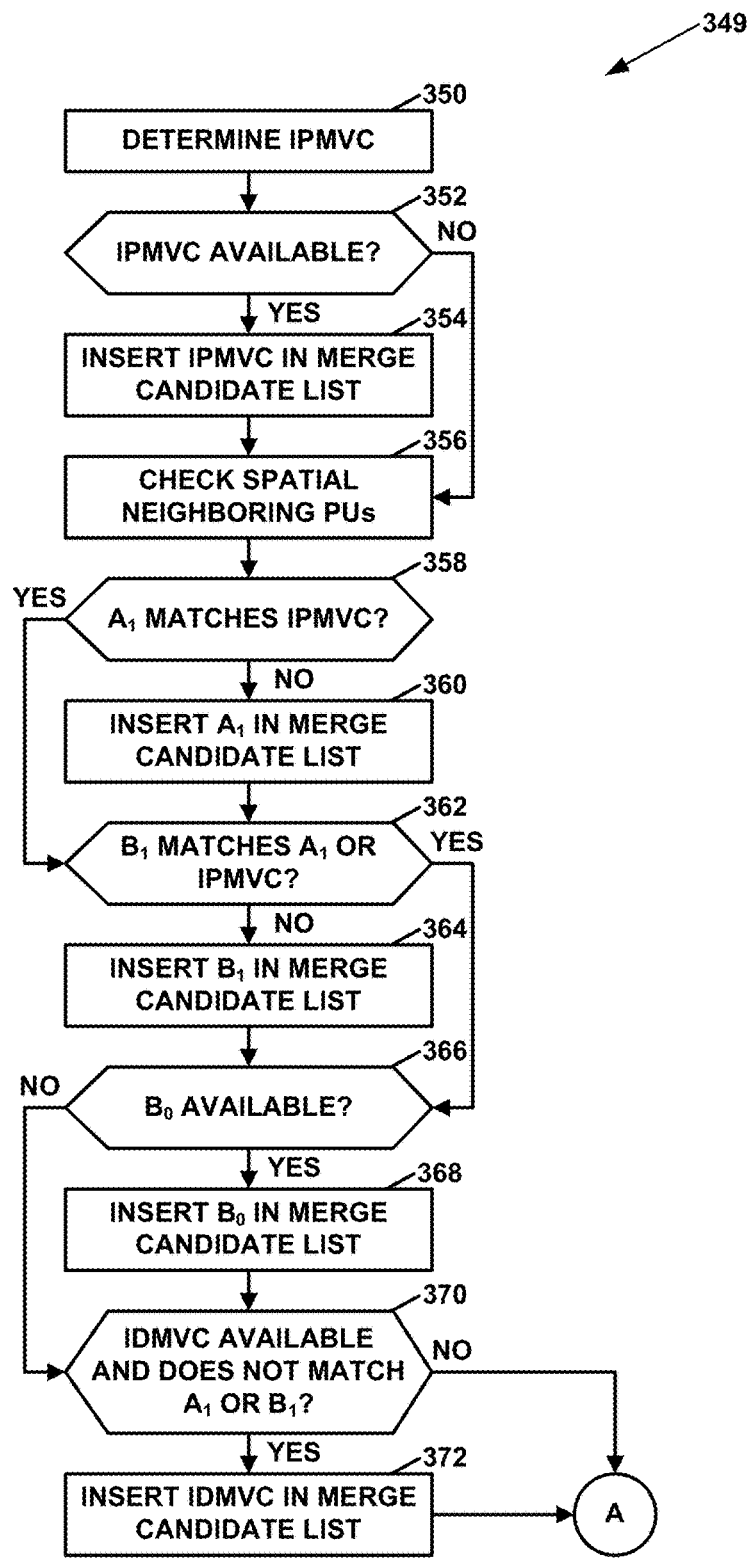
FIG. 15 is a flowchart illustrating a first portion of an example operation to construct a merge candidate list for a current block, in accordance with one or more techniques of this disclosure.

FIG. 15 is a flowchart illustrating a first portion of an example operation 349 to construct a merge candidate list for a current block, in accordance with one or more techniques of this disclosure. In the example operation of FIG. 15, one or more actions may be rearranged or omitted. In other examples, similar operations may include additional actions.

In the example of FIG. 15, a video coder (e.g., video encoder 20 or video decoder 30) may determine an IPMVC (350). In some examples, the video coder may determine the IPMVC by using a disparity vector for the current block to identify a corresponding block in an inter-view reference picture. In such examples, if the corresponding block is not intra predicted and not inter-view predicted and has a temporal motion vector (i.e., a motion vector that indicates a location in a reference picture associated with a different time instance than the corresponding block), the IPMVC may specify the motion vectors of the corresponding block, prediction direction indicators of the corresponding block, and converted reference indices of the corresponding block. Subsequently, the video coder may determine whether the IPMVC is available (352). In some examples, the IPMVC is unavailable if the corresponding block in the inter-view reference picture is intra predicted or outside the boundaries of the inter-view reference picture. Responsive to determining that the IPMVC is available ("YES" of 352), the video coder may insert the IPMVC in the merge candidate list (354).

After inserting the IPMVC in the merge candidate list or in response to determining that the IPMVC is not available ("NO" of 352), the video coder may check spatial neighboring PUs to determine whether the spatial neighboring PUs have available motion vectors (356). In some examples, the spatial neighboring PUs cover the locations indicated $A_0$, $A_1$, $B_0$, $B_1$, and $B_2$ in FIG. 2. For ease of explanation, this disclosure may refer to the motion information of PUs covering the locations $A_0$, $A_1$, $B_0$, $B_1$, and $B_2$ as $A_0$, $A_1$, $B_0$, $B_1$, and $B_2$, respectively.

In the example of FIG. 15, the video coder may determine whether $A_1$ matches the IPMVC (358). Responsive to determining that $A_1$ does not match the IPMVC ("NO" of 358), the video coder may insert $A_1$ into the merge candidate list (360). Otherwise, responsive to determining that $A_1$ matches the IPMVC ("YES" of 358) or after inserting $A_1$ into the merge candidate list, the video coder may determine whether $B_1$ matches $A_1$ or the IPMVC (362). Responsive to determining that $B_1$ does not match $A_1$ or the IPMVC ("NO" of 362), the video coder may insert $B_1$ into the merge candidate list (364). On the other hand, responsive to determining that $B_1$ matches $A_1$ or the IPMVC ("YES" of 362) or after inserting $B_1$ into the merge candidate list, the video coder may determine whether $B_0$ is available (366). Responsive to determining that $B_0$ is available ("YES" of 366), the video coder may insert $B_0$ into the merge candidate list (368). If $B_0$ is not available ("NO" of 366) or after inserting the $B_0$ into the merge candidate list, the video coder may determine whether the IDMVC is available and does not match $A_1$ or $B_1$ (370). The IDMVC may be unavailable if the IDMVC indicates a location that is outside the boundaries of an inter-view reference picture. Responsive to determining that the IDMVC is available and does not match $A_1$ or $B_1$ ("YES"

of 370), the video coder may insert the IDMVC into the merge candidate list (372). If the IDMVC is not available or the IDMVC matches $A_1$ or $B_1$ ("NO" of 370) or after inserting the IDMVC into the merge candidate list, the video coder may perform the portion of operation 349 shown in FIG. 16 (denoted by "A").

Figure 16:
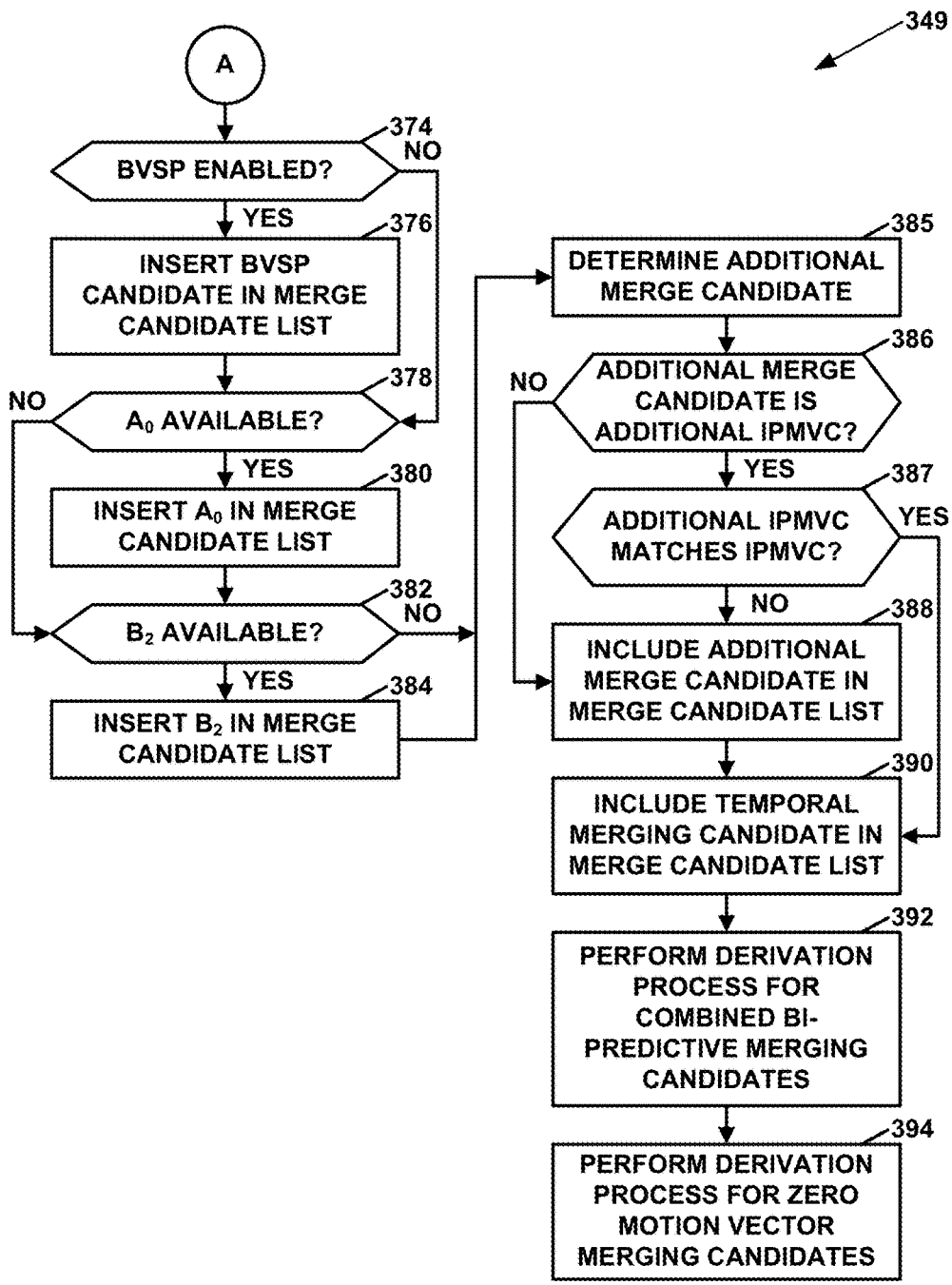
FIG. 16 is a flowchart illustrating a second portion of the example operation of FIG. 15 to construct a merge candidate list for a current block, in accordance with one or more techniques of this disclosure.

FIG. 16 is a flowchart illustrating a second portion of the example operation 349 of FIG. 15 to construct a merge candidate list for a current block, in accordance with one or more techniques of this disclosure. As indicated above, the video coder may perform the portion of operation 349 shown in FIG. 16 if the IDMVC is not available or the IDMVC matches $A_1$ or $B_1$ ("NO" of 370) or after inserting the IDMVC into the merge candidate list. Hence, if the IDMVC is not available or the IDMVC matches $A_1$ or $B_1$ ("NO" of 370) or after inserting the IDMVC into the merge candidate list, the video coder may determine whether BVSP is enabled (374). If BVSP is enabled ("YES" of 374), the video coder may insert a BVSP candidate into the merge candidate list (376). If BVSP is not enabled ("NO" of 374) or after inserting the BVSP candidate into the merge candidate list, the video coder may determine whether $A_0$ is available (378). If $A_0$ is available ("YES" of 378), the video coder may insert $A_0$ into the merge candidate list (380). Otherwise, if $A_0$ is not available ("NO" of 378) or after inserting $A_0$ into the merge candidate list, the video coder may determine whether $B_2$ is available (382). If $B_2$ is available ("YES" of 382), the video coder may insert $B_2$ into the merge candidate list (384).

If $B_2$ is not available ("NO" of 382) or after inserting $B_2$ into the merge candidate list, the video coder may determine an additional merge candidate (385). The video coder may determine the additional merge candidate in various ways. In accordance with one or more techniques of this disclosure, the video coder may perform the example operations of FIGS. 16-19 and/or FIG. 20 to determine the additional merge candidate. The additional merge candidate may be an additional IPMVC or a DSMV candidate. After determining the additional merge candidate, the video coder may determine whether an additional merge candidate is an additional IPMVC (386). If the additional merge candidate is an additional IPMVC ("YES" of 386), the video coder may determine whether the additional IPMVC matches the IPMVC determined in action (350) (387). If the additional IPMVC does not match the IPMVC ("NO" of 387) or if the additional merge candidate is not an additional IPMVC (i.e., the additional merge candidate is a DSMV candidate) ("NO" of 386), the video coder may include the additional merge candidate (i.e., the additional IPMVC or the DSMV candidate) in the merge candidate list (388).

If the additional merge candidate is an additional IPMVC and the additional IPMVC matches the IPMVC ("YES" of 387) or after including the additional merge candidate in the merge candidate list, the video coder may include a temporal merging candidate in the merge candidate list (390). Furthermore, the video coder may perform a derivation process for combined bi-predictive merging candidates (392). An example derivation process for zero motion vector candidates is described in section 8.5.3.2.3 of HEVC WD 10. In addition, the video coder may perform a derivation process for zero motion vector candidates (394). An example derivation process for zero motion vector candidates is described in section 8.5.3.2.4 of HEVC WD 10.

Figure 17:
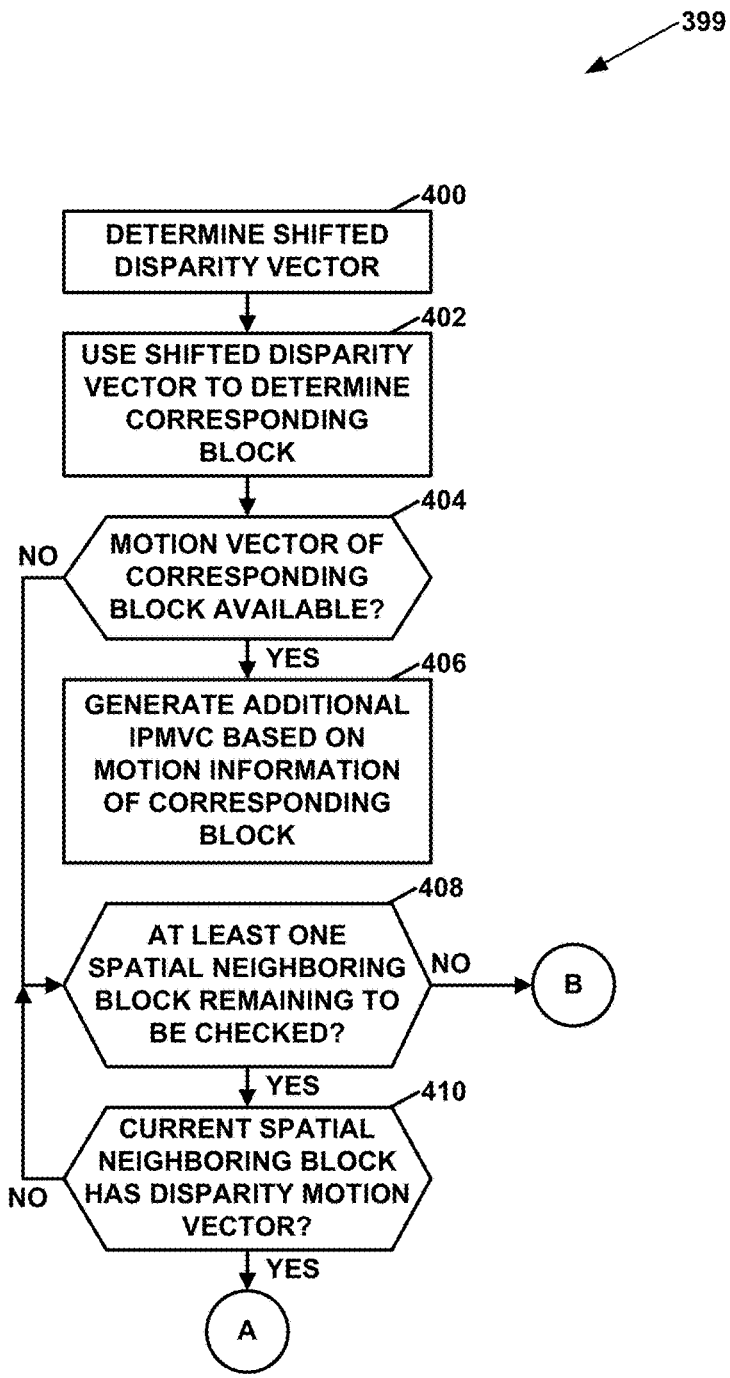
FIG. 17 is a flowchart illustrating a first portion of an example operation to determine an additional merge candidate, in accordance with one or more techniques of this disclosure.

FIG. 17 is a flowchart illustrating a first portion of an example operation 399 to determine an additional merge candidate, in accordance with one or more techniques of this disclosure. The additional merge candidate may be an additional IPMVC or a DSMV candidate. In operation 399, one or more actions may be rearranged or omitted. In other examples, similar operations may include additional actions.

In the example of FIG. 17, a video coder (e.g., video encoder 20 or video decoder 30) may determine a shifted disparity vector (400). In some examples, the video coder may determine the shifted disparity vector by shifting a disparity vector of a current block (i.e., a block that the video coder is currently coding) horizontally by a first value and vertically by a second value. In some examples, the current block is a PU and the first value is equal to $(((W/2)*4)+4)$ and the second value is equal to $(((H/2)*4)+4)$, where W is the width of the current block and H is the height of the current block.

The video coder may use the shifted disparity vector to determine a corresponding block in an inter-view reference picture (402). For instance, the video coder may identify a pixel in the inter-view reference picture that corresponds to a center position of the current block shifted by the shifted disparity vector. Furthermore, the video coder may determine whether at least one motion vector of the corresponding block is available (404). For instance, the video coder may determine that no motion vector of the corresponding block is available if the corresponding block is intra predicted or if the corresponding block is outside the boundaries of the inter-view reference picture. If at least one motion vector of the corresponding block is available ("YES" of 404), the video coder may generate an additional IPMVC based on motion information of the corresponding block (406). For instance, the motion information inside the block covering the identified pixel may be used to create the additional IPMVC candidate. The video coder may include the additional IPMVC as an additional merge candidate in the merge candidate list. In some examples, the video coder includes the additional IPMVC in the merge candidate list only when the additional IPMVC is different than the original IPMVC. For instance, the video coder may include the additional IPMVC in the merge candidate list in action 388 of FIG. 16.

In this way, the video coder may use a disparity vector of the current block to locate a first corresponding block in a reference view. Furthermore, responsive to determining that motion information of the first corresponding block is available, the video coder may insert a first IPMVC into the merge candidate list. The first IPMVC may indicate at least one motion vector of the first corresponding block. In addition, the video coder may determine a shifted disparity vector by shifting the disparity vector of the current block horizontally by a first value and vertically by a second value. The video coder may use the shifted disparity vector to locate a second corresponding block in the reference view. Responsive to determining that the motion information of the second corresponding block is available and does not match the motion information of the first IPMVC, the video coder may insert a second IPMVC into the merge candidate list, the second IPMVC indicating at least one motion vector of the second corresponding block.

On the other hand, if the motion vector of the corresponding block is not available ("NO" of 404), the video coder may determine whether there is at least one spatial neighboring block remaining to be checked for an available disparity motion vector (408). In some examples, the spatial neighboring blocks to be checked are the spatial neighboring blocks corresponding to locations $A_1$, $B_1$, $B_0$, $A_0$, and $B_2$ (FIG. 2). Furthermore, in some examples, the video coder may check the spatial neighboring blocks in the order of $A_1$, $B_1$, $B_0$, $A_0$, and $B_2$.

If there is at least one spatial neighboring block remaining to be checked for an available disparity motion vector ("YES" of 408), the video coder may determine whether a current spatial neighboring block (i.e., a spatial neighboring block that has not yet been checked in the course of performing operation 399 to determine an additional merge candidate for inclusion in a merge candidate list for a current block) has an available disparity motion vector (410). In some examples, the current spatial neighboring block has an available disparity motion vector if a RefPicList0 reference index of the current spatial neighboring block indicates an inter-view reference picture. In other examples, the current spatial neighboring block has an available disparity motion vector if a RefPicList0 reference index of the current spatial neighboring block indicates an inter-view reference picture and the RefPicList1 reference index of the current spatial neighboring block indicates a temporal reference picture.

Figure 18:
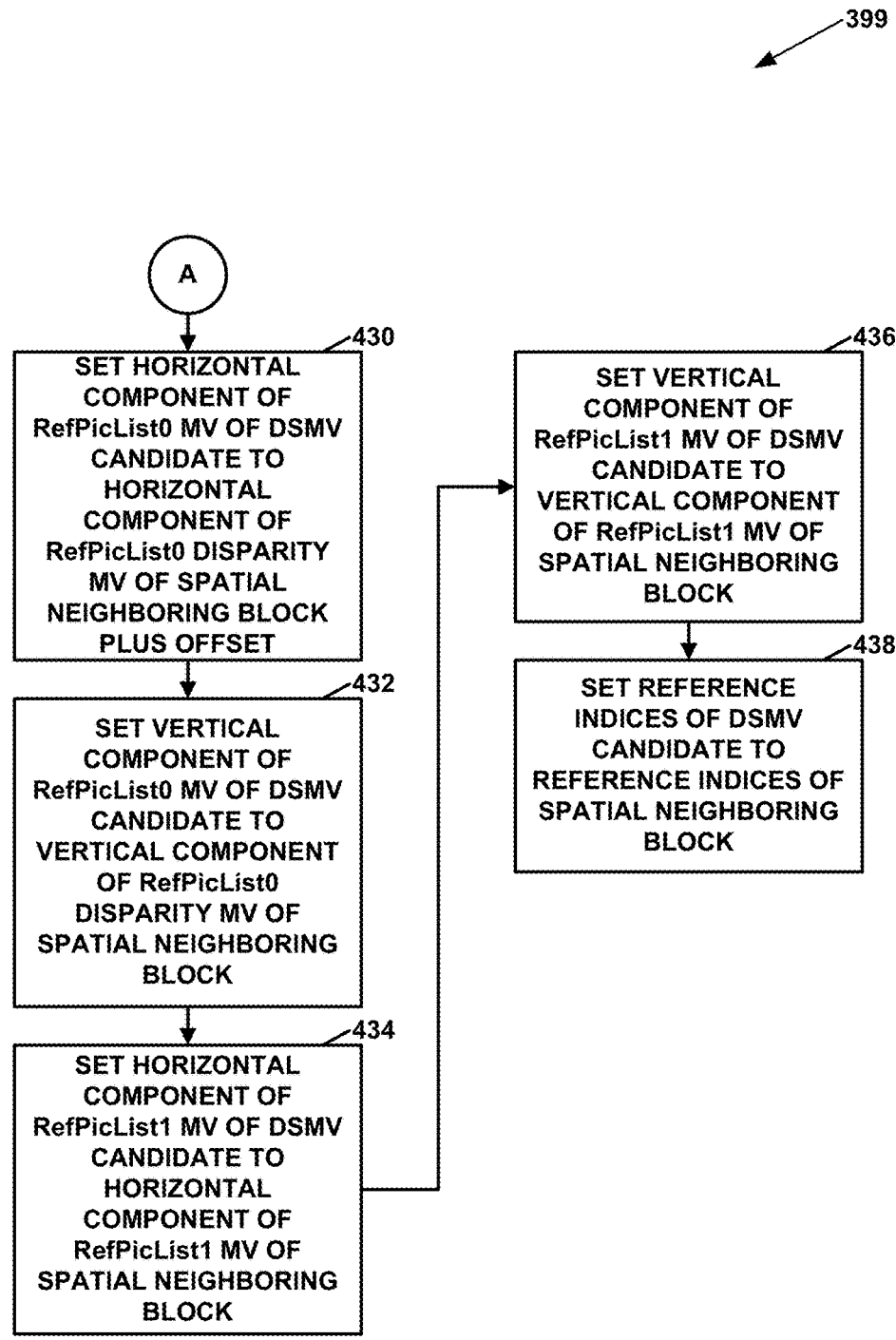
FIG. 18 is a flowchart illustrating a second portion of an example operation to determine an additional merge candidate, in accordance with one or more techniques of this disclosure.

Responsive to determining that the current spatial neighboring block has an available disparity motion vector ("YES" of 410), the video coder may perform the portion of operation 399 shown in FIG. 18 (denoted by "A"). Otherwise, if the current spatial neighboring block does not have an available disparity motion vector ("NO" of 410), the video coder may again determine whether there is at least one spatial neighboring block remaining to be checked (408). If there is another spatial neighboring block to be checked, the video coder may determine whether this spatial neighboring block has an available disparity motion vector. In this way, the video coder may continue checking spatial neighboring blocks until the video coder identifies a spatial neighboring block that has an available disparity motion vector or until there are no remaining spatial neighboring blocks to check. Responsive to determining that there are no remaining spatial neighboring blocks to check ("NO" of 408), the video coder may perform the portion of operation 399 shown in FIG. 19 (denoted by "B").

FIG. 18 is a flowchart illustrating a second portion of operation 399 to determine an additional merge candidate, in accordance with one or more techniques of this disclosure. As indicated above, the video coder may perform the portion of operation 399 shown in FIG. 18 when the video coder identifies a spatial neighboring block that has an available disparity motion vector.

In the example of FIG. 18, the video coder may set a horizontal component of a RefPicList0 motion vector (i.e., "MV") of a DSMV candidate to a horizontal component of the RefPicList0 disparity motion vector of the current spatial neighboring block (i.e., the spatially neighboring block having the first available disparity motion vector) plus an offset (430). In some examples, the offset may be equal to 4. In addition, the video coder may set a vertical component of the RefPicList0 motion vector of the DSMV candidate to a vertical component of the RefPicList0 disparity motion vector of the current spatial neighboring block (432). In some examples, when BVSP is enabled for the current picture or slice, the video coder may set the vertical component of the RefPicList0 motion vector of the DSMV candidate to zero.

The video coder may set a horizontal component of a RefPicList1 motion vector of the DSMV candidate to a horizontal component of a RefPicList1 motion vector of the current spatial neighboring block (434). Furthermore, the video coder may set a vertical component of the RefPicList1 motion vector of the additional DSMV candidate to a vertical component of the RefPicList1 motion vector of the current spatial neighboring block (436). The video coder may set the reference indices of the DSMV candidate to the reference indices of the current spatial neighboring block (438). The video coder may include the DSMV candidate as an additional merge candidate in the merge candidate list. For instance, the video coder may include the DSMV candidate in the merge candidate list in action 388 of FIG. 16.

Figure 19:
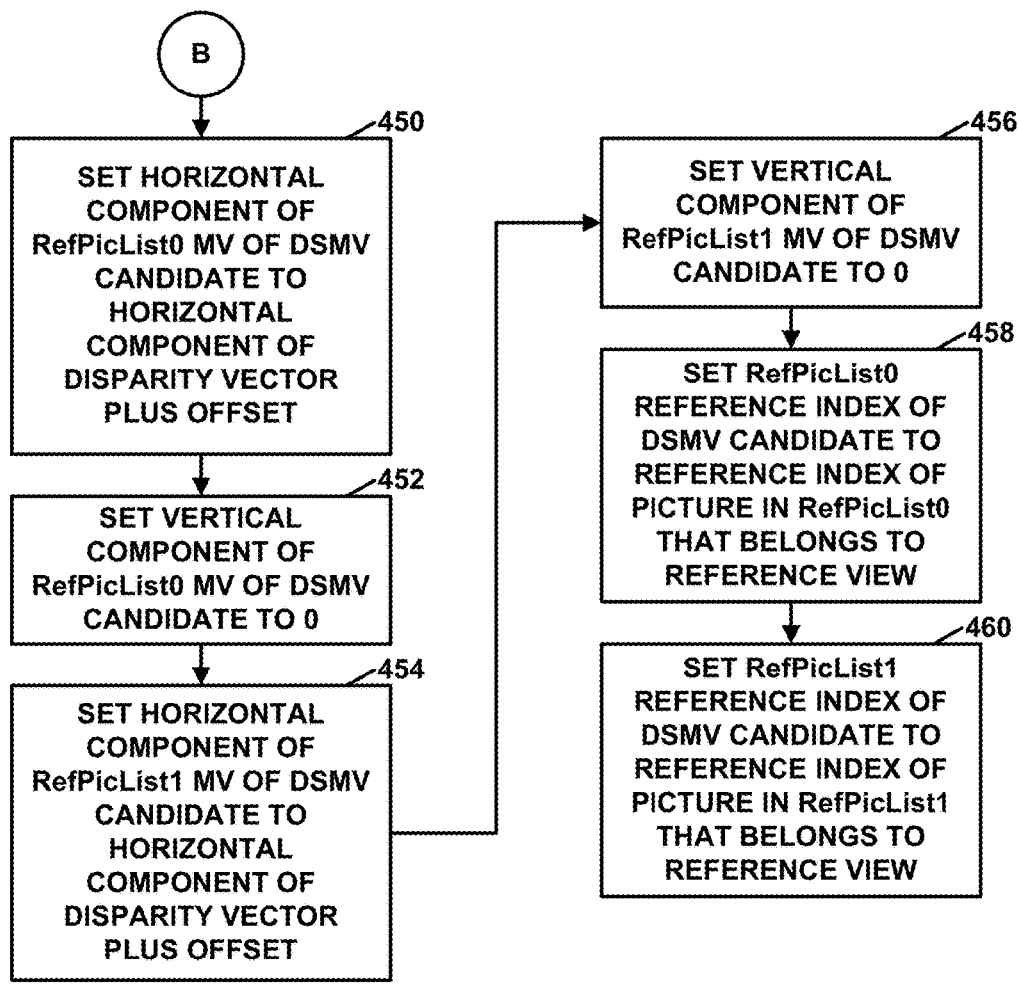
FIG. 19 is a flowchart illustrating a third portion of an example operation to determine an additional merge candidate, in accordance with one or more techniques of this disclosure.

FIG. 19 is a flowchart illustrating a third portion of an example operation to determine an additional merge candidate, in accordance with one or more techniques of this disclosure. As indicated above, the video coder may perform the portion of operation 399 shown in FIG. 19 when none of the spatial neighboring blocks has an available disparity motion vector.

In the example of FIG. 19, the video coder may set a horizontal component of a RefPicList0 motion vector (i.e., "MV") of a DSMV candidate to a horizontal component of the disparity motion vector of the current block plus an offset (450). In some examples, the offset may be equal to 4. In addition, the video coder may set a vertical component of the RefPicList0 motion vector of the DSMV candidate to zero (452). Furthermore, the video coder may set a horizontal component of a RefPicList1 motion vector of the DSMV candidate to a horizontal component of the disparity vector of the current block plus an offset (454). In some examples, the offset may be equal to 4. The video coder may set a vertical component of the RefPicList1 motion vector of the DSMV candidate to zero (456). In addition, the video coder may set the RefPicList0 reference index of the DSMV candidate to a reference index of a picture in RefPicList0 that belongs to the reference view identified during derivation of the disparity vector for the current block (e.g., during an NBDV or DoNBDV derivation operation) (458). The video coder may set the RefPicList1 reference index of the DSMV candidate to a reference index of a picture in RefPicList1 that belongs to the reference view identified during derivation of the disparity vector for the current block (e.g., during an NBDV or DoNBDV derivation operation) (460).

Figure 20:
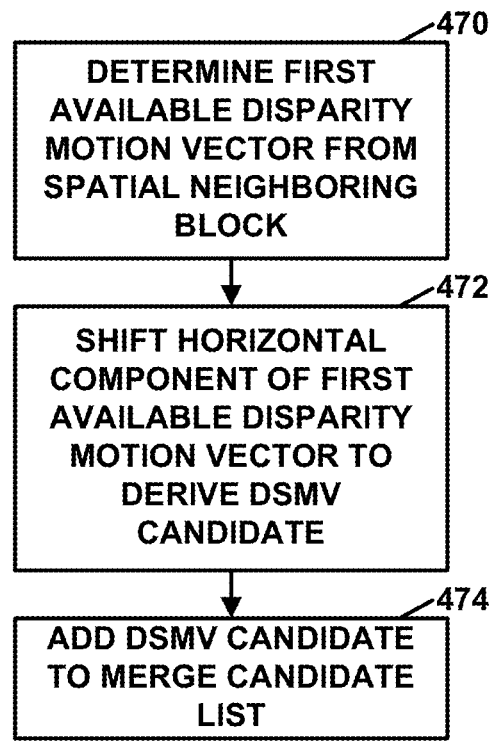
FIG. 20 is a flowchart illustrating an example operation of a video coder, in accordance with one or more techniques of this disclosure.

FIG. 20 is a flowchart illustrating an example operation of a video coder, in accordance with one or more techniques of this disclosure. In the example of FIG. 20, one or more actions may be rearranged or omitted. In other examples, similar operations may include additional actions.

In the example of FIG. 20, a video coder (e.g., video encoder 20 or video decoder 30) may determine a first available disparity motion vector among spatial neighboring blocks of a current block of the video data (470). The first available disparity motion vector may corresponds to a first reference picture list (e.g., RefPicList0). Furthermore, the video coder may shift a horizontal component of the first available disparity motion vector to derive a DSMV candidate (472). The video coder may add the DSMV candidate into a merge candidate list (474). In some examples, the video coder adds the DSMV candidate into the merge candidate list when an IPMVC generated from shifted disparity vector (i.e., a merge candidate indication motion information of an inter-view reference block indicated by the shifted disparity vector) is not available. Furthermore, in some examples, if the video coder is a video encoder, the video encoder may select a candidate from the merge candidate list and include, in a bitstream, data representing an index of the selected merge candidate. The video encoder may determine, based on motion information of the selected merge candidate, a predictive block for the current block. The video encoder may include, in the bitstream, data representing residual data determined in part on the predictive block. In other examples, if the video decoder is a video decoder, the video decoder may determine, based on data obtained from a bitstream, the selected merge candidate in the merge candidate list. Furthermore, the video decoder may determine, based on motion information of the selected merge candidate, the predictive block for the current block. The video decoder may reconstruct, based on the residual data and the predictive block, sample values of the current block.

The following paragraphs provide additional example techniques of this disclosure.

EXAMPLE 1

A method of coding multi-view video data comprising: deriving inter-view predicted motion vector candidates for a merge mode motion vector prediction candidate list for use in coding a current block of video data; deriving one or more additional inter-view predicted motion vector candidates for the merge mode motion vector prediction candidate list, wherein the one or more additional inter-view predicted motion vector candidates are derived from one or more shifted disparity vectors of the current block of video data; and coding a motion vector for the current block of video data using the merge mode motion vector prediction candidate list.

EXAMPLE 2

The method of example 1, wherein at least one of the one or more shifted disparity vectors is shifted both horizontally by a first value M1 and is shifted vertically by a second value M2.

EXAMPLE 3

The method of example 2, wherein the first value M1 and the second value of M2 are different values.

EXAMPLE 4

The method of example 2, wherein the first value M1 and the second value of M2 are the same values.

EXAMPLE 5

The method of example 2, wherein the first value M1 and the second value M2 may take any value from the list including 4, 8, 16, 32, 64, −4, −8, −16, −32, and −64.

EXAMPLE 6

The method of example 2, wherein the first value M1 is equal to the width of a smallest prediction unit within one reference view, and the second value M1 is equal to a height of the smallest prediction unit within one reference view.

EXAMPLE 7

The method of example 2, wherein the first value M1 is equal to the width of a smallest coding unit within one reference view, and the second value M1 is equal to a height of the smallest coding unit within one reference view.

EXAMPLE 8

The method of example 2, wherein the first value M1 is equal to the width of a current block of video data, and the second value M1 is equal to a height of the current block of video data.

EXAMPLE 9

The method of example 1, wherein deriving one or more additional inter-view predicted motion vector candidates for the merge mode motion vector prediction candidate list produces no additional candidates, the method further comprising: shifting a first available disparity motion vector from a spatially neighboring block by the horizontal component of the first available disparity motion vector to produce a disparity shifted motion vector; and adding the disparity shifted motion vector to the merge mode motion vector prediction candidate list.

EXAMPLE 10

The method of example 1, wherein the one or more additional inter-view predicted motion vector candidates are added to the merge mode motion vector prediction candidate list after any spatial candidates.

EXAMPLE 11

The method of example 10, wherein the one or more additional inter-view predicted motion vector candidates are added after temporal motion vector prediction candidates.

EXAMPLE 12

The method of example 10, wherein the one or more additional inter-view predicted motion vector candidates are added before temporal motion vector prediction candidates.

EXAMPLE 13

The method of example 10, wherein one of the one or more additional inter-view predicted motion vector candidates is added after temporal motion vector prediction candidates, and another of the one or more additional inter-view predicted motion vector candidates is added before temporal motion vector prediction candidates.

EXAMPLE 14

An apparatus configured to code video data comprising: means for deriving inter-view predicted motion vector candidates for a merge mode motion vector prediction candidate list for use in coding a current block of video data; means for deriving one or more additional inter-view predicted motion vector candidates for the merge mode motion vector prediction candidate list, wherein the one or more additional inter-view predicted motion vector candidates are derived from one or more shifted disparity vectors of the current block of video data; and means for coding a motion vector for the current block of video data using the merge mode motion vector prediction candidate list.

EXAMPLE 15

A video encoder configured to perform any combination of the methods of examples 1-13.

EXAMPLE 16

A video decoder configured to perform any combination of the methods of examples 1-13.

EXAMPLE 17

A computer-readable storage medium storing instructions that, when executed, cause one or more processors of a device configured to encode video data to perform any combination of the methods of examples 1-13.

EXAMPLE 18

A computer-readable storage medium storing instructions that, when executed, cause one or more processors of a device configured to decode video data to perform any combination of the methods of examples 1-13.

EXAMPLE 19

Any combination of methods described in this disclosure.

EXAMPLE 20

A device configured to perform any of the methods, or combinations thereof, described in this disclosure.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the methods, systems, and apparatuses disclosed herein may be implemented as electronic hardware, computer software executed by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Examples disclosed herein may be implemented or performed with an electronic device or circuit such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

Thus, the steps of a method or algorithm described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining, by a video decoder, a shifted disparity vector by shifting a disparity vector of a current block of the video data horizontally by a first value and vertically by a second value, the first value being equal to two times the width of the current block, and the second value being equal to two times the height of the current block;
   using, by the video decoder, the shifted disparity vector to generate an inter-view prediction motion vector candidate (IPMVC) indicating motion information of a corresponding block in an inter-view reference picture in a reference view, the corresponding block corresponding to the current block;
   responsive to determining the IPMVC is unavailable, adding, by the video decoder, a disparity shifted motion vector (DSMV) candidate into a merge candidate list, wherein a horizontal component of the disparity vector is shifted by a third value to derive a motion vector of the DSMV candidate, the third value being equal to 4;
   determining, by the video decoder, based on an index signaled in a bitstream, a selected merge candidate in the merge candidate list;
   generating, by the video decoder, a predictive block for the current block using motion information of the selected merge candidate; and
   adding, by the video decoder, residual data to the predictive block to reconstruct a block of the video data.

2. The method of claim 1, wherein:
   the motion vector of the DSMV candidate is a first motion vector of the DSMV candidate, and the method comprises, based on at least one of a plurality of spatial neighboring blocks of the current block having a disparity motion vector:
      setting, by the video decoder, the first motion vector of the DSMV candidate to a first motion vector of a particular spatial neighboring block among the plurality of spatial neighboring blocks of the current block, the first motion vector of the particular spatial neighboring block corresponding to a first reference picture list, and the first motion vector of the particular spatial neighboring block being a first available disparity motion vector among the plurality of spatial neighboring blocks;
      setting, by the video decoder, a second motion vector of the DSMV candidate to a second motion vector of the particular spatial neighboring block, the second motion vector of the particular spatial neighboring block corresponding to a second reference picture list;
      setting, by the video decoder, a reference index corresponding to the first motion vector of the DSMV candidate to a reference index corresponding to the first motion vector of the particular spatial neighboring block;
      setting, by the video decoder, a reference index corresponding to the second motion vector of the DSMV candidate to a reference index corresponding to the second motion vector of the particular spatial neighboring block; and
      adding, by the video decoder, the third value to the horizontal component of the first motion vector of the DSMV candidate.

3. The method of claim 1, wherein the motion vector of the DSMV candidate is a first motion vector of the DSMV candidate, the method further comprising, based on none of a plurality of spatial neighboring blocks of the current block having a disparity motion vector:
   setting, by the video decoder, the first motion vector of the DSMV candidate and a second motion vector of the DSMV candidate to the disparity vector of the current block;
   adding, by the video decoder, the third value to the horizontal component of the first motion vector of the DSMV candidate and the third value to a horizontal component of the second motion vector of the DSMV candidate; and
   setting, by the video decoder, a vertical component of the first motion vector of the DSMV candidate and a vertical component of the second motion vector of the DSMV candidate to 0.

4. The method of claim 3, further comprising:
   performing, by the video decoder, a process based on neighboring blocks to determine the disparity vector of the current block, wherein the process identifies the reference view along with the disparity vector of the current block; and
   based on none of the spatial neighboring blocks having a disparity motion vector:
      setting, by the video decoder, a reference index corresponding to the first motion vector of the DSMV candidate to a reference index of a picture that is in a first reference picture list and that belongs to the identified reference view; and
      setting, by the video decoder, a reference index corresponding to the second motion vector of the DSMV candidate to a reference index of a picture that is in a second reference picture list and that belongs to the identified reference view.

5. The method of claim 2, wherein based on backward warping view synthesis prediction being enabled for a whole picture or a current sequence, performing at least one of:
   setting, by the video decoder, a vertical component of the first motion vector of the DSMV candidate to 0 based on the first motion vector of the DSMV candidate being derived from the first available disparity motion vector; and
   setting, by the video decoder, a vertical component of the second motion vector of the DSMV candidate to 0 based on the second motion vector of the DSMV candidate being derived from the first available disparity motion vector.

6. The method of claim 1, wherein adding the DSMV candidate into the merge candidate list comprises: adding, by the video decoder, the DSMV candidate into the merge candidate list immediately after a merge candidate for a spatial neighboring block that is above and left of the current block.

7. The method of claim 1, wherein the current block is a first block and the corresponding block is a first corresponding block, and the IPMVC is a first IPMVC, the method further comprising:
using, by the video decoder, a disparity vector of a second block to locate a second corresponding block in the reference view, the second corresponding block corresponding to a second block;
responsive to determining that motion information of the second corresponding block is available, inserting, by the video decoder, a second IPMVC into a merge candidate list for the second block, the second IPMVC indicating at least one motion vector of the second corresponding block;
determining, by the video decoder, a second shifted disparity vector by shifting the disparity vector of the second block horizontally by a fourth value and vertically by a fifth value;
using, by the video decoder, the second shifted disparity vector to locate a third corresponding block in the reference view, the third corresponding block corresponding to the second block, and
responsive to determining that motion information of the third corresponding block is available and does not match motion information of the second IPMVC, inserting, by the video decoder, a third IPMVC into the merge candidate list for the second block, the third IPMVC indicating at least one motion vector of the third corresponding block.

8. The method of claim 7, wherein inserting the third IPMVC into the merge candidate list for the second block comprises:
inserting, by the video decoder, the third IPMVC into the merge candidate list for the second block immediately after a merge candidate for a spatial neighboring block that is above and left of the second block.

9. An apparatus for decoding video data, the apparatus comprising:
a memory configured to store the video data, and
one or more processors configured to:
determine a shifted disparity vector by shifting a disparity vector of a current block of the video data horizontally by a first value and vertically by a second value, the first value being equal to two times the width of the current block, the second value being equal to two times the height of the current block;
use the shifted disparity vector to generate an inter-view prediction motion vector candidate (IPMVC) indicating motion information of a corresponding block in an inter-view reference picture in a reference view, the corresponding block corresponding to the current block;
responsive to determining the IPMVC is unavailable, add a disparity shifted motion vector (DSMV) candidate into a merge candidate list, wherein a horizontal component of the disparity vector is shifted by a third value to derive a motion vector of the DSMV candidate, the third value being equal to 4,
determine, based on an index signaled in a bitstream, a selected merge candidate in the merge candidate list;
generate a predictive block for the current block using motion information of the selected merge candidate; and
add residual data to the predictive block to reconstruct a block of the video data.

10. The apparatus of claim 9, wherein the motion vector of the DSMV candidate is a first motion vector of the DSMV candidate, and the one or more processors are configured such that, when at least one of a plurality of spatial neighboring blocks of the current block has a disparity motion vector, the one or more processors:
set the first motion vector of the DSMV candidate to a first motion vector of a particular spatial neighboring block among the plurality of spatial neighboring blocks of the current block, the first motion vector of the particular spatial neighboring block corresponding to a first reference picture list, and the first motion vector of the particular spatial neighboring block being a first available disparity motion vector among the plurality of spatial neighboring blocks;
set a second motion vector of the DSMV candidate to a second motion vector of the particular spatial neighboring block, the second motion vector of the particular spatial neighboring block corresponding to a second reference picture list;
set a reference index corresponding to the first motion vector of the DSMV candidate to a reference index corresponding to the first motion vector of the particular spatial neighboring block;
set a reference index corresponding to the second motion vector of the DSMV candidate to a reference index corresponding to the second motion vector of the particular spatial neighboring block; and
add the third value to the horizontal component of the first motion vector of the DSMV candidate.

11. The apparatus of claim 9, wherein the motion vector of the DSMV candidate is a first motion vector of the DSMV candidate and the one or more processors are configured such that, based on none of a plurality of spatial neighboring blocks of the current block having a disparity motion vector, the one or more processors:
set the first motion vector of the DSMV candidate and a second motion vector of the DSMV candidate to the disparity vector of the current block;
add the third value to the horizontal component of the first motion vector of the DSMV candidate and the third value to a horizontal component of the second motion vector of the DSMV candidate; and
set the vertical component of the first motion vector of the DSMV candidate and a vertical component of the second motion vector of the DSMV candidate to 0.

12. The apparatus of claim 11, wherein the one or more processors are configured to:
perform a process based on neighboring blocks to determine the disparity vector of the current block, wherein the process identifies the reference view along with the disparity vector of the current block; and
based on none of the spatial neighboring blocks having a disparity motion vector:
set a reference index corresponding to the first motion vector of the DSMV candidate to a reference index of a picture that is in the first reference picture list and that belongs to the identified reference view; and set a reference index corresponding to the second motion vector of the DSMV candidate to a reference index of a picture that is in the second reference picture list and that belongs to the identified reference view.

13. The apparatus of claim 10, wherein the one or more processors are configured such that, based on backward warping view synthesis prediction being enabled for a whole picture or a current sequence, the one or more processors perform at least one of:
setting a vertical component of the first motion vector of the DSMV candidate to 0 based on the first motion vector of the DSMV candidate being derived from the first available disparity motion vector; and
setting a vertical component of the second motion vector of the DSMV candidate to 0 based on the second motion vector of the DSMV candidate being derived from the first available disparity motion vector.

14. The apparatus of claim 9, wherein the one or more processors are configured to add the DSMV candidate into the merge candidate list immediately after a merge candidate for a spatial neighboring block that is above and left of the current block.

15. The apparatus of claim 9, wherein the current block is a first block and the corresponding block is a first corresponding block, the IPMVC is a first IPMVC, and the one or more processors are further configured to:
use a disparity vector of a second block to locate a second corresponding block in the reference view, the second corresponding block corresponding to a second block;
responsive to determining that motion information of the second corresponding block is available, insert a second IPMVC into a merge candidate list for the second block, the second IPMVC indicating at least one motion vector of the second corresponding block;
determine a second shifted disparity vector by shifting the disparity vector of the second block horizontally by a fourth value and vertically by a fifth value;
use the second shifted disparity vector to locate a third corresponding block in the reference view, the third corresponding block corresponding to the second block, and
responsive to determining that motion information of the third corresponding block is available and does not match motion information of the second IPMVC, insert a third IPMVC into the merge candidate list for the second block, the third IPMVC indicating at least one motion vector of the third corresponding block.

16. The apparatus of claim 15, wherein the one or more processors are configured to insert the third IPMVC into the merge candidate list for the second block immediately after a merge candidate for a spatial neighboring block that is above and left of the second block.

17. The apparatus of claim 9, wherein the apparatus comprises at least one of:
an integrated circuit;
a microprocessor; or
a wireless communication device.

18. The apparatus of claim 9, further comprising a display configured to display the decoded video data.

19. An apparatus for decoding video data, the apparatus comprising:
means for determining a shifted disparity vector by shifting a disparity vector of a current block of the video data horizontally by a first value and vertically by a second value, the first value being equal to two times the width of the current block, the second value being equal to two times the height of the current block;
means for using the shifted disparity vector to generate an inter-view prediction motion vector candidate (IPMVC) indicating motion information of a corresponding block in an inter-view reference picture in a reference view, the corresponding block corresponding to the current block;
means for adding, responsive to determining the IPMVC is unavailable, a disparity shifted motion vector (DSMV) candidate into a merge candidate list, wherein a horizontal component of the disparity vector is shifted by a third value to derive a motion vector of the DSMV candidate, the third value being equal to 4;
means for determining, based on an index signaled in a bitstream, a selected merge candidate in the merge candidate list;
means for generating a predictive block for the current block using motion information of the selected merge candidate; and
means for adding residual data to the predictive block to reconstruct a block of the video data.

20. The apparatus of claim 19, wherein the current block is a first block, the corresponding block is a first corresponding block, and the IPMVC is a first IPMVC, the apparatus further comprising:
means for using a disparity vector of a second block to locate a second corresponding block in the reference view, the second corresponding block corresponding to a second block;
means for inserting, responsive to determining that motion information of the second corresponding block is available, a second IPMVC into a merge candidate list of the second block, the second IPMVC indicating at least one motion vector of the second corresponding block;
means for determining a second shifted disparity vector by shifting the disparity vector of the second block horizontally by a fourth value and vertically by a fifth value;
means for using the second shifted disparity vector to locate a third corresponding block in the reference view, the third corresponding block corresponding to the second block, and
means for inserting, responsive to determining that the motion information of the third corresponding block is available and does not match the motion information of the second IPMVC, a third IPMVC into the merge candidate list for the second block, the third IPMVC indicating at least one motion vector of the third corresponding block.

* * * * *